United States Patent
Touboul

(10) Patent No.: US 9,219,755 B2
(45) Date of Patent: *Dec. 22, 2015

(54) MALICIOUS MOBILE CODE RUNTIME MONITORING SYSTEM AND METHODS

(71) Applicant: Finjan, Inc., East Palo Alto, CA (US)

(72) Inventor: Shlomo Touboul, Kefar-Haim (IL)

(73) Assignee: Finjan, Inc., East Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/732,188

(22) Filed: Jun. 5, 2015

(65) Prior Publication Data

US 2015/0288720 A1    Oct. 8, 2015

Related U.S. Application Data

(60) Division of application No. 14/619,363, filed on Feb. 11, 2015, which is a continuation of application No. 14/155,835, filed on Jan. 15, 2014, which is a continuation of application No. 13/290,708, filed on (Continued)

(51) Int. Cl.
*H04L 29/06* (2006.01)
*G06F 21/51* (2013.01)
(Continued)

(52) U.S. Cl.
CPC ............... *H04L 63/20* (2013.01); *G06F 21/51* (2013.01); *G06F 21/53* (2013.01); *G06F 21/56* (2013.01);
(Continued)

(58) Field of Classification Search
CPC ... H04L 63/20; H04L 63/1441; H04L 63/145; H04L 63/168; G06F 21/53; G06F 21/56; G06F 21/51; G06F 2221/033
See application file for complete search history.

(56) References Cited

U.S. PATENT DOCUMENTS 4,562,305 A    12/1985   Gaffney, Jr.
4,864,616 A    9/1989    Pond et al.
(Continued)

FOREIGN PATENT DOCUMENTS

EP    0636977    7/1994
EP    0813133    12/1997
(Continued)

OTHER PUBLICATIONS

U.S. Appl. No. 60/174,952, filed Jan. 7, 2000, Lieno, et al.
(Continued)

*Primary Examiner* — Andrew Nalven
*Assistant Examiner* — Mary Li
(74) *Attorney, Agent, or Firm* — Dawn-Marie Bey; Bey & Cotropia PLLC

(57) ABSTRACT

Protection systems and methods provide for protecting one or more personal computers ("PCs") and/or other intermittently or persistently network accessible devices or processes from undesirable or otherwise malicious operations of Java TN applets, ActiveX™ controls, JavaScript™ scripts, Visual Basic scripts, add-ins, downloaded/uploaded programs or other "Downloadables" or "mobile code" in whole or part. A protection engine embodiment provides for monitoring information received, determining whether received information does or is likely to include executable code, and if so, causes mobile protection code (MPC) to be transferred to and rendered operable within a destination device of the received information. An MPC embodiment further provides, within a Downloadable-destination, for initiating the Downloadable, enabling malicious Downloadable operation attempts to be received by the MPC, and causing (predetermined) corresponding operations to be executed in response to the attempts.

8 Claims, 10 Drawing Sheets

Related U.S. Application Data

Nov. 7, 2011, now Pat. No. 8,677,494, which is a continuation of application No. 12/471,942, filed on May 26, 2009, now Pat. No. 8,079,086, which is a continuation of application No. 11/370,114, filed on Mar. 7, 2006, now Pat. No. 7,613,926, which is a continuation of application No. 09/861,229, filed on May 17, 2001, now Pat. No. 7,058,822, which is a continuation-in-part of application No. 09/551,302, filed on Apr. 18, 2000, now Pat. No. 6,480,962, which is a continuation of application No. 08/790,097, filed on Jan. 29, 1997, now Pat. No. 6,167,520, and application No. 09/861,229, May 17, 2001, and a continuation-in-part of application No. 09/539,667, filed on Mar. 30, 2000, now Pat. No. 6,804,780, which is a continuation of application No. 08/964,388, filed on Nov. 6, 1997, now Pat. No. 6,092,194.

(60) Provisional application No. 60/030,639, filed on Nov. 8, 1996, provisional application No. 60/205,591, filed on May 17, 2000.

(51) Int. Cl.
*G06F 21/56* (2013.01)
*G06F 21/53* (2013.01)

(52) U.S. Cl.
CPC .......... *H04L 63/145* (2013.01); *H04L 63/1441* (2013.01); *H04L 63/168* (2013.01); *G06F 2221/033* (2013.01)

(56) References Cited

U.S. PATENT DOCUMENTS

| | | | |
|---|---|---|---|
| 4,978,484 A | 12/1990 | Takashige et al. | 264/40.1 |
| 5,050,212 A | 9/1991 | Dyson | 380/25 |
| 5,077,677 A | 12/1991 | Murphy et al. | |
| 5,263,147 A | 11/1993 | Francisco et al. | |
| 5,278,901 A | 1/1994 | Shieh et al. | |
| 5,283,830 A | 2/1994 | Hinsley et al. | |
| 5,311,591 A | 5/1994 | Fischer | |
| 5,313,616 A | 5/1994 | Cline et al. | 395/500 |
| 5,319,776 A | 6/1994 | Rile et al. | |
| 5,337,360 A | 8/1994 | Fischer | |
| 5,345,595 A | 9/1994 | Johnson et al. | |
| 5,359,659 A | 10/1994 | Rosenthal | |
| 5,361,359 A | 11/1994 | Tajalli et al. | |
| 5,389,196 A | 2/1995 | Bloomstein et al. | |
| 5,398,196 A | 3/1995 | Chambers | |
| 5,412,717 A | 5/1995 | Fischer | |
| 5,414,833 A | 5/1995 | Hershey et al. | |
| 5,421,006 A | 5/1995 | Jablon et al. | 395/575 |
| 5,440,723 A | 8/1995 | Arnold et al. | |
| 5,452,442 A | 9/1995 | Kephart | |
| 5,471,614 A | 11/1995 | Kakimoto | |
| 5,475,753 A | 12/1995 | Barbara et al. | |
| 5,483,649 A | 1/1996 | Kuznetsov et al. | |
| 5,485,409 A | 1/1996 | Gupta et al. | |
| 5,485,575 A | 1/1996 | Chess et al. | |
| 5,524,238 A | 6/1996 | Miller et al. | |
| 5,572,643 A | 11/1996 | Judson | |
| 5,579,509 A | 11/1996 | Furtney et al. | |
| 5,606,668 A | 2/1997 | Shwed | |
| 5,621,889 A | 4/1997 | Lermuzeaux et al. | |
| 5,623,600 A | 4/1997 | Ji et al. | |
| 5,623,601 A | 4/1997 | Vu | |
| 5,625,693 A | 4/1997 | Rohatgi et al. | 380/23 |
| 5,638,446 A | 6/1997 | Rubin | |
| 5,666,411 A | 9/1997 | McCarty | |
| 5,673,316 A | 9/1997 | Auerbach et al. | |
| 5,675,711 A | 10/1997 | Kephart et al. | |
| 5,678,041 A | 10/1997 | Baker et al. | |
| 5,680,461 A | 10/1997 | McManis | |
| 5,692,047 A | 11/1997 | McManis | |
| 5,692,124 A | 11/1997 | Holden et al. | |
| 5,696,822 A | 12/1997 | Nachenberg | |
| 5,699,512 A | 12/1997 | Moriyasu et al. | |
| 5,720,033 A | 2/1998 | Ceo | |
| 5,724,425 A | 3/1998 | Chang et al. | |
| 5,740,248 A | 4/1998 | Fieres et al. | |
| 5,740,441 A | 4/1998 | Yellin et al. | |
| 5,748,960 A | 5/1998 | Fischer | 395/683 |
| 5,757,915 A | 5/1998 | Aucsmith et al. | |
| 5,761,421 A | 6/1998 | Van Hoff et al. | |
| 5,765,030 A | 6/1998 | Nachenberg et al. | |
| 5,765,205 A | 6/1998 | Breslau et al. | |
| 5,784,459 A | 7/1998 | Devarakonda et al. | |
| 5,787,175 A | 7/1998 | Carter | |
| 5,796,952 A | 8/1998 | Davis et al. | |
| 5,805,829 A * | 9/1998 | Cohen et al. | 709/202 |
| 5,809,230 A | 9/1998 | Pereira | |
| 5,815,709 A | 9/1998 | Waldo et al. | |
| 5,825,877 A | 10/1998 | Dan et al. | |
| 5,832,208 A | 11/1998 | Chen et al. | |
| 5,832,274 A | 11/1998 | Cutler et al. | |
| 5,842,002 A | 11/1998 | Schnurer et al. | |
| 5,842,040 A | 11/1998 | Hughes et al. | |
| 5,845,281 A | 12/1998 | Benson et al. | |
| 5,850,559 A | 12/1998 | Angelo et al. | |
| 5,854,916 A | 12/1998 | Nachenberg | |
| 5,859,966 A | 1/1999 | Hayman et al. | |
| 5,860,011 A | 1/1999 | Kolawa et al. | |
| 5,864,683 A | 1/1999 | Boebert et al. | |
| 5,867,651 A | 2/1999 | Dan et al. | |
| 5,878,258 A | 3/1999 | Pizi et al. | |
| 5,881,151 A | 3/1999 | Yamamoto | |
| 5,884,003 A | 3/1999 | Cloud et al. | 385/135 |
| 5,884,033 A | 3/1999 | Duvall et al. | |
| 5,889,943 A | 3/1999 | Ji et al. | |
| 5,889,952 A | 3/1999 | Hunnicutt et al. | |
| 5,892,904 A | 4/1999 | Atkinson et al. | |
| 5,894,516 A | 4/1999 | Brandenburg | |
| 5,911,043 A | 6/1999 | Duffy et al. | |
| 5,933,503 A | 8/1999 | Schell et al. | |
| 5,940,590 A | 8/1999 | Lynne et al. | |
| 5,944,821 A | 8/1999 | Angelo | 713/200 |
| 5,949,415 A | 9/1999 | Lin et al. | |
| 5,951,698 A | 9/1999 | Chen et al. | |
| 5,956,481 A | 9/1999 | Walsh et al. | |
| 5,958,050 A | 9/1999 | Griffin et al. | |
| 5,960,170 A | 9/1999 | Chen et al. | |
| 5,963,742 A | 10/1999 | Williams | |
| 5,964,889 A | 10/1999 | Nachenberg | |
| 5,974,549 A | 10/1999 | Golan | |
| 5,978,484 A | 11/1999 | Apperson et al. | |
| 5,978,840 A | 11/1999 | Nguyen et al. | |
| 5,983,267 A | 11/1999 | Shklar et al. | |
| 5,983,348 A | 11/1999 | Ji | |
| 5,987,123 A | 11/1999 | Scott et al. | |
| 5,987,610 A | 11/1999 | Franczek et al. | |
| 5,987,611 A | 11/1999 | Freund | |
| 5,991,810 A | 11/1999 | Shapiro et al. | |
| 6,021,510 A | 2/2000 | Nachenberg | |
| 6,049,671 A | 4/2000 | Slivka et al. | 395/712 |
| 6,058,482 A | 5/2000 | Liu | |
| 6,065,118 A | 5/2000 | Bull et al. | |
| 6,067,575 A | 5/2000 | McManis et al. | |
| 6,070,239 A | 5/2000 | McManis | |
| 6,073,175 A | 6/2000 | Tavs et al. | |
| 6,083,279 A | 7/2000 | Cuomo et al. | |
| 6,088,801 A | 7/2000 | Grecsek | |
| 6,088,803 A | 7/2000 | Tso et al. | |
| 6,092,147 A | 7/2000 | Levy et al. | |
| 6,092,194 A | 7/2000 | Touboul | |
| 6,125,390 A | 9/2000 | Touboul | |
| 6,128,774 A | 10/2000 | Necula et al. | |
| 6,148,083 A | 11/2000 | Fieres et al. | 380/255 |
| 6,148,401 A | 11/2000 | Devanbu et al. | |
| 6,154,842 A | 11/2000 | Van Peursem | |
| 6,154,844 A | 11/2000 | Touboul et al. | |
| 6,167,520 A | 12/2000 | Touboul | |
| 6,167,522 A | 12/2000 | Lee et al. | |

(56) References Cited

U.S. PATENT DOCUMENTS

| | | |
|---|---|---|
| 6,170,012 B1 | 1/2001 | Coss et al. |
| 6,170,057 B1 | 1/2001 | Inoue et al. |
| 6,175,924 B1 | 1/2001 | Arnold |
| 6,192,512 B1 | 2/2001 | Chess |
| 6,205,551 B1 | 3/2001 | Grosse |
| 6,230,288 B1 | 5/2001 | Kuo et al. |
| 6,253,323 B1 | 6/2001 | Cox et al. |
| 6,253,370 B1 | 6/2001 | Abadi et al. |
| 6,263,442 B1 | 7/2001 | Mueller et al. |
| 6,266,664 B1 | 7/2001 | Russell-Falla et al. |
| 6,266,773 B1 | 7/2001 | Kisor et al. |
| 6,272,641 B1 | 8/2001 | Ji |
| 6,275,937 B1 | 8/2001 | Hailpern et al. |
| 6,275,938 B1 | 8/2001 | Bond et al. |
| 6,317,868 B1 | 11/2001 | Grimm et al. |
| 6,321,334 B1 | 11/2001 | Jerger et al. |
| 6,324,685 B1 | 11/2001 | Balassanian |
| 6,336,140 B1 | 1/2002 | Elgressy et al. |
| 6,339,829 B1 | 1/2002 | Beadle et al. |
| 6,343,376 B1 | 1/2002 | Saxe et al. |
| 6,351,816 B1 | 2/2002 | Mueller et al. |
| 6,357,008 B1 | 3/2002 | Nachenberg |
| 6,367,012 B1 | 4/2002 | Atkinson et al. |
| 6,401,241 B1 | 6/2002 | Taylor |
| 6,418,444 B1 | 7/2002 | Raduchel et al. |
| 6,425,058 B1 | 7/2002 | Arimilli et al. |
| 6,434,668 B1 | 8/2002 | Arimilli et al. |
| 6,434,669 B1 | 8/2002 | Arimilli et al. |
| 6,449,723 B1 | 9/2002 | Elgressy et al. |
| 6,470,450 B1 | 10/2002 | Langford et al. |
| 6,473,800 B1 | 10/2002 | Jerger et al. |
| 6,480,962 B1 | 11/2002 | Touboul |
| 6,487,666 B1 | 11/2002 | Shanklin et al. |
| 6,505,300 B2 | 1/2003 | Chan et al. |
| 6,519,679 B2 | 2/2003 | Devireddy et al. |
| 6,526,565 B1 | 2/2003 | Nally |
| 6,560,774 B1 | 5/2003 | Gordon et al. |
| 6,567,917 B1 | 5/2003 | Ziese |
| 6,571,338 B1 | 5/2003 | Shaio et al. |
| 6,594,783 B1 | 7/2003 | Dollin et al. |
| 6,598,033 B2 | 7/2003 | Ross et al. |
| 6,604,143 B1 | 8/2003 | Nagar et al. |
| 6,622,247 B1 | 9/2003 | Isaak |
| 6,622,781 B2 | 9/2003 | Chou |
| 6,640,284 B1 | 10/2003 | Shaw et al. |
| 6,643,696 B2 | 11/2003 | Davis et al. |
| 6,668,325 B1 | 12/2003 | Collberg et al. |
| 6,691,230 B1 | 2/2004 | Bardon |
| 6,697,950 B1 | 2/2004 | Ko |
| 6,704,798 B1 | 3/2004 | Mogul |
| 6,721,721 B1 | 4/2004 | Bates et al. |
| 6,725,424 B1 | 4/2004 | Schwerdtfeger et al. |
| 6,732,179 B1 | 5/2004 | Brown et al. |
| 6,748,538 B1 | 6/2004 | Chan et al. |
| 6,772,214 B1 | 8/2004 | McClain et al. |
| 6,772,225 B1 | 8/2004 | Jennings, III et al. |
| 6,772,332 B1 | 8/2004 | Boebert et al. |
| 6,775,536 B1 | 8/2004 | Geiger et al. ............... 455/411 |
| 6,804,780 B1 | 10/2004 | Touboul |
| 6,829,746 B1 | 12/2004 | Schwerdtfeger et al. |
| 6,832,222 B1 | 12/2004 | Zimowski |
| 6,842,861 B1 | 1/2005 | Cox et al. |
| 6,886,013 B1 | 4/2005 | Beranek |
| 6,901,519 B1 | 5/2005 | Stewart et al. |
| 6,917,953 B2 | 7/2005 | Simon et al. |
| 6,917,960 B1 | 7/2005 | Decasper et al. |
| 6,944,772 B2 | 9/2005 | Dozortsev |
| 6,981,138 B2 | 12/2005 | Douceur et al. |
| 6,996,841 B2 | 2/2006 | Kadyk et al. |
| 6,996,845 B1 | 2/2006 | Hurst et al. ............... 726/25 |
| 7,039,946 B1 | 5/2006 | Binding |
| 7,047,369 B1 | 5/2006 | Gruper et al. |
| 7,051,164 B2 | 5/2006 | Smith |
| 7,052,822 B2 | 5/2006 | Goto ............... 430/283.1 |
| 7,058,822 B2 | 6/2006 | Edery et al. |
| 7,076,650 B1 | 7/2006 | Sonnenberg |
| 7,089,591 B1 | 8/2006 | Chi |
| 7,093,135 B1 | 8/2006 | Radatti et al. |
| 7,096,496 B1 | 8/2006 | Challener et al. |
| 7,103,714 B1 | 9/2006 | Jacobs et al. |
| 7,143,444 B2 | 11/2006 | Porras et al. |
| 7,181,725 B1 | 2/2007 | Posegga et al. |
| 7,185,210 B1 * | 2/2007 | Faden ............... 726/2 |
| 7,210,041 B1 | 4/2007 | Gryaznov et al. |
| 7,243,366 B2 | 7/2007 | Medvinsky et al. |
| 7,308,648 B1 | 12/2007 | Buchthal et al. |
| 7,321,970 B2 | 1/2008 | Watkins et al. |
| 7,343,604 B2 | 3/2008 | Grabarnik et al. |
| 7,350,204 B2 | 3/2008 | Lambert et al. |
| 7,363,361 B2 | 4/2008 | Tewari et al. |
| 7,363,493 B2 | 4/2008 | Dotan |
| 7,398,553 B1 | 7/2008 | Li |
| 7,409,718 B1 | 8/2008 | Hong et al. ............... 726/24 |
| 7,418,731 B2 | 8/2008 | Touboul |
| 7,418,732 B2 | 8/2008 | Campbell et al. |
| 7,434,260 B2 | 10/2008 | Hong et al. |
| 7,461,262 B1 | 12/2008 | O'Toole, Jr. |
| 7,467,304 B2 | 12/2008 | Bar-El et al. |
| 7,487,540 B2 | 2/2009 | Shipp |
| 7,493,658 B2 | 2/2009 | Shipp |
| 7,506,155 B1 | 3/2009 | Stewart et al. |
| 7,567,800 B2 | 7/2009 | Uematsu et al. |
| 7,568,114 B1 | 7/2009 | Schlafly |
| 7,574,738 B2 | 8/2009 | Daude et al. |
| 7,587,755 B2 | 9/2009 | Kramer ............... 726/4 |
| 7,613,918 B2 | 11/2009 | Ben-Itzhak ............... 713/150 |
| 7,613,926 B2 | 11/2009 | Edery et al. |
| 7,620,733 B1 | 11/2009 | Tzakikario et al. |
| 7,627,896 B2 | 12/2009 | Herrmann |
| 7,636,851 B2 | 12/2009 | Hamblin et al. |
| 7,636,945 B2 | 12/2009 | Chandnani et al. |
| 7,640,427 B2 | 12/2009 | Callas et al. |
| 7,647,633 B2 | 1/2010 | Edery et al. |
| 7,660,902 B2 | 2/2010 | Graham et al. |
| 7,694,135 B2 | 4/2010 | Rowan et al. |
| 7,694,323 B2 | 4/2010 | LaJoie et al. |
| 7,694,328 B2 | 4/2010 | Joshi et al. |
| 7,698,549 B2 | 4/2010 | Thornton et al. |
| 7,735,138 B2 | 6/2010 | Zhao |
| 7,752,242 B1 | 7/2010 | Satish et al. ............... 707/826 |
| 7,756,996 B2 | 7/2010 | Touboul |
| 7,757,289 B2 | 7/2010 | Gruzman et al. |
| 7,761,594 B1 | 7/2010 | Mowat |
| 7,761,605 B1 | 7/2010 | Rothwell et al. |
| 7,774,619 B2 | 8/2010 | Paaske et al. |
| 7,797,727 B1 | 9/2010 | Miller et al. ............... 726/1 |
| 7,805,758 B2 | 9/2010 | Hasegawa et al. |
| 7,822,974 B2 | 10/2010 | Kinser et al. |
| 7,849,306 B2 | 12/2010 | Takeshima et al. |
| 7,865,961 B2 | 1/2011 | Hasegawa et al. |
| 7,930,738 B1 | 4/2011 | Petersen ............... 726/16 |
| 7,975,305 B2 | 7/2011 | Rubin et al. |
| 7,984,304 B2 | 7/2011 | Waldspurger et al. |
| 7,984,479 B2 | 7/2011 | Brabson et al. |
| 8,015,182 B2 | 9/2011 | Yuval et al. |
| 8,078,740 B2 | 12/2011 | Franco et al. |
| 8,079,086 B1 | 12/2011 | Edery et al. |
| 8,126,866 B1 | 2/2012 | Barton et al. |
| 8,141,154 B2 | 3/2012 | Gruzman et al. ............... 726/22 |
| 8,225,392 B2 | 7/2012 | Dubrovsky |
| 8,225,408 B2 | 7/2012 | Rubin et al. |
| 8,244,910 B2 | 8/2012 | Davis |
| 8,281,401 B2 | 10/2012 | Pennington et al. |
| 8,321,662 B2 | 11/2012 | Hazlewood et al. |
| 8,347,392 B2 | 1/2013 | Chess et al. |
| 8,364,951 B2 | 1/2013 | Peterka et al. |
| 8,374,958 B2 | 2/2013 | Blott et al. |
| 8,375,423 B2 | 2/2013 | Hays et al. ............... 726/5 |
| 8,402,012 B1 | 3/2013 | Herz et al. |
| 8,424,090 B2 | 4/2013 | Kang et al. ............... 726/24 |
| 8,438,499 B2 | 5/2013 | Dixon et al. |
| 8,522,350 B2 | 8/2013 | Davenport et al. ............... 726/24 |
| 8,677,494 B2 | 3/2014 | Edery et al. |
| 2001/0025311 A1 | 9/2001 | Arai et al. |

(56) References Cited

U.S. PATENT DOCUMENTS

| | | |
|---|---|---|
| 2002/0026511 A1 | 2/2002 | Garcia-Luna-Aceves et al. |
| 2002/0059144 A1 | 5/2002 | Meffert et al. |
| 2002/0059157 A1 | 5/2002 | Spooner et al. |
| 2002/0065775 A1 | 5/2002 | Monaghan |
| 2002/0065776 A1 | 5/2002 | Calder et al. |
| 2002/0066024 A1 | 5/2002 | Schmall et al. |
| 2002/0073330 A1 | 6/2002 | Chandnani et al. |
| 2002/0099829 A1 | 7/2002 | Richards et al. |
| 2002/0165912 A1 | 11/2002 | Wenocur et al. |
| 2002/0198953 A1 | 12/2002 | O'Rourke et al. |
| 2003/0009571 A1 | 1/2003 | Bavadekar |
| 2003/0014662 A1 | 1/2003 | Gupta et al. |
| 2003/0028616 A1 | 2/2003 | Aoki et al. |
| 2003/0046412 A1 | 3/2003 | Tsunoda et al. |
| 2003/0063752 A1 | 4/2003 | Medvinsky et al. |
| 2003/0074190 A1 | 4/2003 | Allison |
| 2003/0097582 A1 | 5/2003 | Audebert et al. |
| 2003/0097591 A1 | 5/2003 | Pham et al. |
| 2003/0101358 A1 | 5/2003 | Porras et al. |
| 2003/0154265 A1 | 8/2003 | Raffaele et al. |
| 2003/0172291 A1 | 9/2003 | Judge et al. |
| 2003/0191801 A1 | 10/2003 | Paul |
| 2003/0208490 A1 | 11/2003 | Larrea et al. |
| 2003/0225883 A1 | 12/2003 | Greaves et al. |
| 2004/0006706 A1 | 1/2004 | Erlingsson .................. 713/200 |
| 2004/0015538 A1 | 1/2004 | Agarwalla et al. |
| 2004/0015723 A1 | 1/2004 | Pham et al. |
| 2004/0016948 A1 | 1/2004 | Lin |
| 2004/0039924 A1 | 2/2004 | Baldwin et al. |
| 2004/0054854 A1 | 3/2004 | Thiyagaranjan et al. |
| 2004/0073668 A1 | 4/2004 | Bhat et al. |
| 2004/0073811 A1 | 4/2004 | Sanin |
| 2004/0088425 A1 | 5/2004 | Rubinstein et al. |
| 2004/0107363 A1 | 6/2004 | Monteverde |
| 2004/0111413 A1 | 6/2004 | Birbo et al. |
| 2004/0117426 A1 | 6/2004 | Rudkin et al. |
| 2004/0117623 A1 | 6/2004 | Kalogridis et al. |
| 2004/0122926 A1 | 6/2004 | Moore et al. |
| 2004/0133520 A1 | 7/2004 | Callas et al. |
| 2004/0148281 A1 | 7/2004 | Bates et al. |
| 2004/0158741 A1 | 8/2004 | Schneider |
| 2004/0230744 A1 | 11/2004 | Teh |
| 2004/0243839 A1 | 12/2004 | Bhatia et al. |
| 2004/0249965 A1 | 12/2004 | Huggins et al. |
| 2005/0021791 A1 | 1/2005 | Sakiyama et al. ............ 709/229 |
| 2005/0050338 A1 | 3/2005 | Lang et al. |
| 2005/0114653 A1 | 5/2005 | Sudia |
| 2005/0172338 A1 | 8/2005 | Sandu et al. |
| 2005/0193429 A1 | 9/2005 | Demopoulos et al. |
| 2005/0246383 A1 | 11/2005 | Desai et al. |
| 2006/0031207 A1 | 2/2006 | Bjamestam et al. |
| 2006/0031352 A1 | 2/2006 | Marston et al. |
| 2006/0048224 A1 | 3/2006 | Duncan et al. |
| 2006/0143442 A1 | 6/2006 | Smith |
| 2006/0236392 A1 | 10/2006 | Thomas et al. |
| 2006/0294366 A1 | 12/2006 | Nadalin et al. |
| 2007/0011739 A1 | 1/2007 | Zamir et al. |
| 2007/0016770 A1 | 1/2007 | Dumitru |
| 2007/0113282 A1 | 5/2007 | Ross |
| 2007/0134082 A1 | 6/2007 | Blomgren et al. |
| 2008/0066160 A1 | 3/2008 | Becker et al. |
| 2008/0083012 A1 | 4/2008 | Yu et al. ......................... 726/1 |
| 2009/0125612 A1 | 5/2009 | Rabetge et al. |
| 2009/0193497 A1 | 7/2009 | Kikuchi et al. .................. 726/1 |
| 2010/0195909 A1 | 8/2010 | Wasson et al. |
| 2011/0099621 A1 | 4/2011 | Lizarraga et al. |
| 2012/0117651 A1 | 5/2012 | Edery et al. |

FOREIGN PATENT DOCUMENTS

| | | |
|---|---|---|
| EP | 0909072 | 4/1999 |
| EP | 0909075 | 4/1999 |
| EP | 1021276 | 7/2000 |
| EP | 1 058 199 A2 | 12/2000 |
| EP | 1091276 | 4/2001 |
| EP | 1119151 | 7/2001 |
| EP | 1132796 | 9/2001 |
| IL | 120420 | 12/1999 |
| IL | 129729 | 5/2005 |
| JP | 08-263447 | 10/1996 |
| JP | H 1021134 | 1/1998 |
| JP | 01-256045 A | 9/2001 |
| JP | 2002183019 | 6/2002 |
| JP | 02-358229 | 12/2002 |
| JP | 02-358253 A | 12/2002 |
| JP | 2002373108 | 12/2002 |
| JP | 2003177991 | 6/2003 |
| JP | 3952315 | 5/2007 |
| WO | WO 93/25024 | 12/1993 |
| WO | WO 95/27249 | 10/1995 |
| WO | WO 95/33237 | 12/1995 |
| WO | WO 97/12322 | 4/1997 |
| WO | WO 97/31698 | 9/1997 |
| WO | WO 98/21683 | 5/1998 |
| WO | WO 98/31124 | 7/1998 |
| WO | WO 98/40993 | 9/1998 |
| WO | WO 99/16225 | 4/1999 |
| WO | WO 99/35583 | 7/1999 |
| WO | WO 00/08793 | 2/2000 |
| WO | WO 01/22682 A2 | 3/2001 |
| WO | WO 01/25882 | 4/2001 |
| WO | WO 01/88673 | 11/2001 |
| WO | WO 01/98907 | 12/2001 |
| WO | WO 01/99374 | 12/2001 |
| WO | WO 02/13479 | 2/2002 |
| WO | WO 2004/063948 | 7/2004 |
| WO | WO 2006/025050 | 3/2006 |

OTHER PUBLICATIONS

U.S. Appl. No. 60/163,361, filed Nov. 3, 1999, Geiger, et al.
U.S. Appl. No. 60/156,872, filed Sep. 39, 1999, Huang, et al.
U.S Appl. No. 60/104,072, filed Oct. 13, 1998, Hicken.
U.S. Appl. No. 60/093,559, filed Jul. 21, 1998, Maloney, et al.
ThunderByte Antivirus for Windows.
InterScan Virus Wall from Trend Micro.
ViruSafe from Eliashim.
Intel LANProtect from Intel.
The Java Security Manager from Sun MicroSystems.
McAfee Web Shield.
McAfee WebScan.
McAfee VirusScan.
Dr. Solomon's Antivirus Toolkit for Windows 95.
Dr. Solomon's Antivirus Tookit for Windows NT.
Dr. Solomon's WinGuard.
Dr. Solomon's Virus Guard.
Dr. Solomon's Virus Shield.
Dr. Solomon's Virex.
Dr. Solomon's "Merlin" Anti-Virus Engine.
Dr. Solomon's/McAfee "Olympus" Anti-Virus Engine.
Norton AntiVirus™ for Windows® 95 User's Guide, Published by Symantec in 1995 (179 pp.).
Jaeger, et al., "Building Systems that Flexibly Control Downloadable Executable Content," Proceedings of the Sixth USENIX UNIX Security Symposium, Jul. 1996 (19 pp.).
Rasmusson, Andreas and Jansson, Sverker,"Personal Security Assistance for Secure Internet Commerce," Sep. 16, 1996 (12 pp.), Available as dvi, ps, html, at http://www.sics.se/~ara/papers/NSP96.html.
Bharat, et al., "Migratory Applications," Nov. 15, 1995 (10 pp.).
Dean, Drew, et al., "Java Security: From HotJava to Netscape and Beyond," 1996 IEEE Symposium on Security and Privacy, May 6, 1996 (11 pp.).
Sterbenz, Andreas, "An Evaluation of the Java Security Model," IEEE, Dec. 1996 (13 pp.).
Fritzinger, J. Steven, et al., Java Security, Sun Microsystems, Dec. 1996 (7 pp.).
Bank, Joseph A., "Java Security," Dec. 8, 1995 (14 pp.).
Chappell, "Understanding ActiveX and OLE: A Guide for Developers and Managers (Strategic Technology)," Sep. 1, 1996, Microsoft Press (91 pp.).

(56) References Cited

OTHER PUBLICATIONS

Crosbie, et al., "Active Defense of a Computer System Using Autonomous Agents," Feb. 15, 1995 (14 pp.).
"Trend Micro's Virus Protection Added to Sun Microsystems Netra Internet Servers," Business Wire, Oct. 1, 1996, available at http://www.cs.indiana.edu/~kinzler/pubs/viruswall.html.
"Symantec Announces Norton Antivirus 2.0 for Windows NT," Symantec Corporation press release, Sep. 16, 1996, available at http://www.symantec.com/about/news/release/article.jsp?prid=19960916_01.
"Dark Avenger Mutation Engine No Threat to Protected PCs," McAfee, Inc., press release, May 11, 1992, available at http://securitydigest.org/virus/mirror/www.phreak.orgvirus1/1992/vin105.191.
Gryaznov, D. O., "Scanners of the Year 2000: Heuristics," Proceedings of the Fifth International Virus Bulletin Conference, pp. 225-234 (1995), available at http://vxheavens.com/lib/adg00.html.
"Symantec Announces Norton Internet Email Gateway at Internet World—Booth # 369 on Dec. 11, 12, and 13," Symantec Corporation press release, Dec. 11, 1996, available at http://www.symantec.com/about/news/release/article.jsp?prid=19961211_03.
"Internet Security Gets Less Costly and Easier to Manage: Integralis Announces MIMEsweeper Compatible with Check Point FireWall-1 on Single NT Server; E-mail virus detection and content management can reside on Firewall server, saving money and supports costs" [online], The Free Library, Sep. 16, 1996 [retrieved on Mar. 20, 2012], 4 pp., Retrieved From the Internet: http://www.thefreelibrary.com/Internet+Security+gets+Less+Costly+and+Easier+to+Manage%3a+Integralis...a018675791%22%3Einternet%20Security%20gets%20Less%20Costly%20and%20Easier%20to%20Manage:%20Integralis%20Announces%20MIMEsweeper%20Compatible%20with%20Check%20Point%20FireWall-1%20on%20Single%20NT%20Server;%20E-mail%20virus%20detection%20and%20content%20management%20can%20reside%20on%20Firewall%20server,%20saving%20money%20and%20support%20costs (Current Link: http://www.thefreelibrary.com/Internet Security gets Less Costly and Easier to Manage: Integralis . . . -a018675791).
"The Java Language Specification," by Gosling, et al. (1996).
"The Java Virtual Machine Specification," by Tim Lindholm and Frank Yellin (1997).
"Java Security and a Firewall Extension for Authenticity Control of Java Applets," by Magnus Johansson (Jan. 29, 1997).
"Static Analysis of Programs With Application to Malicious Code Detection," by Raymond Lo, Dissertation, University of California, 193 pp. (1992).
File History for U.S. Pat. No. 6,804,780.
"Virus Detection Alternatives," by Patrick Min, http://vx.netlux.org/lib/apm00.html (Jul. 1992).
"Dynamic Detection and Classification of Computer Viruses Using General Behaviour Patterns," by LeCharlier, et al. (Sep. 1995).
The Giant Black Book of Computer Viruses by Mark Ludwig (1995).
HotJava: The Security Story.
"The Java Filter," [retrieved on Jan. 2, 2011], 1 p., Retrieved from the Internet: http://www.cs.princeton.edu/sip/JavaFilter/index.html.
"Improved JavaScript and Java Screening Function," by Claunch (May 4, 1996), available at http://groups.google.com/group/muc.lists.firewalls/msg/96bc8043476ab0b7.
"New Version of Java, JavaScript, ActiveX Screening," by Claunch (Jul. 3, 1996), availablehttp://groups.google.com/group/muc.lists.firewalls/msg/41a45c2a9d5373f2.
"Identifying and Controlling Undesirable Program Behaviors," by Maria King, Proceedings of the 14th National Computer Security Conference, 1991.
"PACL's: An Access Control List Approach to Anti-Viral Security," by Wichers, et al., in USENIX Workshop Proceedings, UNIX Security II, pp. 71-82, 1990.
Endrijonas, Janet, "RX PC The Anti-Virus Handbook," Published in the U.S. in 1993 by TAB Books, a division of McGraw-Hill, Inc. (201 pp.).
"Secure Code Distribution," by X. Nick Zhang (Jun. 1997).
Omura, Jim K., "Novel Applications of Cryptography in Digital Communications," IEEE Communications Magazine, pp. 21-29, May 1990.
Okamoto, E., et al., "ID-Based Authentication System for Computer Virus Detection," IEEE/IEE Electronic Library online, Electronics Letters, vol. 26, Issue 15, ISSN 0013-5194, Jul. 19, 1990, Abstract and pp. 1169-1170, URL: http://iel.ihs.com:80/cgibin/iel_cgi?se...2ehts%26ViewTemplate%3ddocview%5fb%2ehts.
IBM AntiVirus User's Guide Version 2.4, International Business Machines Corporation, pp. 6-7, Nov. 15, 1995.
Leach, Norvin, et al., "IE 3.0 Applets Will Earn Certification," PC Week, vol. 13, No. 29, 2 pp., Jul. 22, 1996.
"Finjan Software Releases SurfinBoard, Industry's First JAVA Security Product for the World Wide Web," Article published on the Internet by Finjan Software Ltd., 1 p., Jul. 29, 1996.
"Powerful PC Security for the New World of JAVA™ and Downloadables, Surfin Shield™," Article published on the Internet by Finjan Software Ltd., 2 pp., 1996.
Microsoft® Authenticode Technology, "Ensuring Accountability and Authenticity for Software Components on the Internet," Microsoft Corporation, including Abstract, Contents, Introduction, and pp. 1-10, Oct. 1996.
"Finjan Announces a Personal JAVA™ Firewall for Web Browsers—the SurfinShield™ 1.6 (formerly known as SurfinBoard)," Press Release of Finjan Releases SurfinShield 1.6, 2 pp., Oct. 21, 1996.
Company Profile, "Finjan-Safe Surfing. The Java Security Solutions Provider," Article published on the Internet by Finjan Software Ltd., 3 pp., Oct. 31, 1996.
"Finjan Announces Major Power Boost and New Features for SurfinShield™ 2.0," Las Vegas Convention Center/Pavillion 5 P5551, 3 pp., Nov. 18, 1996.
"Java Security: Issues & Solutions," Article published on the Internet by Finjan Software Ltd., 10 pp., 1996.
"Products," Article published on the Internet, "Revolutionary Security for a New Computing Paradigm" regarding SurfinGate™, 7 pp.
Mark LaDue, "Online Business Consultant: Java Security: Whose Business Is It?," Article published on the Internet, Home Page Press, Inc., 4 pp., 1996.
Web Page Article, "Frequently Asked Questions About Authenticode," Microsoft Corporation, last updated Feb. 17, 1997, printed Dec. 23, 1998, URL: http://www.microsoft.com/workshop/security/authcodee/signfaq.asp#9, pp. 1-13.
Zhang, X. N., "Secure Code Distribution," IEEE/IEE Electronic Library online, Computer, vol. 30, Issue 6, pp. 76-79, Jun. 1997.
Binstock, Andrew, "Multithreading, Hyper-Threading, Multiprocessing: Now, What's the Difference?," http://www.intel.com/cd/ids/developer/asmo-na/eng/20456.htm, Pacific Data Works, LLC, downloaded Jul. 7, 2008, 7 pp.
VirexPC Version 2.0 or later from Microcom.
AntiVirus Kit From 1st Aide Software.
Symantec Antivirus of the Mac version 3.0 or later.
Art of Computer Virus Research and Defense by Peter Szor (Feb. 2005).
"Process Execution Controls as a Mechanism to Ensure Consistency," by Eugene Bacic (1990).
"A Flexible Access Control Service for Java Mobile Code," by Corradi, et al., IEEE, pp. 356-365 (2000).
"Microsoft Authenticode Analyzed," by Rohit Khare (Jul. 22, 1996).
"Java Security: Whose Business Is It?," by Mark LaDue (1996).
"Mobile Code Security," by Rubin, et al., IEEE Internet, pp. 30-34, Dec. 1998.
"Protecting Data From Malicious Software," by Schmid, et al., Proceeding of the 18th Annual Computer Security Applications Conference, pp. 1-10, 2002.
"Security in the Large: Is Java's Sandbox Scalable?," by Zhong, et al. (Apr. 1998).
"A Domain and Type Enforcement UNIX Prototype," by Badger, et al., Proceedings of the Fifth USENIX UNIX Security Symposium, Salt Lake City, Utah (Jun. 1995), 15 pp.

(56) References Cited

OTHER PUBLICATIONS

"Heuristic Anti-Virus Technology," by Frans Veldman, Aug. 20, 2010.
"Standards for Security in Open Systems," by Warwick Ford (1989).
"Secure File Transfer Over TCP/IP," by Brown, et al., IEEE Region 10 Conference, (Nov. 11-13, 1992).
"Using CASE Tools to Improve the Security of Applications Systems," by Hosmer, et al. (1988).
"Miro: Visual Specification of Security," by Heydon, et al., IEEE Transactions on Software Engineering, vol. 16. No. 10, 13 pp. (Oct. 1990).
"An Evaluation of Object-Based Programming with Visual Basic," by Dukovic, et al. (1995).
"Visual Basic 5.0 Significantly Improved," by W. Dennis Swift, IEEE Antennas and Propagation Magazine, vol. 39, No. 3, 2 pp. (Jun. 1997).
"Development of an Object Oriented Framework for Design and Implementation of Database Powered Distributed Web Applications With the DEMETER Project as a Real-Life Example," by Goschka, et al. (1997).
"Detecting Unusual Program Behavior Using the Statistical Component of the Next-generation Intrusion Detection Expert System (NIDES)," by Anderson, et al. (May 1995).
"A Generic Virus Scanner in C++," by Kumar, et al., Proceedings of the 8th Computer Security Applications Conference, IEEE Press, (Sep. 17, 1992).
"A Model for Detecting the Existence of Software Corruption in Real Time," by Voas, et al., Computers & Security, 12, pp. 275-283 (1993).
"Protection Against Trojan Horses by Source Code Analysis," by Saito, et al., Electronics and Communications in Japan, Part 3, vol. 77, No. 1, 1994, Translated from Denshi Tsushin Gakkai Ronbunshi, vol. 76-A, No. 3, (Mar. 1993), pp. 466-472.
"Information Agents for Automated Browsing," by Dharap, et al. (1996).
"Static Analysis Virus Detection Tools for Unix Systems," by Kerchen, et al., 13th National Computer Security Conference, vol. 1, Washington, DC, Oct. 1-4, 1990, 17 pp.
"Managing Trust in an Information-Labeling System," by Blaze, et al. (Nov. 4, 1996).
"A Guide to the Selection of Anti-Virus Tools and Techniques," by Polk, et al. (Dec. 2, 1992).
"An Integrated Toolkit for Operating System Security," by Rabin, et al., Harvard University Aiken Computation Laboratory Technical Report, 55 pp. (Aug. 1988).
"Intel Launches Virus Counterattack," by Charles Bruno (Aug. 1992).
Intel LANProtect Software User's Guide, Intel Corporation (1992).
"Parents Can Get PC Cruise Control," by George Mannes (Jul. 1996).
"A New Technique for Detecting Polymorphic Computer Viruses," by Carey Nachenberg, Thesis, University of California, Los Angeles (1995).
"Heuristic Scanners: Artificial Intelligence," by Righard Zwienenberg, Virus Bulletin International Conference, 9 pp. (Sep. 20-22, 1995).
Intel LANProtect, 30-Day Test Drive Version User's Manual, 35 pp., 1992.
Earl Boebert's post to the greatcircle firewalls mailing list. Taken from http://www.greatcircle.com/lists/firewalls/archive/firewalls.199410 (Oct. 16, 1994).
CSL Bulletin: "Connecting to the Internet: Security Considerations." Taken from http://csrc.nist.gov/publications/nistbul/cs193-07.txt (Jul. 1993).
FAQ: Interscan Viruswall. Taken from http://web.archive.org/web/19970605050331/www.antivirus.com/faq/finterscanfaq.html (last updated Aug. 8, 1996).
"Network Security and SunScreen SPF-100: Technical White Paper," Sun Microsystems, 1995.
"Why Do We Need Heuristics?," by Frans Veldman, Virus Bulletin Conference, 6 pp. (Sep. 1995).

"Leading Content Security Vendors Announce Support for Check Point Firewall1.3.0; New Partners for Anti-Virus Protection, URL Screening and Java Security," Business Wire, Oct. 7, 1996, available at http://www.allbusiness.com/technology/computernetworks-computer-networksecurity 17274315-1.html#ixzz1gkbKf4g1.
"McAfee Introduces Web Shield; Industry's First Secure Anti-Virus Solution for Network Firewalls; Border Network Technologies and Secure Computing to Enter into Web Shield OEM Agreements," Business Wire, May 14, 1996, available at http://findarticles.comip/articles.mi_mOEIN1is_1996_May_14/ai_18283456/.
"Trend Micro Announces Virus and Security Protection for Microsoft Proxy Server; Also Blocks Java Applets, ActiveX," Business Wire, Oct. 29, 1996, available at http://www.thefreelibrary.com/Trend+Micro+announces+virus+and+security+protection+for+Microsoft-aO18810512.
Finjan's Opposition to Websense's Renewed Motion for Judgment as a Matter of Law, dated Dec. 21, 2012, filed in *Finjan, Inc.* v. *Symantec Corp., Sophos, Inc., and Websense, Inc.*, CA. No. 10-cv-593 (OMS) (Redacted Dec. 26, 2012).
Declaration of Paul Batcher Re Websense, Inc.'s Proffer of Evidence Re Laches, dated Dec. 19, 2012, filed in *Finjan, Inc.* v. *Symantec Corp., Sophos, Inc., and Websense, Inc.*, CA. No. 10-cv-593 (OMS) (Redacted Dec. 26, 2012).
Opposition to Symantec's Motion for JMOL, dated Dec. 17, 2012, filed in *Finjan, Inc.* v. *Symantec Corp., Sophos, Inc., and Websense, Inc.*, CA. No. 10-cv-593 (OMS) (Redacted Dec. 26, 2012).
"WWW Proxy to Cut Off Java," by Carl Claunch (Apr. 12, 1996), available at http://groups.google.com/group/muc.lists.firewalls/msg/38bb246b7eb3bec3.
"Combating Viruses Heuristically," by Franz Veldman, Virus Bulletin Conference 67-76 (Sep. 1993).
"Anti-Virus Tools and Techniques for Computer Systems," by Polk, et al., Noyes Data Corporation, Park Ridge, New Jersey, pp. 12-27, Copyright 1995 (with Cover and Copyright Pages—18 pp.).
"Dynamic Detection and Classification of Computer Viruses Using General Behaviour Patterns," by LeCharlier, et al. (Jul. 2, 1995) (22 pp.).
"Blocking Java Applets at the Firewall," by Martin, et al., 11 pp., Available at http://www.cs.bu.edu/techreports/pdf/1996-026-Java-firewalls.pdf (1997).
"Virus: Detection and Elimination," by Rune Skardhamar, Academic Press, Inc., pp. 33-49, Copyright 1996 (with cover and copyright page—18 pp.).
Hruska, Jan, "Computer Viruses and Anti-Virus Warfare (Second Revised Edition)," Ellis Horwood, pp. 87-95, Copyright 1992 (with cover and copyright page—11 p.).
"Active Content Security," by Brady, et al. (Dec. 13, 1999).
"Low Level Security in Java," by Frank Yellin, 13 pp., [retrieved on Dec. 15, 2011], Retrieved from the Internet: mhtml:file//S:\DSFR_DATA/Data03/030052/01_Finjan_v._Symantec_(DDEL-00593)Prio . . . .
"Email With a Mind of its Own: The Safe-Tcl Language for Enabled Mail," by Nathaniel Borenstein.
"Mobile Agents: Are They a Good Idea?," by Chess, et al. (Dec. 21, 1994).
"Remote Evaluation," by Stamos, et al., ACM Transaction on Programming Languages and Systems, vol. 12, No. 4 (Oct. 1990).
"Active Message Processing: Messages as Messengers," by John Vittal (1981).
"Programming Languages for Distributed Computing Systems," by Bal, et al., ACM Computing Surveys, vol. 21, No. 3 (Sep. 1989).
"Scripts and Agents: The New Software High Ground," by John Ousterhout (Oct. 20, 1995).
The HotJava Browser: A White Paper, dated Dec. 15, 2011, 5 pp.
The Java Virtual Machine Specification, Sun Microsystems (Aug. 21, 1995).
"Security of Web Browser Scripting Languages: Vulnerabilities, Attacks and Remedies," by Anupam, et al. (Jan. 1998).
"ActiveX and Java: The Next Virus Carriers?," [retrieved on Jan. 2, 2011], 5 pp., Retrieved from the Internet: http://vx.netlux.org/lib/static/vdat/cpactive.htm.
"Gateway Level Corporate Security for the New World of Java and Downloadables" (1996).

(56) References Cited

OTHER PUBLICATIONS

"Practical Domain and Type Enforcement for UNIX," by Badger, et al. (1995), 12pp.
"A Sense of Self for Unix Processes," by Forrest, et al. (1996), 9 pp.
"Antivirus Scanner Analysis 1995," by Marko Helenius, 1995 [retrieved on Dec. 15, 2011], 7 pp., Retrieved from the Internet: http://www.cs.uta.fi/~cschcma/public/vru/documents/test1995.txt.
"State Transition Analysis: A Rule-Based Intrusion Detection Approach," by Ilgun, et al., IEEE Transactions on Software Engineering, vol. 21, No. 3 (Mar. 1995).
"Automated Detection of Vulnerabilities in Privileged Programs by Execution Monitoring," by Ko, et al. (1994).
"Execution Monitoring of Security-Critical Programs in Distributed Systems: A Specification-Based Approach," by Ko, et al. (1997).
"Classification and Detection of Computer Intrusions," by Sandeep Kumar, Thesis, Purdue University (Aug. 1995).
ThunderByte Anti-Virus Utilities User Manual (1995), 199pp.
Doyle, et al., "Microsoft Press Computer Dictionary," Microsoft Press, 2nd Edition, pp. 137-138, 1993.
"Process Execution Controls: Revisited," by Eugene Bacic (1990).
Schmitt, D.A., ".EXE Files, OS-2 Style," PC Tech Journal, vol. 6, No. 11, p. 76(13), Nov. 1988.
International Search Report for Application No. PCT/IB97/01626, dated May 14, 1998, 3 pp.
Supplementary European Search Report for Application No. EP 97 950351, dated Nov. 17, 2004, 2 pp.
File History for Canadian Application No. 2,275,771, 84 pp.
File History for European Application No. 97950351.3, 58 pp.
File History for Japanese Application No. 10-522345, 48 pp.
Order Construing the Terms of U.S. Pat. Nos. 6,092,194; 6,804,780; 7,058,822; 6,357,010; and 7,185,361, 4 pp., Dec. 11, 2007.
Plaintiff Finjan Software Ltd.'s Opening Claim Construction Brief, 38 pp., Sep. 7, 2007.
Defendant Secure Computing Corporation's Opening Claim Construction Brief, 46 pp., Sep. 7, 2007.
Plaintiff Finjan Software Ltd.'s Answering Claim Construction Brief (Public Version), 45 pp., Sep. 28, 2007.
Defendant Secure Computing Corporation's Responsive Claim Construction Brief (Public Version), 37 pp., Sep. 28, 2007.
Secure Computing Corporation's Disclosure of Prior Art Pursuant to 35 U.S.C. 282, 6 pp., Feb. 1, 2008.
Stang, David J., "Computer Viruses and Artificial Intelligence," Virus Bulletin Conference, pp. 235-257, Sep. 1995.
Johannsen, Magnus, "Java Security and a Firewall Extension for Authenticity Control of Java Applets," Thesis Proposal, Computer Science Department, University of Colorado at Colorado Springs, 5 pp., Jan. 29, 1997.
Joint Appendix of intrinsic and Extrinsic Evidence Regarding Claim Construction Briefing, vol. 1, Oct. 4, 2007.
Joint Appendix of intrinsic and Extrinsic Evidence Regarding Claim Construction Briefing, vol. 2, Oct. 4, 2007.
Final Joint Claim Construction Chart, Aug. 24, 2007.
Joint Post-Hearing Claim Construction Chart, Oct. 30, 2007.
Plaintiffs Trial Brief (Public Version), Jan. 14, 2008.
Marcionek, David, "A Complete ActiveX Web Control Tutorial," Available at http://www.codeproject.com/KB/COM/CompleteActiveX.aspx (2006).
Docket for *Finjan Software Ltd.* v. *Secure Computing Corporation, et al.*, U.S. District Court, District of Delaware (Wilmington), Civil Docket No. 1:06-cv-00369-GMS, 52 pp., retrieved on Oct. 24, 2008 from https://ecf.ded.uscourts.gov/cgibin/DktRpt.pl?6532182820_13655-L_567_0-1.
Docket for *Finjan Software Ltd.* v. *Aladdin Knowledge Systems, Inc., et al.*, U.S. District.Court, District of Delaware (Wilmington), Civil Docket No. 1:08-cv-00300-GMS, 5 pp., retrieved on Oct. 24, 2008 from https://ecfded.uscourts.gov/cgi-bin-DktRpt.pl?994267838982431-L_567_0-1.
Firewall Toolkit (FWTK) 2.0 Beta Release, 1996.
International Search Report for Application No. PCT/IL05/00915, 4 pp., dated Mar. 3, 2006.

Written Opinion for Application No. PCT/IL05/00915, 5 pp., dated Mar. 3, 2006 (mailing date).
International Search Report for Application No. PCT/IB01/01138, 4 pp., Sep. 20, 2002 (mailing date).
International Preliminary Examination Report for Application No. PCT/IB01/01138, 2 pp., dated Dec. 19, 2002.
Gerzic, Amer, "Write Your Own Regular Expression Parser," Nov. 17, 2003, 18 pp., Retrieved from the Internet: http://www.codeguru.com/Cpp/Cpp.cpp_mfc/parsing/article.php/c4093/.
Power, James, "Lexical Analysis," 4 pp., May 14, 2006, Retrieved from the Internet: http://www.cs.may.ie/~jpower/Courses/compilers/notes/lexical.pdf.
Sitaker, Kragen, "Rapid Genetic Evolution of Regular Expressions" [online], The Mail Archive, Apr. 24, 2004 (retrieved on Dec. 7, 2004), 5 pp., Retrieved on the Internet: http://www.mail-archive.com/kragen-tol@canonical.org/msg00097.html.
"Lexical Analysis: DFA Minimization & Wrap Up" [online], Fall, 2004 [retrieved on Mar. 2, 2005], 8 pp., Retrieved from the Internet: http://www.owlnet.rice.edu/~comp412/Lectures/L06LexWrapup4.pdf.
"Minimization of DFA" [online], [retrieved on Dec. 7, 2004], 7 pp., Retrieved from the Internet: http://www.cs.odu.edu/~toida/nerzic/390teched/regular/fa/min-fa.html.
"Algorithm: NFS → DFA" [online], copyright 1999-2001 [retrieved on Dec. 7, 2004], 4 pp., Retrieved from the Internet: http://rw4.cs.uni-sb.de/ganimal/GANIFA/page16_e.htm.
"CS 3813: Introduction to Formal Languages and Automata—State Minimization and Other Algorithms for Finite Automata," 3 pp., May 11, 2003, Retrieved from the Internet: http://www.cs.msstate.edu/~hansen/classes/3813fal101/slides/06Minimize.pdf.
Watson, Bruce W., "Constructing Minimal Acyclic Deterministic Finite Automata," [retrieved on Mar. 20, 2005], 38 pp., Retrieved from the Internet: http://www.win.tue.nl/~watson/2R870/downloads/madfa_algs.pdf.
Khare, R., "Microsoft Authenticode Analyzed" [online], Jul. 22, 1996 [retrieved on Jun. 25, 2003], 2 pp., Retrieved from the Internet: http://www.xent.com/FoRKarchive/smmer96/0338.html.
Moritz, R., "Why We Shouldn't Fear Java," Java Report, pp. 51-56, Feb. 1997.
Microsoft, "Microsoft ActiveX Software Development Kit" [online], Aug. 12, 1996 [retrieved on Jun. 25, 2003], pp. 1-6, Retrieved from the Internet: activex.adsp.or.jp/inetsdk/help/overview.htm.
D. Grune, et al., "Parsing Techniques: A Practical Guide," John Wiley & Sons, Inc., New York, New York, USA, pp. 1-326, 2000.
Power, James, "Notes on Formal Language Theory and Parsing," National University of Ireland, pp. 1-40, 1999.
Scott, et al., "Abstracting Application-Level Web Security," ACM, pp. 396-407, 2002.
Non-Final Office Action, dated Jul. 23, 2012, for U.S. Appl. No. 13/290,708, 10 pp.
Amendment and Response to Office Action (dated Jul. 23, 2012) Under 37 C.F.R. 1.111, filed Oct. 23, 2012, for U.S. Appl. No. 13/290,708, 9 pp.
Final Office Action, dated Jan. 7, 2013, for U.S. Appl. No. 13/290,708, 7 pp.
Judgment, dated Dec. 21, 2012, filed in *Finjan, Inc.* v. *Symantec Corp., Sophos, Inc., and Websense, Inc.*, CA No. 10-cv-593 (GMS).
Finjan's Opposition to Sophos' Renewed Motion for Judgment as a Matter of Law, dated Dec. 21, 2012, filed in *Finjan, Inc.* v. *Symantec Corp., Sophos, Inc., and Websense, Inc.*, CA No. 10-cv-593 (GMS).
Finjan's Opposition to Symantec's Motion for Judgment as a Matter of Law at the Close of Evidence, dated Dec. 21, 2012, filed in *Finjan, Inc.* v. *Symantec Corp., Sophos, Inc., and Websense, Inc.*, CA No. 10-cv-593 (OMS).
Chang, Chia-Hsiang, "From Regular Expressions to DFA's Using Compressed NFA's," Oct. 1992, 243 pp., http://www.cs.nyu.edu/web/Research/Theses/chang_chi-hsiang.pdf.
Order Granting/Denying Request for Ex Parte Reexamination for U.S. Appl. No. 90/008,684, dated Aug. 28, 2007, 11 pp.
Request for Ex Parte Reexamination Under 35 U.S.C. 302-307 and 37 C.F.R. 1.510 for U.S. Appl. No. 90/008,684, dated Jun. 6, 2007, 49 pp.

(56) References Cited

OTHER PUBLICATIONS

Request for Ex Parte Reexamination for U.S. Appl. No. 90/013,015, filed Oct. 7, 2013,38 pp.
Request for Ex Parte Reexamination for U.S. Appl. No. 90/013,016, filed Oct. 7, 2013,48 pp.
Request for Ex Parte Reexamination for U.S. Appl. No. 90/013,017, filed Oct. 7, 2013, 69 pp.
Notice of Appeal for Civil Action No. 10-593-GMS, filed Sep. 27, 2013, 54 pp.
Order Denying Request for Ex Parte Reexamination, dated Nov. 19, 2013, for U.S. Appl. No. 90/013,015, 16pp.
Order Granting Request for Ex Parte Reexamination, dated Nov. 19, 2013, for U.S. Appl. No. 90/013,016, 17pp.
"Release Notes for the Microsoft ActiveX Development Kit," Nov. 1996 (10 pp.).
"Part 2: Java Vs. VBS—Breadth of Runtime Environments and Security Make Java a Good Choice for the Internet," Nikkei Electronics, pp. 212-221, No. 658, Mar. 25, 1996.
Lo, Raymond W., et al., "Towards a Testbed for Malicious Code Detection," from the Lawrence Livermore National Laboratory, 9 pp., Feb. 25- Mar. 1, 1991.
"Java Blocking," by C. Claunch, dated Sep. 25, 1996, available at http://groups.google.com/goup/muc.lists.firewalls/msg/2a5ec02c00a37071.
F. M. Avolio and M. J. Ranum, "A Toolkit and Methods for Internet Firewalls," In Technical Summer Conference, pp. 37-44, Boston, Massachusetts, Jun. 1994, USENIX, available at http://citeseer.ist.psu.edu/ranum94toolkit.html.
Petition for Writ of Certiorari to the Supreme Court of the United States in *Finjan, Inc. v. United States Patent and Trademark Office*, Apr. 2013.
Brief for the Respondent in Opposition to Petition for Writ of Cert in *Finjan, Inc. v. United States Patent and Trademark Office*, Jul. 2013.
Notice of Intent to Issue Ex Parte Reexamination Certificate, dated Feb. 27, 2009, for U.S. Appl. No. 90/008,678, filed Jun. 6, 2007, 11 pp.
Amendment in Response to Non-Final Office Action dated May 8, 2008, filed Jul. 7, 2008, for U.S. Appl. No. 90/008,678, 27 pp.
Office Action in Ex Parte Reexamination, dated May 8, 2008, for U.S. Appl. No. 90/008,678, 18 pp.
Order Granting/Denying Request for Ex Parte Reexamination for U.S. Appl. No. 90/008,678, dated Aug. 28, 2007, 13 pp.
Request for Ex Parte Reexamination Under 35 U.S.C. 302-307 and 37 C.F.R. 1.510, for U.S. Appl. No. 90/008,678, dated Jun. 6, 2007, 67 pp.
Request for Ex Parte Reexamination Pursuant to 37 C.F.R. 1.501 for U.S. Appl. No. 90/009,175, dated Jun. 6, 2008, 75 pp.
Request for Inter Partes Reexamination Under 35 U.S.C. 311-318 for U.S. Appl. No. 95/001,836, 71 pp., dated Nov. 29, 2011.
Order Construing the Terms of U.S. Pat. Nos. 6,092,194 & 6,480,962, dated Feb. 29, 2012, 4 pp.
File History for U.S. Appl. No. 60/030,639, 33 pp., dated Nov. 8, 1996.
Plaintiff Finjan, Inc.'s Opening Claim Construction Brief, dated Nov. 21, 2011, 246 pp.
Tanenbaum, Andrew S., "Computer Networks," Third Edition, Prentice Hall, Inc., ISBN 0-13-349945-6, Copyright 1996, 9 pp.
Flanagan, David, "Java in a Nutshell, A Desktop Quick Reference," 2nd Edition, O'Reilly & Associates, Inc., ISBN 1-56592-262-X, Copyright 1997, 4 pp.
Complaint for Patent Infringement, *Finjan, Inc. v. Proofpoint, Inc. and Armorize Technologies, Inc.*, Case No. 4:13-cv-05808, dated Dec. 16, 2013, 40 pp.
Complaint for Patent Infringement, *Finjan, Inc. v. Blue Coat Systems, Inc.*, Case No. 3:13-cv-03999, dated Aug. 28, 2013, 36 pp.
Complaint for Patent Infringement, *Finjan, Inc. v. Websense, Inc.*, Case No. 3:13-cv-04398, dated Sep. 23, 2013, 27 pp.
Docket for Case No. 3:13-cv-03999, *Finjan, Inc. v. Blue Coat Systems, Inc.*, Updated Dec. 5, 2013, 9 pp.

Docket for Case No. 3:13-cv-04398, *Finjan, Inc. v. Websense, Inc.*, Updated Nov. 25, 2013, 7 pp.
Zhong, et al., "Security in the Large: Is Java's Sandbox Scalable?," Seventh IEEE Symposium on Reliable Distributed Systems, pp. 1-6, Oct. 1998.
Hopwood, David, "A Comparison Between Java and ActiveX Security," Network Security, Elsevier Science Ltd., pp. 15-20, Dec. 1997.
Ungureanu, Victoria, et al., "A Policy-Based Access Control Mechanism for the Corporate Web," 16th Annual Computer Security Applications Conference (ACSAC '00), IEEE, Dec. 11, 2000.
Harn, Lein, et al., "A Software Authentication System for Information Integrity," Computers & Security, 1992.
Pei, Cao, Jin, et al., "Active Cache: Caching Dynamic Contents on the Web," Middleware '98, Springer London, Mar. 1998.
Bharadvaj, Harini, et al., "An Active Transcoding Proxy to Support Mobile Web Access," Dept. of Computer Engineering & Computer Science, University of Missouri-Columbia, Nov. 1998.
Bharadvaj, Harini, et al., "An Active Transcoding Proxy to Support Mobile Web Access," Proceedings, Seventeenth IEEE Symposium, IEEE, 1998.
Chi, Chi-Hung and Wu, Yin, "An XML-Based Data Integrity Service Model for Web Intermediaries," Proceedings, 7th IWCW, Aug. 14, 2002.
Article, "Java: The Inside Story, We Interview Java's Creators to Find What They Had in Mind," Sun World Online, Jul. 1995.
Giles, James, et al., "Authentication for Distributed Web Caches," Computer Security—ESORICS 2002, Springer Berlin, Heidelberg, Oct. 16, 2002.
Mandar, Raje, "Behavior-Based Confinement of Untrusted Applications," Dept. of Computer Science, UC Santa Barbara, TRCS 99-12, pp. 1-96, Jan. 1999.
Check Point Software Technologies Ltd., Archived webpages regarding Content Security and Partners, Check Point Software, 1997.
Hassler, Vesna and Then, Oliver, "Controlling Applets' Behavior in a Browser," Computer Security Applications Conference, Proceedings of the 14th Annual IEEE.
Seltzer, Margo I., et al., "Dealing With Disaster: Surviving Misbehaved Kernel Extensions," Proceedings of the USENIX 2nd Symposium on Operating Systems Design and Implementation, Seattle Washington, Oct. 1996.
Golvers, Luc, "Delivery and Installation of Software: Disputes and the Burden of Proof, Information Systems Security," Chapman & Hall, May 31, 1996.
Emin Gün Sirer, et al., "Design and Implementation of a Distributed Virtual Machine for Networked Computers," Proceedings of the Seventeenth ACM Symposium on Operating Systems Principles, pp. 202-216, Dec. 5, 1999.
Dr. Solomon's Anti-Virus Toolkit (prerelease), PC Magazine, Nov. 21, 1995.
"DRAFT, Internet Component Download," Microsoft Corporation, Jan. 1996.
Evans, David and Twyman, Andrew, "Flexible Policy-Directed Code Safety," Proceedings of the 1999 IEEE Symposium on Security and Privacy (IEEE), May 12, 1999.
Jackson, Keith, "FluShot+," Virus Bulletin, Nov. 1989.
"HotJava Browser Version 1.0 Frequently Asked Questions," Sun Microsystems, Inc., Nov. 5, 1997.
"HotJava Browser Version 1.0 Website Product Information," Sun Microsystems, Inc., Jan. 12, 1998.
"HotJava Browser: A White Paper," Sun Microsystems, Inc., 1994.
"IBM WebSphere Edge Server for Multiplatforms Administration Guide, Version 2.0," IBM, Dec. 2001.
Braswell, Byron, et al., "IBM WebSphere Edge Server: New Features and Functions in Version 2, IBM Redbooks," IBM, Apr. 2002.
Chockler, Gregory V., et al., "Implementing a Caching Service for Distributed CORBA Objects," Middleware 2000, Springer Berlin, Heidelberg, Apr. 4, 2000.
Claunch, Carl V., "Improved JavaScript and Java Screening Function," May 4, 1996.
"Integralis Announces MIMEsweeper for NT Version 2.1," Business Wire, Feb. 20, 1996.
"Integralis Launches the Internet's First Anti-Virus Protection System," M2 Press WIRE, Jun. 30, 1995.

(56) References Cited

OTHER PUBLICATIONS

"Integralis Mimesweeper Scans Internet Mail for Viri Nasties," Computer Business Review, Jul. 18, 1995.
Ethington, Brent, "Introducing Microsoft Windows 95," Microsoft Press, 1995.
Shin, Insik and Mitchell, John C., "Java Bytecode Modification and Applet Security," Stanford CS Tech Report, 1998.
McGraw, Gary and Felten, Edward W., "Java Security: Hostile Applets, Holes, and Antidotes," John Wiley & Sons, Inc., 1997.
"JavaSoft JAR File Format Specification Version 1.0," Sun Microsystems, Inc., Aug. 8, 1996z.
"Jingle Bells, Jingle Bells," Virus Bulletin, Jan. 1996.
Greenberg, Ross M., "Know Thy Viral Enemy," BYTE, Jun. 1989.
Vigil, Henry, "Making the Internet Safe for E-Commerce," Datamation, Oct. 1996.
Sibert, W. Olin, "Malicious Data and Computer Security," National Information Systems Security Conference, Oct. 22, 1996.
"MIMEsweeper Administrator Guide," Integralis, 1995.
"MIMEsweeper Review, PC User," PC User, Oct. 1996.
"MIMESweeper Review, Secure Computing," Secure Computing, Sep. 1996.
Small, Christopher, "MiSFIT: A Freely Available Tool for Building Safe Extensible Systems," Harvard Computer Science Technical Reports, Jul. 1996.
Tardo, Joseph and Valente, Luis, "Mobile Agent Security and Telescript," Compcon '96, 'Technologies for the Information Superhighway' Digest of Papers (IEEE), Feb. 25, 1996.
Chander, Ajay, et al., "Mobile Code Security by Java Bytecode Instrumentation," Computer Science Dept., Stanford University, and Dept. of Computer and Information Science, University of Pennsylvania.
Greenberg, Ross M., "MS-DOS Anti-Virus Tools and Techniques or How I Stopped Worrying and Learned to Trust in Debuggers," Virus Bulletin Conference, Sep. 1991.
Cheng, Kai and Kambayashi, Yahiko, "Multicache-Based Content Management for Web Caching," Proceedings of the First International Conference on Web Information Systems Engineering, Nov. 2000.
"Netscape Proxy Server, Chapter 9: How Caching Works," Netscape Communications Corporation, 2000.
Stallings, William, "Network and Internetwork Security Principles and Practice," Prentice Hall, 1995.
Weaver, Alfred C., et al., "Network Edge Services," 28th Annual Conference of the Industrial Electronics Society, IEEE.
Norton AntiVirus for Windows 95, PC Magazine, Nov. 21, 1995.
Anupan, Joshi, "On Proxy Agents, Mobility, and Web Access," Mobile Networks and Applications 5, pp. 233-241, 2000.
Riggs, Roger, et al., "Pickling State in the Java System," Proceedings of the USENIX 1996 Conference on Object-Oriented Technologies, Toronto, Ontario, Canada, Jun. 1996.
Jaeger, Trent and Rubin, Aviel D., "Preserving Integrity in Remote File Location and Retrieval," Proceedings of the Symposium on Network and Distributed System Security (IEEE), Feb. 22, 1996.
Press Release: "Trend Micro Ships InterScan AppletTrap—Enterprise Java and ActiveX Security Software," Business Wire, Mar. 23, 1999.
Thorn, Tommy, "Programming Languages for Mobile Code," ACM Computing Surveys, vol. 29, No. 3, pp. 213-239, 1997.
Necula, George C., "Proof-Carrying Code, Design and Implementation," School of Computer Science, Carnegie Mellon University, Sep. 1996.
Pandey, Raju and Hashii, Brant, "Providing Fine-Grained Access Control for Mobile Programs Through Binary Editing," TR-98-08, California University, Davis Dept. of Computer Science, 1997.
Iglio, Pietro, et al., "Rule-Based Filtering for Java Applets," Proceedings of the 14th Annual Security Applications Conference (IEEE), Dec. 1998.
Iglio, Pietro, et al., "Rule-Based Filtering for Java Applets," Computer Security Applications Conference, Proceedings of the 14th Annual IEEE, Dec. 1998.
Kirtland, Mary, "Safe Web Surfing With the Internet Component Download Service," Microsoft Systems Journal, Jul. 1996.
Erlingsson, Ulfar and Scheider, Fred B., "SASI Enforcement of Security Policies: A Retrospective," Proceedings of the 1999 Workshop on New Security Paradigms, ACM, 1999, Sep. 23, 1999.
Rubin, Aviel D., "Secure Distribution of Electronic Documents in a Hostile Environment," Computer Communications, Jun. 6, 1995.
Hsiao, Hui-I. and Brannon, Karen W., "Secure Information Caching on the Web," Advanced Web Technologies and Applications, Springer Berlin Heidelberg, 2004, Apr. 14, 2004.
Herbert, Andrew, "Secure Mobile Code Management Enabling Java for the Enterprise," Digitivity, Inc., May 1997.
Rosenblit, Moshe, "Secure Software Distribution," Network Operations and Management Symposium, 1994 (IEEE), Feb. 14, 1994.
Hashi, Brant, et al., "Securing Systems Against External Programs," Internet Computing IEEE, Nov. 1998.
Farmer, William M., et al., "Security for Mobile Agents: Authentication and State Appraisal," Computer Security—ESORICS 96, Springer Berlin Heidelberg, 1996, Sep. 25, 1996.
Wakeman, Ian, et al., "Signaling in a Component Based World," 1998 IEEE, 1998.
"Sun Microsystem's JavaSoft Java Beans 1.0 API Specification," Sun Microsystems, Inc., Oct. 15, 1996.
"SWEEP Website Product Overview—Client/Server Virus Detection: A Corporate Solution," Sophos, Dec. 11, 1997.
"SWEEP Website Product Overview—SWEEP Virus Detection for Windows NT," Sophos, Feb. 10, 1998.
"Symantec Announces First Native Java Virus Scanner and Leading Edge Virus Analysis Technology," Symantec Corp., Mar. 27, 1996.
Malkhi, Dahlia, et al., "The Design and Implementation of a Java Playground," AT&T Labs—Research, Oct. 10, 1997.
Sirer, Emin Gün, "The Kimerawork on Bytecode Verification," Department of Computer Science and Engineering, University of Washington, Internet: http://kimera.cs.washington.edu/overview.html, Oct. 30, 1997.
Evans, David E., "Thesis by David E. Evans, Policy-Directed Code Safety," Massachusetts Institute of Technology, Feb. 2000.
"ThunderBYTE Anti-Virus Utilities for Windows 95 (prerelease)," PC Magazine, Nov. 21, 1995.
Iliadis, J., et al., "Towards Secure Downloadable Executable Content: The Java Paradigm," Berlin Heidelberg, 1998.
Maheshwari, Anuj, et al., "TranSquid: Transcoding and Caching Proxy for Heterogenous Ecommerce Environments," Twelfth International Workshop on Research Issues in Data Engineering: Engineering E-Commerce/E-Business Systems, 2000.
"Trend Micro Product Paper, InterScan AppletTrap Eliminates Malicious Mobile Code," Trend Micro, Inc., Sep. 1999.
Swarup, Vipin, "Trust Appraisal and Secure Routing of Mobile Agents," DARPA Workshop on Foundations for Secure Mobile Code, Monterey, CA, USA, Feb. 17, 1997.
Feigenbaum, Joan and Lee, Peter, "Trust Management and Proof-Carrying Code in Secure Mobile-Code Applications," DARPA Workshop on Foundations for Secure Mobile Code, vol. 26, Mar. 27, 1997.
Chu, Yang-Hua, "Trust Management for the World Wide Web," Diss. Massachusetts Institute of Technology, Dept. of Electrical Engineering and Computer Science, Jun. 13, 1997.
Rabinovich, Michael and Spatscheck, Oliver, "WEB Caching and Replication," Addison Wesley, 2002.
Krishnamurthy, Balachander and Rexford, Jennifer, "Webware: Nightmare or Dream Come True?", National Information Systems Security Conference, Oct. 22, 1996.
"White Paper: HotJava Views 1.1 Software System Overview and Applet Integration," Sun Microsystems, Inc., Jun. 16, 2000.
Greer, Earl, "Wise Dr. Solomon's Fast Accurate in Catching Viruses," InfoWorld, Nov. 6, 1995.
Ghosh, Anup K., et al., "Wrapping Windows NT Software for Robustness," Digest of Papers, Twenty-Ninth Annual International Symposium on Fault-Tolerant Computing (IEEE), Jun. 18, 1999.
Docket for *Finjan, Inc.* v. *Fireeye, Inc.*, Case No. 4:13-cv-03133-SBA, dated Jul. 8, 2013.
Docket for *Finjan, Inc.* v. *Websense, Inc.*, Case No. 3:13-cv-04398-JSW, dated Sep. 23, 2013.

(56) References Cited

OTHER PUBLICATIONS

Twyman, Andrew R., "Flexible Code Safety for Win32," May 21, 1999.
Wagner, David A., "Janus: An Approach for Confinement of Untrusted Applications," 1999.
Symantec, "The Digital Immune System: Enterprise-Grade Anti-Virus Automation in the 21st Century," 2001.
Aladdin Knowledge Systems White Paper, "Complete Content Security for Internet Gateways and Mail Servers," eAladdin.com, 2002.
Ositis, Inc., "Ositis Announces eShield Platform," Business Wire Press Release, May 6, 2003.
Chen, "Poison Java," Aug. 1999.
Aladdin Knowledge Systems, Inc., "Privilege Secure Software Distribution: Comprehensive Electronic Software Licensing and Distribution Solution," Sep. 1999.
"EliaShim Announces Release of Unique Anti Virus Plug-In for Checkpoint's Firewall-1," PRNewswire Press Release, Feb. 10, 1997.
Wagner, David, et al., "A First Step Toward Automated Detection of Buffer Overrun Vulnerabilities," Feb. 3, 2000.
Bishop, Matt, "A Taxonomy of UNIX System and Network Vulnerabilities," May 1995.
Aladdin Knowledge System, "Aladdin eSafe Protect Desktop User's Manual," 1999.
Necula, George Ciprian, "Compiling With Proofs," Sep. 18, 1998.
Lambright, H. Dan., "Automated Verification of Mobile Code," Nov. 3, 1997.
Meyers, et al., "Automatic Detection of C++ Programming Errors: Initial Thoughts on a Lint ++," Aug. 1991.
Bishop, Matt and Dilger, Michael, "Checking for Race Conditions in File Access," Sep. 1995.
Aho, Alfred V., et al., "Compilers: Principles, Techniques, and Tools," Mar. 1988.
Kozen, Dexter, "Efficient Code Certification," Jan. 8, 1998.
Varvitsiotis, Angelos, et al., "EuroMed-Java: Trusted Third Party Services for Securing Medical Java Applets," Sep. 16, 1998.
Detlefs, David L., et al., "Extended Static Checking," Dec. 18, 1998.
Data Fellows Corp., "F-Secure Script Viruses Detector and Eliminator, Version 1.6," 1998.
Morrisett, Greg, et al., "From System F to Typed Assembly Language (Extended Version)," Nov. 21, 1997.
Reps, Thomas, et al., "Incremental Context-Dependent Analysis for Language-Based Editors," 1983.
Viega, John, et al., "ITS4: A Static Vulnerability Scanner for C and C ++ Code," Dec. 11, 2000.
Symantec, "Norton Antivirus for Firewalls 1.5 Eliminates Internet Viruses on IBM, CVP Firewalls Before They Enter Corporate Network," Oct. 20, 1999.
Johnson, S.C., "Lint, a C Program Checker," Jul. 26, 1978.
Ghosh, Anup K., "On Certifying Mobile Code for Secure Applications," Nov. 4, 1998.
Aladdin Knowledge System, "Safe Internet Connectivity for Home and Small Office," May 1999.
Bergeron, J., et al., "Static Analysis of Binary Code to Isolate Malicious Behaviors," Jun. 16, 1999.
Larochelle, David, et al., "Statically Detecting Likely Buffer Overflow Vulnerabilities," Aug. 13, 2001.
Radatti, Peter V., "The CyberSoft Virus Description Language," Feb. 1996.
Levy, Jacob Y., et al., "The Safe-Tcl Security Model," Jun. 1998.
Kipelainen, Pekka, "Tree Matching Problems With Applications to Structured Text Databases," Nov. 1992.
Trend Micro, "Trend InterScan WebManager 1.1," 1999.
McGraw, Gary, et al., "Understanding the Keys to Java Security—The Sandbox and Authentication," May 1, 1997.
Bishop, Matt, "Vulnerabilities Analysis," Sep. 1999.
Aladdin Knowledge System, "Web Archive eSafe.com (eSafe Protect Gateway)," Oct. 13, 1999.
Aladdin Knowledge Systems, "Web Archive of eSafe.com," Mar. 2000.
Bailey, "C ++ SoftBench CodeAdvisor 5.0," Dec. 2005.
Ribera, et al., "An Evaluation of Tools for Static Checking of C ++ Code," Feb. 2000.
ParaSoft, "Code Wizard," Nov. 1999.
Wilson, "A Look at PREfix by Intrinsa," Software Testing & Quality Engineering, May/Jun. 1999.
Internet Archive for www.prolint.com, "Revision History," Apr. 11, 2003.
Ghosh, et al., "An Automated Approach for Identifying Potential Vulnerabilities in Software," May 1998.
Internet Archive, "Secure Software Solutions: RATS," Jun. 6, 2001.
Christodorescu, Mihai and Jha, Somesh, "Static Analysis of Executables to Detect Malicious Patterns," Proceedings of the 12th USENIX Security Symposium, Aug. 4-8, 2003.
Roesch, Martin and Green, Chris, "Snort User Manual, Snort Release: 1.9.1," Feb. 26, 2003.
Kephart, J., et al., A Biologically Inspired Immune System for Computers, 1994.
Kephart, J., et al., Automatic Extraction of Computer Virus Signatures (1994).
Kephart, J., et al., Biologically Inspired Defenses Against Computer Viruses (1995).
S&S International, Dr. Solomon's Anti-Virus Toolkit for Windows and DOS (1995).
A. Solomon, Dr. Solomon's Virus Encyclopedia (1995).
Dr. Solomon's Anti-Virus Toolkit for Windows and DOS.
Dr. Solomon's Anti-Virus Toolkit for Netware.
Lunt, et al., "A Real-Time Intrusion Detection Expert System (IDES)," 1992.
"Sweep Windows NT User Manual," 1996.
"Sweep User Manual for Windows NT," 1995.
"Sweep User Manual for Windows 95," 1995.
Smaha, S., "Haystack: An Intrusion Detection System" (1988).
Department of Defense, "Department of Defense Trusted Computer System Evaluation Criteria" (1985).
"Check Point Software Delivers Breakthrough Security Advancements with Firewall-1 3.0; Industry's First to Offer Content Security Connection Control, Advanced Authentication and Encryption Integrated into an Open Enterprise Security Platform," Business Wire, 1996.
Venema, W., "TCP WRAPPER Network Monitoring, Access Control, and Booby Traps," In Proceedings of the Third Usenix UNIX Security Symposium (1992).
Radatti, "Computer Viruses in Unix Networks" (1995).
"Changing the Rules on Viruses," PC Magazine, Aug. 1994.
Chen, Steven, "PC Rx," PC Magazine, Mar. 16, 1993.
Sophos, "Intercheck," 1995.
Virus Bulletin, 20 pp., Nov. 1989.
Virus Bulletin, 24 pp., Aug. 1996.
Virus Bulletin, 32 pp., Jun. 1996.
Virus Bulletin, 24 pp., May 1995.
Virus Bulletin, 24 pp., Mar. 1995.
Virus Bulletin, 24 pp., Jun. 1995.
Virus Bulletin, 24 pp., Aug. 1995.
Virus Bulletin, 24 pp., Sep. 1995.
Virus Bulletin, 24 pp., May 1994.
Virus Bulletin, 24 pp., Mar. 1994.
Virus Bulletin, 24 pp., Feb. 1994.
Virus Bulletin, 24 pp., Apr. 1994.
Virus Bulletin, 24 pp., Jul. 1995.
Virus Bulletin, 24 pp., Apr. 1995.
Virus Bulletin, 24 pp., Dec. 1996.
Virus Bulletin, 24 pp., Oct. 1995.
Virus Bulletin, 24 pp., Jan. 1994.
Virus Bulletin, 24 pp., Jul. 1994.
Virus Bulletin, 24 pp., Aug. 1994.
Virus Bulletin, 24 pp., Feb. 1996.
Virus Bulletin, 24 pp., Feb. 1995.
Virus Bulletin, 24 pp., Nov. 1994.
Virus Bulletin, 24 pp., Nov. 1995.
Virus Bulletin, 24 pp., Nov. 1996.
Virus Bulletin, 24 pp., Dec. 1995.
Virus Bulletin, 24 pp., Dec. 1994.

(56) References Cited

OTHER PUBLICATIONS

Virus Bulletin, 24 pp., Oct. 1994.
Virus Bulletin, 24 pp., Apr. 1996.
Virus Bulletin, 24 pp., Sep. 1994.
Virus Bulletin, 24 pp., Jun. 1994.
Virus Bulletin, 24 pp., Sep. 1996.
Virus Bulletin, 24 pp., Jan. 1996.
Virus Bulletin, 24 pp., Mar. 1996.
Virus Bulletin, 24 pp., Jan. 1995.
Virus Bulletin, 24 pp., May 1996.
Virus Bulletin, 28 pp., Jul. 1996.
Virus Bulletin, 24 pp., Oct. 1996.
Mary R. Thompson, et al., "Certificate-Based Authorization Policy in a PKI Environment," Nov. 2003.
P. C. Cheng, "An Architecture for the Internet Key Exchange Protocol," 2001.
List of Secure Internet Programming Publications, [retrieved on Dec. 22, 2010], 4 pp., Retrieved from the Internet: www.cs.princeton.edu/sip/pub/index.php3.
"Synthesizing Fast Intrusion Prevention/Detection Systems From High-Level Specifications," by Sekar, et al. (1999).
"A Web Navigator With Applets in Caml," by Francois Ronaix, Fifth International World Wide Web Conference, Paris, France, May 6-10, 1996, 20 pp.
Slade, Robert, "Guide to Computer Viruses: How to Avoid Them, How to Get Rid of Them, and How to Get Help" (Apr. 1996).
Garfinkel, Simson and Spafford, Gene, "Practical Unix and Internet Security," O'Reilly & Associates, Inc., 1996.
ThunderBYTE Anti-Virus Utilities User Manual, ThunderBYTE B.V., Wijchen, The Netherlands, 1996.
"MCF: A Malicious Code Filter," by Lo, et al., 27 pp. (May 4, 1994).
"Towards a Testbed for Malicious Code Detection," by Lo, et al., Compcon Spring '91 Digest of Papers at 160-166, IEEE, 1991.
"Frequently Asked Questions—Java Security," Copyright 1995-1998 [retrieved on Dec. 15, 2011], 13 pp., Retrieved from the Internet: mhtml:file://S:\DFSR_DATA\Data03/030052\01_Finjan_v._Symantec(DDEL-00593)\Prio . . . .
Marcionek, David, "A Complete ActiveX Web Control Tutorial," Jun. 21, 2006 [retrieved on Sep. 29, 2014], 22 pp., Retrieved from the Internet: http://www.codeproject.com/Articles/14533/A-Complete-ActiveX-Web-Control-Tutorial.
Greenberg, Ross M., "Flu_Shot+, Version 1.81, A Form of Protection From Viral and Trojan Programs," Copyright 1988-1990, 54 pp.
"NetShield Version 1.61 Release Candidate for Novell NetWare v4.01 and Novell NetWare for OS/2 v4.01," McAfee Associates, Inc., Copyright 1994, 54 pp.
Balfanz, et al., "A Java Filter," 1997.
Ranum, et al., "A Toolkit and Methods for Internet Firewalls," 1994.
Pope, Nick, "Standards in Commercial Security," Designing Secure Systems, IEE Colloquium, Jun. 19, 1992.
Whyman, T., "X.400 Security Features," Security and Networks, IEE Colloquium, Jun. 25, 1990.
Donald E. Knuth, "The Art of Computer Programming," vol. 3 (1st Ed., 1973).
Donald E. Knuth, "The Art of Computer Programming," vol. 3, 2nd Ed., 1998).
"100 or So Books that Shaped a Century of Science," American Scientist, vol. 87, No. 6, pp. 542-544, 546, 549-550, 553 (Nov.-Dec. 1999).
Obituary of Frances E. Holberton, 84, "Early Computer Programmer," published Dec. 17, 2001.
http://getoutfoxed.com/compare ("Comparison"), Mar. 24, 2005.
http://getoutfoxed.com/options/search ("Different Engine Codes"), Apr. 26, 2005.
http://getoutfoxed.com/node/36 ("Abstract"), Mar. 19, 2005.
http://getoutfoxed.com/options/random_set ("Random Reports Configuration"), May 1, 2005.
http://getoutfoxed.com/node/32 ("Three Magic Ingredients"), Mar. 18, 2005.

Decision, dated Nov. 19, 2013, granting ex parte reexamination for U.S. Appl. No. 90/013,016, 17 pp.
Non-Final Office Action, dated Nov. 19, 2013, for U.S. Appl. No. 90/013,016, 14 pp.
Decision, dated Dec. 6, 2013, granting ex parte reexamination for U.S. Appl. No. 90/013,017, 20 pp.
Non-Final Office Action, dated Dec. 6, 2013, for U.S. Appl. No. 90/013,017, 42 pp.
Final Office Action, dated Sep. 8, 2014, for U.S. Appl. No. 90/013,017, 51 pp.
Advisory Action, dated Oct. 23, 2014, for U.S. Appl. No. 90/013,017, 12 pp.
Examiner's Answer, dated Mar. 30, 2015, for U.S. Appl. No. 90/013,017, 117 pp.
Decision, dated Jan. 25, 2012, granting inter partes reexamination for U.S. Appl. No. 95/001,836, 77 pp.
Non-Final Office Action, dated Jan. 25, 2012, for U.S. Appl. No. 95/001,836, 17 pp.
Action Closing Prosecution dated Oct. 2, 2013, for U.S. Appl. No. 95/001,836, 61 pp.
Right of Appeal Notice, dated Jun. 27, 2014, for U.S. Appl. No. 95/001,836, 82 pp.
Examiner's Answer, dated Mar. 25, 2015, for U.S. Appl. No. 95/001,836, 4 pp.
Order Denying Request for Ex Parte Reexamination, dated Nov. 19, 2013, for U.S. Appl. No. 90/013,015, 16 pp.
Order Denying Request for Ex Parte Reexamination, dated Mar. 27, 2014, for U.S. Appl. No. 90/013,147, 26 pp.
Order Granting Request for Inter Partes Reexamination, dated Aug. 28, 2007, for U.S. Appl. No. 90/008,678, 13 pp.
Non-Final Office Action, dated May 8, 2008, for U.S. Appl. No. 90/008,678, 18 pp.
Notice of Intent to Issue Ex Parte Reexamination Certificate, dated Feb. 27, 2009, 11 pp.
Ex Parte Reexamination Certificate for U.S. Pat. No. 6,480,962, dated May 26, 2009, U.S. Appl. No. 90/008,678, 2 pp.
Order Granting Request for Ex Parte Reexamination, dated Aug. 28, 2007, for U.S. Appl. No. 90/008,684, 11 pp.
Non-Final Office Action, dated Dec. 19, 2008, for U.S. Appl. No. 90/008,684, 39 pp.
Final Office Action, dated Nov. 20, 2009, for U.S. Appl. No. 90/008,684, 53 pp.
Advisory Action, dated Feb. 3, 2010, for U.S. Appl. No. 90/008,684, 4 pp.
Examiner's Answer, dated Sep. 10, 2010, for U.S. Appl. No. 90/008,684, 86 pp.
Decision on Appeal, Examiner Affirmed, dated Jun. 6, 2011, for U.S. Appl. No. 90/008,684, 8 pp.
United States Patent and Trademark Office's Response to Appellant's Brief, dated Feb. 13, 2012, for U.S. Appl. No. 90/008,684.
Judgment of United States Court of Appeal for the Federal Circuit, dated Jan. 11, 2013, for U.S. Appl. No. 90/008,684, 2 pp.
Notice of Intent to Issue Ex Parte Reexamination Certificate, dated Jul. 26, 2013, for U.S. Appl. No. 90/008,684, 6 pp.
Ex Parte Reexamination Certificate for U.S. Pat. No. 6,167,520, dated Sep. 6, 2013, U.S. Appl. No. 90/008,684, 2 pp.
Order Granting Request for Ex Parte Reexamination (U.S. Pat. No. 6,092,194), dated Aug. 28, 2008, for U.S. Appl. No. 90/009,175, 11 pp.
Notice of Intent to Issue Ex Parte Reexamination Certificate, dated May 28, 2009, for U.S. Appl. No. 90/009,175, 21 pp.
Ex Parte Reexamination Certificate for U.S. Pat. No. 6,092,194, dated Aug. 18, 2009, U.S. Appl. No. 90/009,175, 15 pp.
"Dynamic Detection and Classification of Computer Viruses Using General Behavior Patterns," by Morton Swimmer, in Proceedings of the 1995 Virus Bulletin Conference ("Swimmer 1995").
"Proof-Carrying Code," George C. Necula and Peter Lee. Technical Report CMU-CS-96-165, Nov. 1996.
"A Flexible Security Model for Using Internet Content," by Nayeem Islam et al., in Proceedings of the Sixteenth Symposium on Reliable Distributed Systems (1997).
"MIME Encapsulation of Aggregate Applet Objects" by Alireza Bahreman et al., IETF, Jun. 1996 ("Bahreman").

(56) References Cited

OTHER PUBLICATIONS

"An Immune System for Cyberspace," by Jeffrey O. Kephart et al., in Proc. of the IEEE SMC'97 ("Kephart 1997").
"A Generic Virus Detection Agent on the Internet," by Jieh-Sheng Lee et al., in the Proceedings of the Thirtieth Hawaii International Conference on System Sciences 1997 ("Lee").
"Understanding Heuristics: Symantec's Bloodhound Technology," Symantec White Paper Series vol. XXXIV (1997) ("Bloodhound WP").
"Understanding Symantec's Anti-virus Strategy for Internet Gateways," Symantec Enterprise Papers vol. XXX (1997) ("Gateways WP").
"Understanding and Managing Polymorphic Viruses," Symantec Enterprise Papers vol. XXX (1997) ("Striker WP").
"Symantec Announces Norton Antivirus for Firewalls for Maximum Protection From Internet-Borne Viruses," Symantec Press Release (1997) [retrieved on Feb. 23, 2015], located at http://www.symantec.com/about/news/release/article.jsp?prid=19970506_01 ("NAV for Firewalls Press Release").
Bruce Schneier, Applied Cryptography, John Wiley & Sons Inc. (1994) ("Applied Cryptography").
Nick Feamster et al., Infranet: Circumventing Web Censorship and Surveillance, Proceedings of the USENIX Security Symposium, San Francisco, CA (Aug. 5-9, 2002) ("Feamster USENIX").
Nick Feamster et al., Thwarting Web Censorship with Untrusted Messenger Discovery, 3rd Workshop on Privacy Enhancing Technologies, Dresden, Germany, Mar. 2003. ("Feamster Dresden").
Nick Feamster et al., Infranet: Circumventing Web Censorship and Surveillance (Presentation), 11th Usenix Security Symposium, Aug. 8, 2002 ("Feamster USENIX Presentation").
Nick Feamster et al., Infranet: Circumventing Web Censorship and Surveillance (Presentation), Harvard Kennedy School, Nov. 27, 2002 ("Feamster Kennedy Presentation").
ePolicy Orchestrator Version 2.0 Product Guide (2001) ("ePO 2.0 PG").
Common Updater Version 1.0 Configuration Guide (2002) ("CU 1.0 CG").
ePolicy Orchestrator Version 3.0 Product Guide (2003) ("ePO 3.0 PG").
ePolicy Orchestrator Version 3.0 Installation Guide (2003) ("ePO 3.0 IG").
William G.J. Halfond & Alessandro Orso, Combining Static Analysis & Runtime Monitoring to Counter SQL-Injection Attacks, Workshop on Dynamic Analysis, ACM, May 17, 2005 ("Halfond").
Yougang Song & Brett D. Fleisch, "Rico: a security proxy for mobile code," Elsevier, Jun. 2004 ("Song").
James Newsome and Dawn Song, Dynamic Taint Analysis for Automatic Detection, Analysis, and Signature Generation, May 2004.
D.P. Ghormley et al., SLIC: An Extensibility System for Commodity Operating Systems, USENIX Annual Technical Conference, Jun. 1998 ("Ghormley").
http://getoutfoxed.com/release/0.2 ("Download"), May 15, 2005.
http://getoutfoxed.com/node/43 ("Basic Architecture"), May 19, 2005.
http://getoutfoxed.com/about/search ("Search & Browsing"), Jun. 22, 2005.
http://getoutfoxed.com/blog/1 ("Stan's Blog"), Jun. 8, 2005.
http://getoutfoxed.com/node/37 ("Outfoxed System"), Jun. 22, 2005.
Insik Shin and John C. Mitchell, "Java Bytecode Modification and Applet Security," Feb. 21, 2001.
http://getoutfoxed.com/node/107 ("De-centralized Architecture"), Jun. 23, 2005.
http://getoutfoxed.com/node/42 ("Metadata Publication"), Jun. 23, 2005.
http://getoutfoxed.com/help/options ("Options"), Jul. 27, 2005.
http://getoutfoxed.com/node/114 ("Security"), Oct. 24, 2005.
http://getoutfoxed.com/screenshots ("Screenshots Page"), May 15, 2005.
http://getoutfoxed.com/files/screenshots/spyware_search.htm ("Spyware Page"), May 14, 2005.
http://getoutfoxed.com/files/screenshots/osnabrueck_search.htm ("Osnabrueck Screenshot"), May 15, 2005.
http://getoutfoxed.com/files/screenshots/boingboinggoogle.htm ("Preshrunk Screenshot"), Jun. 22, 2005.
http://getoutfoxed.com/files/screenshots/warcraft_search.htm ("Warcraft Screenshot"), Jun. 22, 2005.
http://getoutfoxed.com/files/screenshots/claria_dangerous.png ("Claria Screenshot") [retrieved Feb. 23, 2015].
http://getoutfoxed.com/files/screenshots/a9_random.jpg ("A9 Screenshot") [retrieved Feb. 23, 2015].
http://getoutfoxed.com/files/screenshots/google_random.png ("Google Random Screenshot") [retrieved Feb. 23, 2015].
http://getoutfoxed.com/files/screenshots/boingboinggoogle2.htm ("Google BoingBoing Screenshot"), Dec. 16, 2005.
http://getoutfoxed.com/files/screenshots/google_search1.png ("Google Weatherbug Screenshot") [retrieved Feb. 23, 2015].
http://getoutfoxed.com/files/screenshots/boingboinggoogle.png ("Google BoingBoing Screenshot 2") [retrieved Feb. 23, 2015].
http://getoutfoxed.com/files/screenshots/process_list.png ("Process List Screenshot"), Dec. 16, 2005.
http://getoutfoxed.com/files/screenshots/randomset_google.png ("Google Random Screenshot 2"), Dec. 16, 2005.
BetterSearch Homepage (Aug. 29, 2005) ("BetterSearch Homepage").
BetterSearch Screenshots Page (Jul. 20, 2005) ("BetterSearch Screenshots").
BetterSearch Installation Page (Jul. 28, 2005) ("BetterSearch Installation").
BetterSearch News Page (Aug. 26, 2005) ("BetterSearch News").
BetterSearch Changelog Page (Aug. 26, 2005) ("BetterSearch Changelog").
BetterSearch FAQ Page (Aug. 27, 2005) ("BetterSearch FAQ").
George C. Necula, "Proof-carrying code." In Proceedings of the 24th ACM Symposium on Principles of Programming Languages, Paris, France, Jan. 1997.
Encapsulating Mobile Objects, by Hermann Hartig et al., in the Proceedings of the 17th International Conference on Distributed Computing Systems, May 1997 ("Hartig").
Christopher Small, "A Tool for Constructing Safe Extensible C++ Systems," In Proceedings of the Third USENIX Conference on Object-Oriented Technologies (1997).
"Symantec's Norton AntiVirus 4.0 Delivers Multi-Platform Support," Symantec (1997) (Sep. 23, 1997) http://symantec.com/about/news/release/article.jsp?prid=19970923_01.
"Symantec's AntiVirus Research Center Responds to Mutating Macro Viruses With Bloodhound-Macro Technology," Symantec (1997) http://www.symantec.com/about/news/release/article.jsp?prid=19970923_03.
"Symantec Announces Norton Internet Email Gateway at Internet World," Symantec Press Release (1996) http://www.symantec.com/about/news/release/article.jsp?prid=19961211_03.
"Symantec Ships Norton AntiVirus for Internet Email Gateways," Symantec Press Release (1997) http://www.symantec.com/about/news/release/article.jsp?prid=19970224_01.
"Symantec Announces Norton Antivirus for Firewalls for Maximum Protection From Internet-Borne Viruses," Symantec Press Release (1997) http://www.symantec.com/about/news/release/article.jsp?prid=19970506_01 ("NAV for Firewalls Press Release").
"Symantec, The Worldwide Leader in Antivirus, Ships Norton Antivirus for Firewalls," Symantec Press Release (1997) http://www.symantec.com/about/news/release/article.jsp?prid=19970714_01.
Check Point, "Check Point Software Delivers Breakthrough Security Advancements with FireWall-1.3.0," Oct. 7, 1996, http://www.checkpoint.com/press/1996/30release.html.
Virus Bulletin, International Conference, Sep. 20-22, 1995.
Application as Filed for U.S. Appl. No. 60/711,012, filed Aug. 24, 2005.
Application as Filed for U.S. Appl. No. 60/711,972, filed Aug. 25, 2005.
Application as Filed for U.S. Appl. No. 60/735,772, filed Nov. 10, 2005.

(56) References Cited

OTHER PUBLICATIONS

Application as Filed for U.S. Appl. No. 60/581,857, filed Jun. 21, 2004.
Gene H. Kim and Eugene H. Spafford, "The Design and Implementation of Tripwire: A File System Integrity Checker," 23 pp., 1993.
Mark Kennedy, "Script-Based Mobile Threats," Virus Bulletin Conference, Sep. 2000.
Dr. Vesselin Bontchev and Katrin Tocheva, "Macro and Script Virus Polymorphism," Proceedings of the Twelfth International Virus Bulletin Conference, pp. 406-437, 2002.
Chris Shiflett, "PHP Security," O'Reilly Open Source Convention, Jul. 26, 2004.
"Mod-Security Reference Manual, v. 1.8.5," Oct. 26, 2004.
Belden Menkus, "A Secure Electronic Document Audit Trail Product," Jun. 1995.
David R. Safford, Douglas Lee Schales, and David K. Hess, "The TAMU Security Package: An Ongoing Response to Internet Intruders in an Academic Environment," Proceedings of the Fourth USENIX UNIX Security Symposium, Santa Clara, California, Oct. 4-6, 1993.
F-Prot, "Our Technology—F-Prot Antivirus" [online], Copyright 2014 [retrieved on Jun. 7, 2015], Retrieved from the Internet: http://www.f-prot.com/technology.
"Parasoft Introduces CodeWizard" [online], May 5, 1996 [retrieved on May 7, 2015], Retrieved from the Internet: http://www.parasoft.com/press/430/.
"CodeWizard for Windows 95 and Windows NT Available Soon!" [online], Oct. 1, 1996 [retrieved on May 7, 2015], Retrieved from the Internet: http://www.parasoft.com/press/429/.
"Parasoft Announces CodeWizard for Windows" [online], Mar. 3, 1997 [retrieved on May 7, 2015], Retrieved from the Internet: http://www.parasoft.com/press/428/.
"CodeWizard Supports Microsoft Visual C++ v. 5.0" [online], Mar. 24, 1997 [retrieved on May 7, 2015], Retrieved from the Internet: http://www.parasoft.com/press/426/.
"Parasoft Releases Preliminary Version of CodeWizard for Java" [online], Mar. 24, 1997 [retrieved on May 7, 2015], Retrieved from the Internet: http://www.parasoft.com/press/427/.
"Parasoft Releases CodeWizard v. 1.1 Beta" [online], May 23, 1997 [retrieved on May 7, 2015], Retrieved from the Internet: http://www.parasoft.com/press/425/.
"Parasoft Announces Pre-Release Version of CodeWizard for Java for Windows NT/95" [online], Jun. 2, 1997 [retrieved on May 7, 2015], Retrieved from the Internet: http://www.parasoft.com/press/424/.
"Parasoft Releases CodeWizard v. 1.1" [online], Jul. 3, 1997 [retrieved on May 7, 2015], Retrieved from the Internet: http://www.parasoft.com/press/423/.
"Parasoft Announces CodeWizard v. 1.5, Preventative Medicine for Error-Prone Code" [online], Jul. 28, 1997 [retrieved on May 7, 2015], Retrieved from the Internet: http://www.parasoft.com/press/422/.
"CodeWizard—Parasoft Forum" [online], Apr. 27, 2006 (downloaded May 8, 2015), Retrieved From: http://forums.parasoft.com/index.php?showtopic=996&mode=threaded&pid=2560.
"Parasoft Introduces CodeWizard Plus The Intelligent Development Solution for C++ and Java Developers" [online], Sep. 2, 1997 (downloaded May 7, 2015), Retrieved From: http://www.parasoft.com/press/421/.
"Parasoft Launches Newest Version of Award-Winning Automatic Error Detection Tool for C/C++, Insure++, v. 4.1" [online], Jun. 8, 1998 [retrieved on May 8, 2015], Retrieved From the Internet: http://www.parasoft.com/press/315/.
"Parasoft Awarded Logo Trademark for C/C++ Test Coverage Tool, TCA" [online], Aug. 31, 1998 [retrieved on May 8, 2015], Retrieved From the Internet: http://www.parasoft.com/press/313/.
"Parasoft Tools Insure++ and CodeWizard Offer Needed Stability, Reliability for Microsoft Visual C++ 6.0 Developers" [online], Oct. 28, 1998 [retrieved on May 7, 2015], Retrieved From the Internet: http://www.parasoft.com/press/311/.
"Parasoft's Insure++ and CodeWizard Now Support 64-Bit Development on HP11 and SGI64" [online], Dec. 7, 1998 [retrieved on May 7, 2015], Retrieved From the Internet: http://www.parasoft.com/press/308/.
"Newly Enhanced Versions of CodeWizard for C++ and Java Coming Soon" [online], Nov. 4, 1997 [retrieved on May 7, 2015], Retrieved From the Internet: http://www.parasoft.com/press/420/.
"Parasoft Releases Beta Version of CodeWizard for HTML, a Web Error Prevention Tool for Use With WebKing" [online], Feb. 1, 1999 [retrieved on May 7, 2015], Retrieved From the Internet: http://www.parasoft.com/press/416/.
"Internet Error Prevention and Detection: How Dysfunctional Are the Fortune 100 Web Sites?" [online], Nov. 8, 1999 [retrieved on May 8, 2015], Retrieved From the Internet: http://www.parasoft.com/press/739/.
"Parasoft Director of Technology, Dr. Michael Aivazis, to Speak at LinuxWorld Conference and Expo" [online], Jan. 24, 2000 [retrieved on May 8, 2015], Retrieved From the Internet: http://www.parasoft.com/press/655/.
"Parasoft Presents Solutions for Object-Oriented Embedded Development" [online], Feb. 21, 2000 [retrieved on May 8, 2015], Retrieved From the Internet: http://www.parasoft.com/press/654/.
"Parasoft to Showcase Solutions for Web Development At Internet World" [online], Mar. 27, 2000 [retrieved on May 8, 2015], Retrieved From the Internet: http://www.parasoft.com/press/735/.
"New Versions of CodeWizard for C++ and Java Available Now!" [online], Dec. 4, 1997 [retrieved on May 7, 2015], Retrieved From the Internet: http://www.parasoft.com/press/419/.
Adam Kolawa, Ph.D., "Parasoft & Innovation" [online], Apr. 2008 [retrieved on May 8, 2015], Retrieved From the Internet: http://www.parasoft.com/company/20-year-retrospectove/.
"Parasoft Extends Support to Windows 2000" [online], Apr. 10, 2000 [retrieved on May 8, 2015], Retrieved From the Internet: http://www.parasoft.com/press/645/.
"Boeing Chooses Parasoft's CodeWizard to Automate Coding Standard" [online], Apr. 17, 2000 [retrieved on May 7, 2015], Retrieved From the Internet: http://www.parasoft.com/press/414/.
"Parasoft and DCS IP, LLC Announce Sales Partnership" [online], May 2, 2000 [retrieved on May 8, 2015], Retrieved From the Internet: http://www.parasoft.com/press/572.
"Parasoft Releases CodeWizard v 3.1 for C and C++ " [online], May 3, 2000 [retrieved on May 7, 2015], Retrieved From the Internet: http://www.parasoft.com/press/413/.
"Parasoft to Present Newest Upgrade of WebKing at WebLA" [online], May 15, 2000 [retrieved on May 8, 2015], Retrieved From the Internet: http://www.parasoft.com/press/733/.
"Parasoft Releases CodeWizard Version 3.2" [online], Sep. 25, 2000 [retrieved on May 7, 2015], Retrieved From the Internet: http://www.parasoft.com/press/412/.
"Parasoft Releases New Version of Java Tool CodeWizard for Java v. 1.1" [online], May 26, 1998 [retrieved on May 7, 2015], Retrieved From the Internet: http://www.parasoft.com/press/418/.
"IMA Reduces the Time and Cost of Regulatory Compliance Through Static Analysis," Parasoft, 2 pp.
"Parasoft Forum" [online], Apr. 8, 2004 [retrieved on May 8, 2015], Retrieved From the Internet: http://forums.parasoft.com/index.php?showtopic=206&mode=threaded&pid=415.
"Parasoft C/C++ Test" [online], Copyright 2015 [retrieved on May 8, 2015], Retrieved From the Internet: http://www.parasoft.com/product/epptest/.
"Parasoft, This Forum" [online], Copyright 2015 [retrieved on May 8, 2015], Retrieved From the Internet: http://forums.parasoft.com/index.php?showforum=16.
"Parasoft Forum, Website" [online], Copyright 2015 [retrieved on May 8, 2015], Retrieved From the Internet: http://forums.parasoft.com/index.php?showforum=17.
"Parasoft Forum, Custom Link Check" [online], Jun. 22, 2004 [retrieved on May 8, 2015], Retrieved From the Internet: http://forums.parasoft.com/lofiversion/index.php/t275.html.
"Parasoft Forum, How Can I Check My Codes Without Compiler" [online], Jun. 9, 2004 [retrieved on May 8, 2015], Retrieved From the Internet: http://forums.parasoft.com/lofiversion/index.php/t264.html.

(56) References Cited

OTHER PUBLICATIONS

"Parasoft Forum, CodeWizard Installation Problem" [online], Aug. 1, 2004 [retrieved on May 8, 2015], Retrieved From the Internet: http://forums.parasoft.com/lofiverison.pho/t306.html.
"Parasoft Launches Newest Version of Award-Winning Automatic Software Detection Tool for C/C++, Insure++ v. 4.1 for Windows" [online], Jun. 22, 1998 [retrieved on May 8, 2015], Retrieved From the Internet: http://www.parasoft.com/press/314/.
"Parasoft's CodeWizard for Java Avoid "Nasty" Surprises in Their Programs" [online], Sep. 21, 1998 [retrieved on May 7, 2015], Retrieved From the Internet: http://www.parasoft.com/press/417/.
"Parasoft Forum, CodeWizard" [online], Apr. 27, 2006 [retrieved on May 8, 2015], Retrieved From the Internet: http://forums.parasoft.com/lofiversion/index.php/t996.html.
"Parasoft Forum, WebKing and Usability Test" [online], Feb. 23, 2005 [retrieved on May 8, 2015], Retrieved From the Internet: http://forums.parasoft.com/lofiverison/index.php/t500.html.
"Parasoft Forum, Repeated Element Regression Control" [online], Jun. 9, 2004 [retrieved on May 8, 2015], Retrieved From the Internet: http://forums.parasoft.com/index.php?showtopic=262.
"Parasoft Sitemap" [online], Copyright 2015 [retrieved on May 8, 2015], Retrieved From the Internet: http://www.parasoft.com/sitemap.
"Parasoft to Exhibit Solutions for Object-Oriented Embedded Development at Embedded Systems Conference, Boston" [online], Jun. 26, 2000 [retrieved on May 8, 2015], Retrieved From the Internet: http://www.parasoft.com/press/638/.
"Parasoft to Showcase Error Prevention and Error Detection Software at Upcoming Embedded Systems Conference" [online], Sep. 18, 2000 [retrieved on May 8, 2015], Retrieved From the Internet: http://www.parasoft.com/press/628/.
"Parasoft Launches New Automated Database Testing Tool to Validate Application-Database Interaction" [online], Nov. 19, 2002 [retrieved on May 8, 2015], Retrieved from the Internet: http://www.parasoft.com/press/1010/.
"Parasoft Joins Eclipse" [online], Dec. 10, 2002 [retrieved on May 8, 2015], Retrieved from the Internet: http://www.parasoft.com/press/1023/.
"Parasoft WebKing Earns IBM Ready for WebSphere Validation" [online], Jan. 29, 2003 [retrieved on May 8, 2015], Retrieved from the Internet: http://www.parasoft.com/press/1033/.
"Top Companies Choose Parasoft to Improve Software Quality and Reliability" [online], Jul. 2, 2003 [retrieved on May 8, 2015], Retrieved from the Internet: http://www.parasoft.com/press/1189/.
"Parasoft Extends Support to Software Developers in the Automotive Industry" [online], Jan. 7, 2004 [retrieved on May 8, 2015], Retrieved from the Internet: http://www.parasoft.com/press/1336/.
"Parasoft Forum, ANT Task for CodeWizard" [online], Aug. 12, 2004 [retrieved on May 8, 2015], Retrieved from the Internet: http://forums.parasoft.com/index.php?showtopic=319.
"Parasoft's CodeWizard v. 4.0 Enhances Software Error Prevention Capabilities" [online], Aug. 27, 2001 [retrieved on May 7, 2015], Retrieved from the Internet: http://www.parasoft.com/press/411/.
Arthur Hicken, "Service Virtualization, Development Resting, API Testing Tips, False Positives in Statuc Code Analysis" [online], Feb. 21, 2013 [retrieved on May 8, 2015], Retrieved from the Internet: http://blog.parasoft.com/bid/113524/False-Positive-in-Static-Code-Analysis.
"Parasoft Forum, CodeWizard Forum, Where to Post CodeWizard Topics?" [online], Apr. 6, 2004 [retrieved on May 7, 2015], Retrieved from the Internet: http://forums.parasoft.com/index.php?showtopic=201.
"CodeWizard User Testimonial (Suzette LaGray)" [online], Copyright 2015 [retrieved on May 7, 2015], Retrieved from the Internet: http://www.parasoft.com/testimonial/346/.
"CodeWizard User Testimonial (Mike LeBlanc, SKY Computers, Inc.)" [online], Copyright 2015 [retrieved on May 7, 2015], Retrieved from the Internet: http://www.parasoft.com/testimonial/348/.
"CodeWizard User Testimonial (Javier Borrajo, Telefonica Investigacion & Desarolio)" [online], Copyright 2015 [retrieved on May 7, 2015], Retrieved from the Internet: http://www.parasoft.com/testimonial/351/.
"CodeWizard User Testimonial (Gura Rao, Data Research Associates)" [online], Copyright 2015 [retrieved on May 7, 2015], Retrieved from the Internet: http://www.parasoft.com/testimonial/353/.
"CodeWizard User Testimonial (Martin A. Bailey, Richardson Communications Group)" [online], Copyright 2015 [retrieved on May 7, 2015], Retrieved from the Internet: http://www.parasoft.com/testimonial/355/.
"Parasoft Forum, Download CodeWizard" [online], Jul. 25, 2005 [retrieved on May 8, 2015], Retrieved from the Internet: http://forums.parasoft.com/index.php?showtopic=682.
"Parasoft, Awards & Recognitions" [online], Copyright 2015 [retrieved on May 8, 2015], Retrieved from the Internet: http://www.parasoft.com/company/awards/.
Parasoft, "Software Testing Tools—From Static Analysis to Service Virtualization" [online], Copyright 2015 [retrieved on May 7, 2015], Retrieved from the Internet: http://www.parasoft.com/products/.
"Parasoft CodeWizard" [online], Copyright 1996-2001 [retrieved on Jun. 5, 2015], Retrieved from the Internet: http://char.tuiasi.ro/doace/www.parasoft.com/products/wizard.
Ben Crowder, "CodeWizard for Linux" [online], Nov. 1, 1999 [retrieved on Jun. 5, 2015], Linux Journal, Retrieved from the Internet: http://www.linuxjournal.com/article/3615.
Tom Bragg, "Parasoft's CodeWizard for Java" [online], Dec. 18, 1999 [retrieved on Jun. 5, 2015], Retrieved from the Internet: http://adtmag.com/articles/1999/12/18/parasofts-codewizard-for-java-aspx.
U.S. Pat. No. 6,154,844 Prosecution History Excerpts.
MARC Record ("A Flexible Security Model for Using Internet Content"), 1997.
Joint Claim Construction and Pre-Hearing Statement Pursuant to Local Rule 4-3, dated Mar. 16, 2015, submitted by Finjan, Inc. and Symantec Corporation, Case No. 3-14-CV-02998-HSG.
Plaintiff Finjan, Inc.'s Opening Claim Construction Brief, dated Apr. 20, 2015, 30 pp., Case No. 14-CV-02998-HSG.
Wahbe, et al., "Efficient Software-Based Fault Isolation," ACM SIGOPS (Special Interest Group on Operating Systems) Symposium on Operating Systems Principles, Dec. 1993.
Jack W. Davidson, et al., "Safe Virtual Execution Using Software Dynamic Translation," 18th Annual Computer Security Applications Conference, Las Vegas, Nevada, Dec. 2002
Random House Webster's College Dictionary, Second Edition, Random House, New York, Copyright 1999, Cover, Copyright Page and p. 339 (Database).
Webster's New World Dictionary of Computer Terms, Fourth Edition, Prentice Hall, New York, NY, Copyright 1992, and p. 95 (Database).
U.S. Appl. No. 60/205,591, filed May 17, 2000, 9 pp.
Reexamination Excerpts for U.S. Appl. No. 90/013,017, 9 pp.
File History Excerpts from U.S. Appl. No. 13/290,708 (Now Patent No. 8,677,494), 29 pp.
U.S. Appl. No. 12/174,592 (Petition to Accept Unintentionally Delayed Claim of Priority filed on Dec. 20, 2011 (denied) and Jan. 25, 2012 (granted).
U.S. Appl. No. 12/174,592 (applicants' response and amendment filed on Jul. 19, 2011).
MARC Record ("A Sense of Self for Unix Processes"), 1996.
Virus Bulletin Conference, Proceedings of the Fifth International Virus Bulletin Conference, Sep. 1995 (Parts 1-3).
MARC Record ("Dynamic Detection and Classification of Computer Viruses Using General Behaviour Patterns"), 1995.
Duncan, Ray, "Advanced MS DOS," Microsoft Press, Redmond Washington, Copyright 1986, cover, Copyright Page, and pp. 272-282.
"Digital Signature Initiative Proposal," Aug. 1, 1996.
James W. Moore, "The Use of Encryption to Ensure the Integrity of Reusable Software Components," IEEE, 1994.
Judson D. Weeks, et al., "CCI-Based Web Security: A Design Using PGP," W3C, Dec. 13, 1995.

(56) References Cited

OTHER PUBLICATIONS

Burkhard Wiegel, "Secure External References in Multimedia Email Messages," Proceedings of the 3$^{rd}$ ACM Conference on Computer and Communications Security, New Delhi, India, Mar. 14-15, 1996.

Ofer Maor, et al., "SQL Injection Signatures Evasion," Imperva Application Defense Center, Apr. 2004.

Ryoichi Sasaki, et al., "Security and Privacy in the Age of Ubiquitous Computing," IFIP TC11 20$^{th}$ International Information Security Conference, Chiba, Japan, May 30-Jun. 1, 2005.

Francisco Fernandez, "Heuristic Engines," Virus Bulletin Conference, Sep. 2001.

Alex Shipp, "Heuristic Detection of Viruses Within Email," Virus Bulletin Conference, Sep. 2001.

Klaus Julisch, et al., "Detection of Intrusions and Malware, and Vulnerability Assessment," Second International Conference, DIMVA 2005, Vienna, Austria, Jul. 7-8, 2005.

Christopher Kruegel, et al., "On the Detection of Anomalous System Call Arguments," Computer Security—ESORICS 2003, 8$^{th}$ European Symposium on Research in Computer Security, Gjovik, Norway, Oct. 13-15, 2003.

John Graham-Cumming, "The Waxing and Waning of Spammers' Trickery," Proceedings of the 14$^{th}$ Virus Bulletin International Conference, Chicago, Sep. 29-Oct. 1, 2004.

Eric Lippert's Blog, "Eval is Evil, Part Two," Nov. 4, 2003.

\* cited by examiner

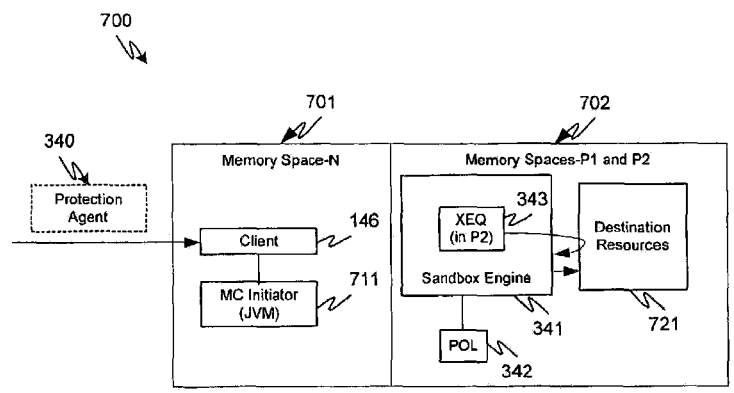
FIG. 7a
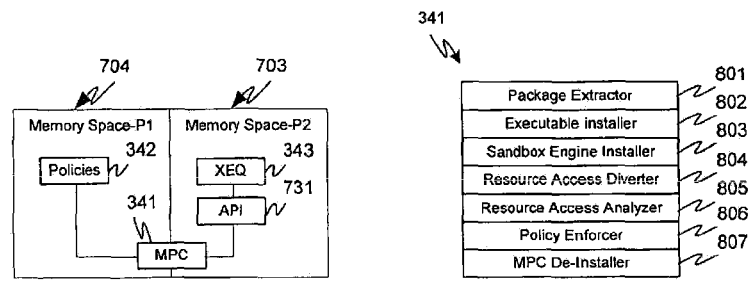
FIG. 7b     FIG. 8

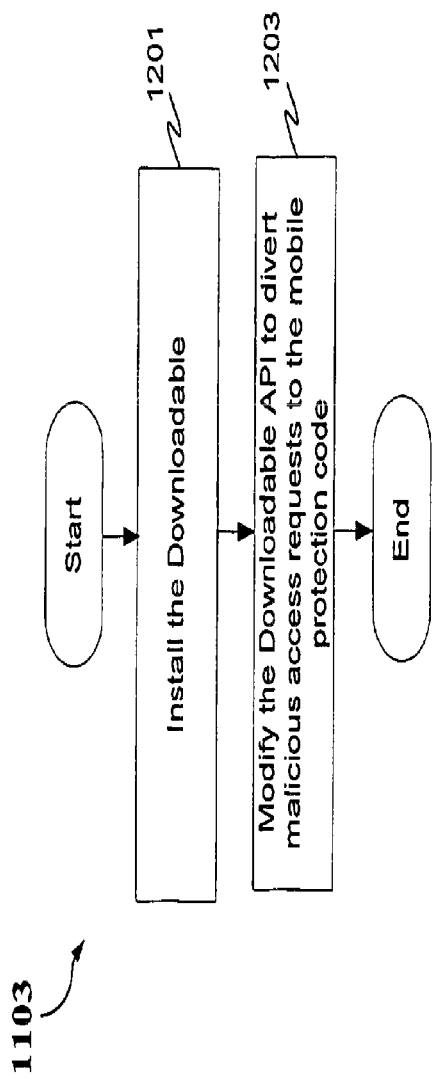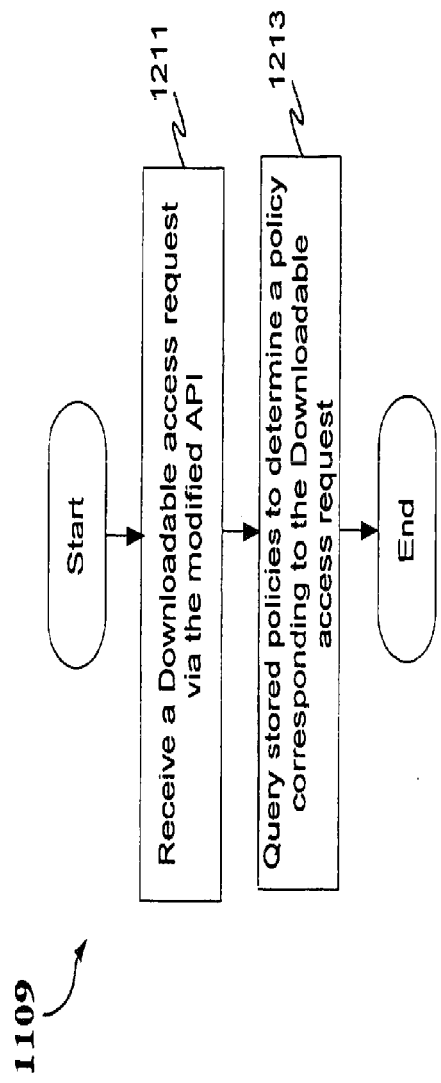

MALICIOUS MOBILE CODE RUNTIME MONITORING SYSTEM AND METHODS

PRIORITY REFERENCE TO RELATED APPLICATIONS

This application is a division of U.S. patent application Ser. No. 14/619,363, filed Feb. 11, 2015 by inventors Yigal Mordechai Edery, et al., entitled "Malicious Mobile Code Runtime Monitoring System and Methods," which is a continuation of U.S. patent application Ser. No. 14/155,835, filed Jan. 15, 2014 by inventors Yigal Mordechai Edery, et al., entitled "Malicious Mobile Code Runtime Monitoring System and Methods," which is a continuation of U.S. patent application Ser. No. 13/290,708, filed Nov. 7, 2011 by inventors Yigal Mordechai Edery, et al., entitled "Malicious Mobile Code Runtime Monitoring System and Methods," which is a continuation of U.S. patent application Ser. No. 12/471,942, filed May 26, 2009 by inventors Yigal Mordechai Edery, et al., now U.S. Pat. No. 8,079,086, entitled "Malicious Mobile Code Runtime Monitoring System and Methods," which is a continuation of assignee's U.S. patent application Ser. No. 11/370,114, filed Mar. 7, 2006 by inventors Yigal Mordechai Edery, et al., now U.S. Pat. No. 7,613,926, entitled "Method and System for Protecting a Computer and a Network from Hostile Downloadables," which is a continuation of assignee's U.S. patent application Ser. No. 09/861,229, filed on May 17, 2001 by inventors Yigal Mordechai Edery, et al., now U.S. Pat. No. 7,058,822, entitled "Malicious Mobile Code Runtime Monitoring System And Methods," all of which are hereby incorporated by reference. U.S. patent application Ser. No. 09/861,229, now U.S. Pat. No. 7,058,822, claims benefit of provisional U.S. patent application Ser. No. 60/205,591, entitled "Computer Network Malicious Code Run-Time Monitoring," filed on May 17, 2000 by inventors Nimrod Itzhak Vered, et al., which is hereby incorporated by reference. U.S. patent application Ser. No. 09/861,229, now U.S. Pat. No. 7,058,822, is also a Continuation-In-Part of assignee's U.S. patent application Ser. No. 09/539,667, entitled "System and Method for Protecting a Computer and a Network From Hostile Downloadables," filed on Mar. 30, 2000 by inventor Shlomo Touboul, now U.S. Pat. No. 6,804,780, and hereby incorporated by reference, which is a continuation of assignee's U.S. patent application Ser. No. 08/964,388, filed on Nov. 6, 1997 by inventor Shlomo Touboul, now U.S. Pat. No. 6,092,194, also entitled "System and Method for Protecting a Computer and a Network from Hostile Downloadables" and hereby incorporated by reference, which application claims the benefit of provisional U.S. application Ser. No. 60/030,639, filed Nov. 8, 1996 by inventors Shlomo Touboul, entitled "System and Method For Protecting a Computer From Hostile Downloadables." U.S. Ser. No. 09/861,229, now U.S. Pat. No. 7,058,822, is also a Continuation-In-Part of assignee's U.S. patent application Ser. No. 09/551,302, entitled "System and Method for Protecting a Client During Runtime From Hostile Downloadables," filed on Apr. 18, 2000 by inventor Shlomo Touboul, now U.S. Pat. No. 6,480,962, which is hereby incorporated by reference, which is a continuation of U.S. application Ser. No. 08/790,097, filed Jan. 29, 1997 by inventor Shlomo Touboul, now U.S. Pat. No. 6,167,520, entitled "System and Method For Protecting a Client From Hostile Downloadables" which claims the benefit of U.S. provisional application No. 60/030,639, filed on Nov. 8, 1996 by inventor Shlomo Touboul, entitled "System and Method For Protecting a Computer From Hostile Downloadables."

BACKGROUND OF THE INVENTION

1. Field of the Invention

This invention relates generally to computer networks, and more particularly provides a system and methods for protecting network-connectable devices from undesirable downloadable operation.

2. Description of the Background Art

Advances in networking technology continue to impact an increasing number and diversity of users. The Internet, for example, already provides to expert, intermediate and even novice users the informational, product and service resources of over 100,000 interconnected networks owned by governments, universities, nonprofit groups, companies, etc. Unfortunately, particularly the Internet and other public networks have also become a major source of potentially system-fatal or otherwise damaging computer code commonly referred to as "viruses."

Efforts to forestall viruses from attacking networked computers have thus far met with only limited success at best. Typically, a virus protection program designed to identify and remove or protect against the initiating of known viruses is installed on a network firewall or individually networked computer. The program is then inevitably surmounted by some new virus that often causes damage to one or more computers. The damage is then assessed and, if isolated, the new virus is analyzed. A corresponding new virus protection program (or update thereof) is then developed and installed to combat the new virus, and the new program operates successfully until yet another new virus appears—and so on. Of course, damage has already typically been incurred.

To make matters worse, certain classes of viruses are not well recognized or understood, let alone protected against. It is observed by this inventor, for example, that Downloadable information comprising program code can include distributable components (e.g. Java™ applets and JavaScript scripts, ActiveX™ controls, Visual Basic, add-ins and/or others). It can also include, for example, application programs, Trojan horses, multiple compressed programs such as zip or meta files, among others. U.S. Pat. No. 5,983,348 to Shuang, however, teaches a protection system for protecting against only distributable components including "Java applets or ActiveX controls", and further does so using resource intensive and high bandwidth static Downloadable content and operational analysis, and modification of the Downloadable component; Shuang further fails to detect or protect against additional program code included within a tested Downloadable. U.S. Pat. No. 5,974,549 to Golan teaches a protection system that further focuses only on protecting against ActiveX controls and not other distributable components, let alone other Downloadable types. U.S. Pat. No. 6,167,520 to Touboul enables more accurate protection than Shuang or Golan, but lacks the greater flexibility and efficiency taught herein, as do Shuang and Golan.

Accordingly, there remains a need for efficient, accurate and flexible protection of computers and other network connectable devices from malicious Downloadables.

SUMMARY OF THE INVENTION

The present invention provides protection systems and methods capable of protecting a personal computer ("PC") or other persistently or even intermittently network accessible devices or processes from harmful, undesirable, suspicious or other "malicious" operations that might otherwise be effectuated by remotely operable code. While enabling the capabilities of prior systems, the present invention is not nearly so limited, resource intensive or inflexible, and yet enables more reliable protection. For example, remotely operable code that is protectable against can include downloadable application programs, Trojan horses and program code groupings, as well as software "components", such as Java™ applets, ActiveX™ controls, JavaScript™/Visual Basic scripts, add-ins, etc., among others. Protection can also be provided in a distributed interactively, automatically or mixed configurable manner using protected client, server or other parameters, redirection, local/remote logging, etc., and other server/client based protection measures can also be separately and/or interoperably utilized, among other examples.

In one aspect, embodiments of the invention provide for determining, within one or more network "servers" (e.g. firewalls, resources, gateways, email relays or other devices/processes that are capable of receiving-and-transferring a Downloadable) whether received information includes executable code (and is a "Downloadable"). Embodiments also provide for delivering static, configurable and/or extensible remotely operable protection policies to a Downloadable-destination, more typically as a sandboxed package including the mobile protection code, downloadable policies and one or more received Downloadables. Further client-based or remote protection code/policies can also be utilized in a distributed manner. Embodiments also provide for causing the mobile protection code to be executed within a Downloadable-destination in a manner that enables various Downloadable operations to be detected, intercepted or further responded to via protection operations. Additional server/information-destination device security or other protection is also enabled, among still further aspects.

A protection engine according to an embodiment of the invention is operable within one or more network servers, firewalls or other network connectable information re-communicating devices (as are referred to herein summarily one or more "servers" or "re-communicators"). The protection engine includes an information monitor for monitoring information received by the server, and a code detection engine for determining whether the received information includes executable code. The protection engine also includes a packaging engine for causing a sandboxed package, typically including mobile protection code and downloadable protection policies to be sent to a Downloadable-destination in conjunction with the received information, if the received information is determined to be a Downloadable.

A sandboxed package according to an embodiment of the invention is receivable by and operable with a remote Downloadable-destination. The sandboxed package includes mobile protection code ("MPC") for causing one or more predetermined malicious operations or operation combinations of a Downloadable to be monitored or otherwise intercepted. The sandboxed package also includes protection policies (operable alone or in conjunction with further Downloadable-destination stored or received policies/MPCs) for causing one or more predetermined operations to be performed if one or more undesirable operations of the Downloadable is/are intercepted. The sandboxed package can also include a corresponding Downloadable and can provide for initiating the Downloadable in a protective "sandbox". The MPC/policies can further include a communicator for enabling further MPC/policy information or "modules" to be utilized and/or for event logging or other purposes.

A sandbox protection system according to an embodiment of the invention comprises an installer for enabling a received MPC to be executed within a Downloadable-destination (device/process) and further causing a Downloadable application program, distributable component or other received downloadable code to be received and installed within the Downloadable-destination. The protection system also includes a diverter for monitoring one or more operation attempts of the Downloadable, an operation analyzer for determining one or more responses to the attempts, and a security enforcer for effectuating responses to the monitored operations. The protection system can further include one or more security policies according to which one or more protection system elements are operable automatically (e.g. programmatically) or in conjunction with user intervention (e.g. as enabled by the security enforcer). The security policies can also be configurable/extensible in accordance with further downloadable and/or Downloadable-destination information.

A method according to an embodiment of the invention includes receiving downloadable information, determining whether the downloadable information includes executable code, and causing a mobile protection code and security policies to be communicated to a network client in conjunction with security policies and the downloadable information if the downloadable information is determined to include executable code. The determining can further provide multiple tests for detecting, alone or together, whether the downloadable information includes executable code.

A further method according to an embodiment of the invention includes forming a sandboxed package that includes mobile protection code ("MPC"), protection policies, and a received, detected-Downloadable, and causing the sandboxed package to be communicated to and installed by a receiving device or process ("user device") for responding to one or more malicious operation attempts by the detected-Downloadable from within the user device. The MPC/policies can further include a base "module" and a "communicator" for enabling further up/downloading of one or more further "modules" or other information (e.g. events, user/user device information, etc.).

Another method according to an embodiment of the invention includes installing, within a user device, received mobile protection code ("MPC") and protection policies in conjunction with the user device receiving a downloadable application program, component or other Downloadable(s). The method also includes determining, by the MPC, a resource access attempt by the Downloadable, and initiating, by the MPC, one or more predetermined operations corresponding to the attempt. (Predetermined operations can, for example, comprise initiating user, administrator, client, network or protection system determinable operations, including but not limited to modifying the Downloadable operation, extricating the Downloadable, notifying a user/another, maintaining a local/remote log, causing one or more MPCs/policies to be downloaded, etc.)

Advantageously, systems and methods according to embodiments of the invention enable potentially damaging, undesirable or otherwise malicious operations by even unknown mobile code to be detected, prevented, modified and/or otherwise protected against without modifying the mobile code. Such protection is further enabled in a manner that is capable of minimizing server and client resource requirements, does not require pre-installation of security code within a Downloadable-destination, and provides for client specific or generic and readily updateable security measures to be flexibly and efficiently implemented. Embodiments further provide for thwarting efforts to bypass security measures (e.g. by "hiding" undesirable operation causing information within apparently inert or otherwise "friendly"

downloadable information) and/or dividing or combining security measures for even greater flexibility and/or efficiency.

Embodiments also provide for determining protection policies that can be downloaded and/or ascertained from other security information (e.g. browser settings, administrative policies, user input, uploaded information, etc.). Different actions in response to different Downloadable operations, clients, users and/or other criteria are also enabled, and embodiments provide for implementing other security measures, such as verifying a downloadable source, certification, authentication, etc. Appropriate action can also be accomplished automatically (e.g. programmatically) and/or in conjunction with alerting one or more users/administrators, utilizing user input, etc. Embodiments further enable desirable Downloadable operations to remain substantially unaffected, among other aspects.

BRIEF DESCRIPTION OF THE DRAWINGS

FIG. 7a is a flow diagram illustrating a sandbox protection system operating within a destination system, according to an embodiment of the invention;

FIG. 7b is a block diagram illustrating memory allocation usable in conjunction with the protection system of FIG. 7a, according to an embodiment of the invention;

FIG. 8 is a block diagram illustrating a mobile protection code according to an embodiment of the invention;

FIG. 12a is a flowchart illustrating a method for forming a Downloadable access interceptor according to an embodiment of the invention; and FIG. 12b is a flowchart illustrating a method for implementing mobile protection policies according to an embodiment of the invention.

DETAILED DESCRIPTION

In providing malicious mobile code runtime monitoring systems and methods, embodiments of the invention enable actually or potentially undesirable operations of even unknown malicious code to be efficiently and flexibly avoided. Embodiments provide, within one or more "servers" (e.g. firewalls, resources, gateways, email relays or other information re-communicating devices), for receiving downloadable-information and detecting whether the downloadable-information includes one or more instances of executable code (e.g. as with a Trojan horse, zip/meta file etc.). Embodiments also provide for separately or interoperably conducting additional security measures within the server, within a Downloadable-destination of a detected-Downloadable, or both.

Embodiments further provide for causing mobile protection code ("MPC") and downloadable protection policies to be communicated to, installed and executed within one or more received information destinations in conjunction with a detected-Downloadable. Embodiments also provide, within an information-destination, for detecting malicious operations of the detected-Downloadable and causing responses thereto in accordance with the protection policies (which can correspond to one or more user, Downloadable, source, destination, or other parameters), or further downloaded or downloadable-destination based policies (which can also be configurable or extensible). (Note that the term "or", as used herein, is generally intended to mean "and/or" unless otherwise indicated.)

Figure 1A:
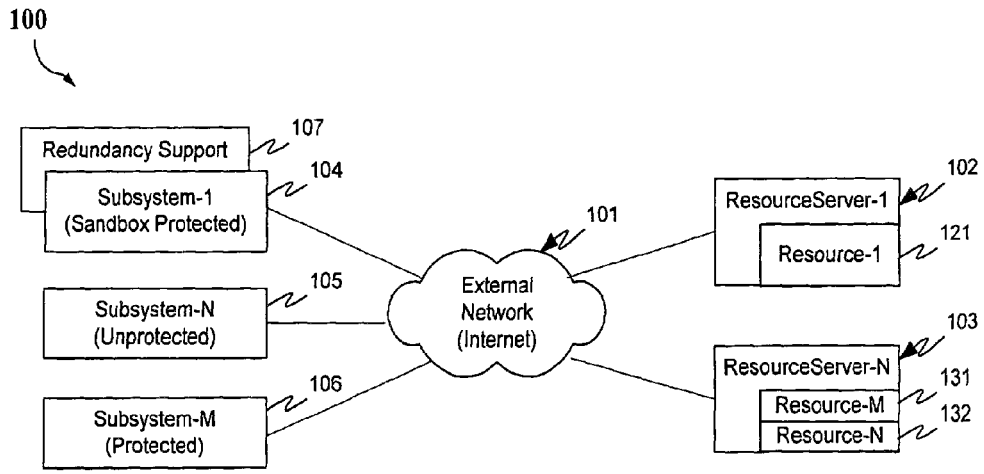
FIG. 1a is a block diagram illustrating a network system in accordance with an embodiment of the present invention.
Figures 1B, 1C:
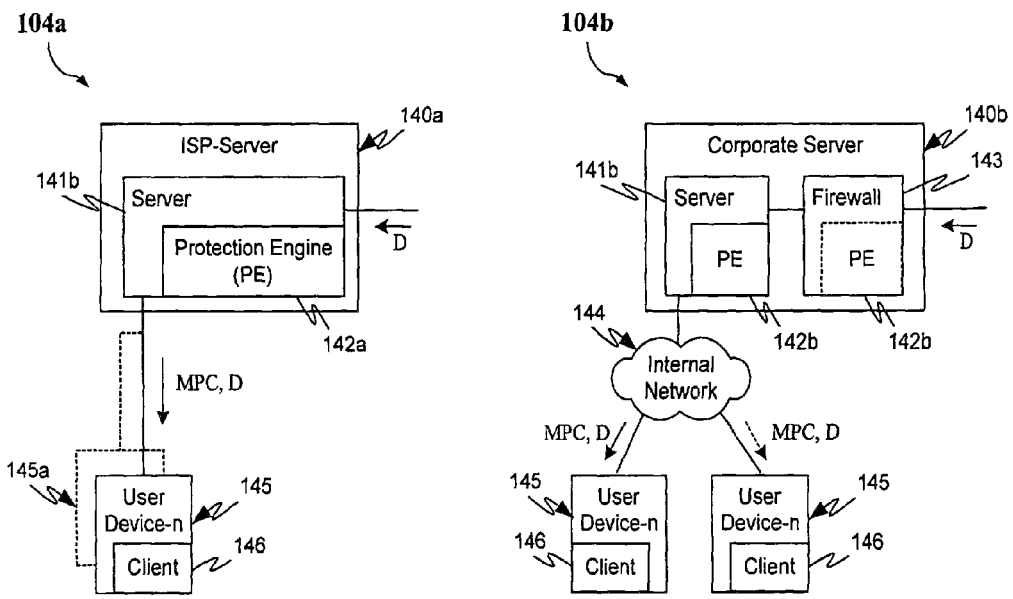
FIG. 1b is a block diagram illustrating a network subsystem example in accordance with an embodiment of the invention.
FIG. 1c is a block diagram illustrating a further network subsystem example in accordance with an embodiment of the invention.

FIGS. 1a through 1c illustrate a computer network system 100 according to an embodiment of the invention. FIG. 1a broadly illustrates system 100, while FIGS. 1b and 12 of 1c illustrate exemplary protectable subsystem implementations corresponding with system 104 or 106 of FIG. 1a.

Beginning with FIG. 1a, computer network system 100 includes an external computer network 101, such as a Wide Area Network or "WAN" (e.g. the Internet), which is coupled to one or more network resource servers (summarily depicted as resource server-1 102 and resource server-N 103). Where external network 101 includes the Internet, resource servers 1-N (102, 103) might provide one or more resources including web pages, streaming media, transaction-facilitating information, program updates or other downloadable information, summarily depicted as resources 121, 131 and 132. Such information can also include more traditionally viewed "Downloadables" or "mobile code" (i.e. distributable components), as well as downloadable application programs or other further Downloadables, such as those that are discussed herein. (It will be appreciated that interconnected networks can also provide various other resources as well.)

Also coupled via external network 101 are subsystems 104-106. Subsystems 104-106 can, for example, include one or more servers, personal computers ("PCs"), smart appliances, personal information managers or other devices/processes that are at least temporarily or otherwise intermittently directly or indirectly connectable in a wired or wireless manner to external network 101 (e.g. using a dialup, DSL, cable modem, cellular connection, IR/RF, or various other suitable current or future connection alternatives). One or more of subsystems 104-106 might further operate as user devices that are connectable to external network 101 via an internet service provider ("ISP") or local area network ("LAN"), such as a corporate intranet, or home, portable device or smart appliance network, among other examples.

FIG. 1a also broadly illustrates how embodiments of the invention are capable of selectively, modifiably or extensibly providing protection to one or more determinable ones of networked subsystems 104-106 or elements thereof (not shown) against potentially harmful or other undesirable ("malicious") effects in conjunction with receiving downloadable information. "Protected" subsystem 104, for example, utilizes a protection in accordance with the teachings herein, while "unprotected" subsystem-N 105 employs no protection, and protected subsystem-M 106 might employ one or more protections including those according to the teachings herein, other protection, or some combination.

System 100 implementations are also capable of providing protection to redundant elements 107 of one or more of subsystems 104-106 that might be utilized, such as backups, failsafe elements, redundant networks, etc. Where included, such redundant elements are also similarly protectable in a separate, combined or coordinated manner using embodiments of the present invention either alone or in conjunction with other protection mechanisms. In such cases, protection can be similarly provided singly, as a composite of component operations or in a backup fashion. Care should, however, be exercised to avoid potential repeated protection engine execution corresponding to a single Downloadable; such "chaining" can cause a Downloadable to operate incorrectly or not at all, unless a subsequent detection engine is configured to recognize a prior packaging of the Downloadable.

FIGS. 1b and 1c further illustrate, by way of example, how protection systems according to embodiments of the invention can be utilized in conjunction with a wide variety of different system implementations. In the illustrated examples, system elements are generally configurable in a manner commonly referred to as a "client-server" configuration, as is typically utilized for accessing Internet and many other network resources. For clarity sake, a simple client-server configuration will be presumed unless otherwise indicated. It will be appreciated, however, that other configurations of interconnected elements might also be utilized (e.g. peer-peer, routers, proxy servers, networks, converters, gateways, services, network reconfiguring elements, etc.) in accordance with a particular application.

The FIG. 1b example shows how a suitable protected system 104a (which can correspond to subsystem-1 104 or subsystem-M 106 of FIG. 1) can include a protection-initiating host "server" or "re-communicator" (e.g. ISP server 140a), one or more user devices or "Downloadable-destinations" 145, and zero or more redundant elements (which elements are summarily depicted as redundant client device/process 145a). In this example, ISP server 140a includes one or more email, Internet or other servers 141a, or other devices or processes capable of transferring or otherwise "re-communicating" downloadable information to user devices 145. Server 141a further includes protection engine or "PE" 142a, which is capable of supplying mobile protection code ("MPC") and protection policies for execution by client devices 145. One or more of user devices 145 can further include a respective one or more clients 146 for utilizing information received via server 140a, in accordance with which MPC and protection policies are operable to protect user devices 145 from detrimental, undesirable or otherwise "malicious" operations of downloadable information also received by user device 145.

The FIG. 1c example shows how a further suitable protected system 104b can include, in addition to a "re-communicator", such as server 142b, a firewall 143c (e.g. as is typically the case with a corporate intranet and many existing or proposed home/smart networks.) In such cases, a server 141b or firewall 143 can operate as a suitable protection engine host. A protection engine can also be implemented in a more distributed manner among two or more protection engine host systems or host system elements, such as both of server 141 band firewall 143, or in a more integrated manner, for example, as a standalone device. Redundant system or system protection elements 11) can also be similarly provided in a more distributed or integrated manner (see above).

System 104b also includes internal network 144 and user devices 145. User devices 145 further include a respective one or more clients 146 for utilizing information received via server 140a, in accordance with which the MPCs or protection policies are operable. (As in the previous example, one or more of user devices 145 can also include or correspond with similarly protectable redundant system elements, which are not shown.)

It will be appreciated that the configurations of FIGS. 1a-1c are merely exemplary. Alternative embodiments might, for example, utilize other suitable connections, devices or processes. One or more devices can also be configurable to operate as a network server, firewall, smart router, a resource server servicing deliverable third-party/manufacturer postings, a user device operating as a firewall/server, or other information-suppliers or intermediaries (i.e. as a "re-communicator" or "server") for servicing one or more further interconnected devices or processes or interconnected levels of devices or processes. Thus, for example, a suitable protection engine host can include one or more devices or processes capable of providing or supporting the providing of mobile protection code or other protection consistent with the teachings herein. A suitable information-destination or "user device" can further include one or more devices or processes (such as email, browser or other clients) that are capable of receiving and initiating or otherwise hosting a mobile code execution.

Figure 2:
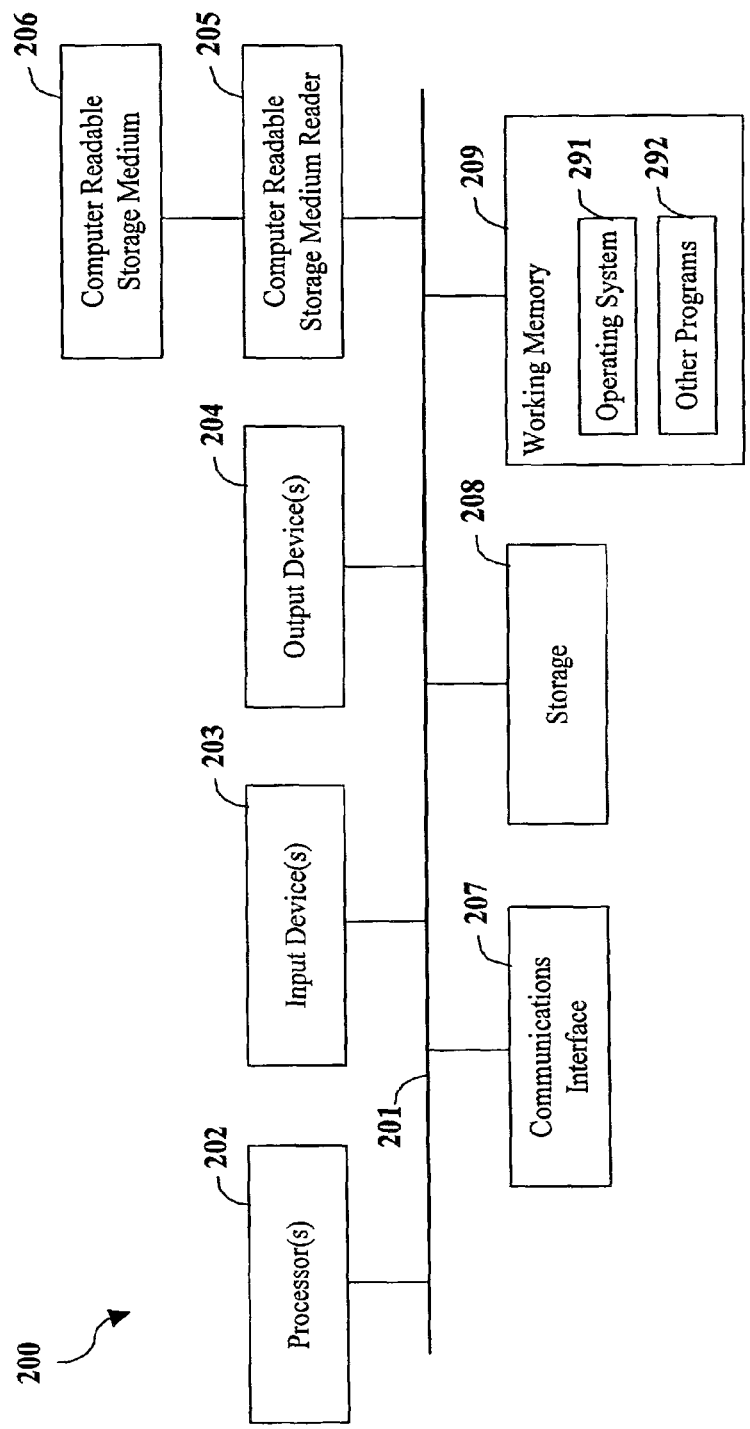
FIG. 2 is a block diagram illustrating a computer system in accordance with an embodiment of the invention.

FIG. 2 illustrates an exemplary computing system 200, that can comprise one or more of the elements of FIGS. 1a through 1c. While other application-specific alternatives might be utilized, it will be presumed for clarity sake that system 100 elements (FIGS. 1a-c) are implemented in hardware, software or some combination by one or more processing systems consistent therewith, unless otherwise indicated.

Computer system 200 comprises elements coupled via communication channels (e.g. bus 201) including one or more general or special purpose processors 202, such as a Pentium® or Power PC®, digital signal processor ("DSP"), etc. System 200 elements also include one or more input devices 203 (such as~mouse, keyboard, microphone, pen, etc.), and one or more output devices 204, such as a suitable display, speakers, actuators, etc., in accordance with a particular application.

System 200 also includes a computer readable storage media reader 205 coupled to a computer readable storage medium 206, such as a storage/memory device or hard or removable storage/memory media; such devices or media are further indicated separately as storage device 208 and memory 209, which can include hard disk variants, floppy/compact disk variants, digital versatile disk ("DVD") variants, smart cards, read only memory, random access memory, cache memory, etc., in accordance with a particular application. One or more suitable communication devices 207 can also be included, such as a modem, OSL, infrared or other suitable transceiver, etc. for providing inter-device communication directly or via one or more suitable private or public networks that can include but are not limited to those already discussed.

Working memory further includes operating system ("OS") elements and other programs, such as application programs, mobile code, data, etc. for implementing system 100 elements that might be stored or loaded therein during use. The particular OS can vary in accordance with a particular device, features or other aspects in accordance with a 110 particular application (e.g. Windows, Mac, Linux, Unix or Palm OS variants, a proprietary OS, etc.). Various programming languages or other tools can also be utilized, such as C++, Java, Visual Basic, etc. As will be discussed, embodiments can also include a network client such as a browser or email client, e.g. as produced by Netscape, Microsoft or others, a mobile code executor such as an OS task manager, Java Virtual Machine ("JVM"), etc., and an application program interface ("API"), such as a Microsoft Windows or other suitable element in accordance with the teachings herein. (It will also become apparent that embodiments might also be implemented in conjunction with a resident application or combination of mobile code and resident application components.)

One or more system 200 elements can also be implemented in hardware, software or a suitable combination. When implemented in software (e.g. as an application program, object, downloadable, servlet, etc. in whole or part), a system 200 element can be communicated transitionally or more persistently from local or remote storage to memory (or cache memory, etc.) for execution, or another suitable mechanism can be utilized, and elements can be implemented in compiled or interpretive form. Input, intermediate or resulting data or functional elements can further reside more transitionally or more persistently in a storage media, cache or more persistent volatile or non-volatile memory, (e.g. storage device 207 or memory 208) in accordance with a particular application.

Figure 3:
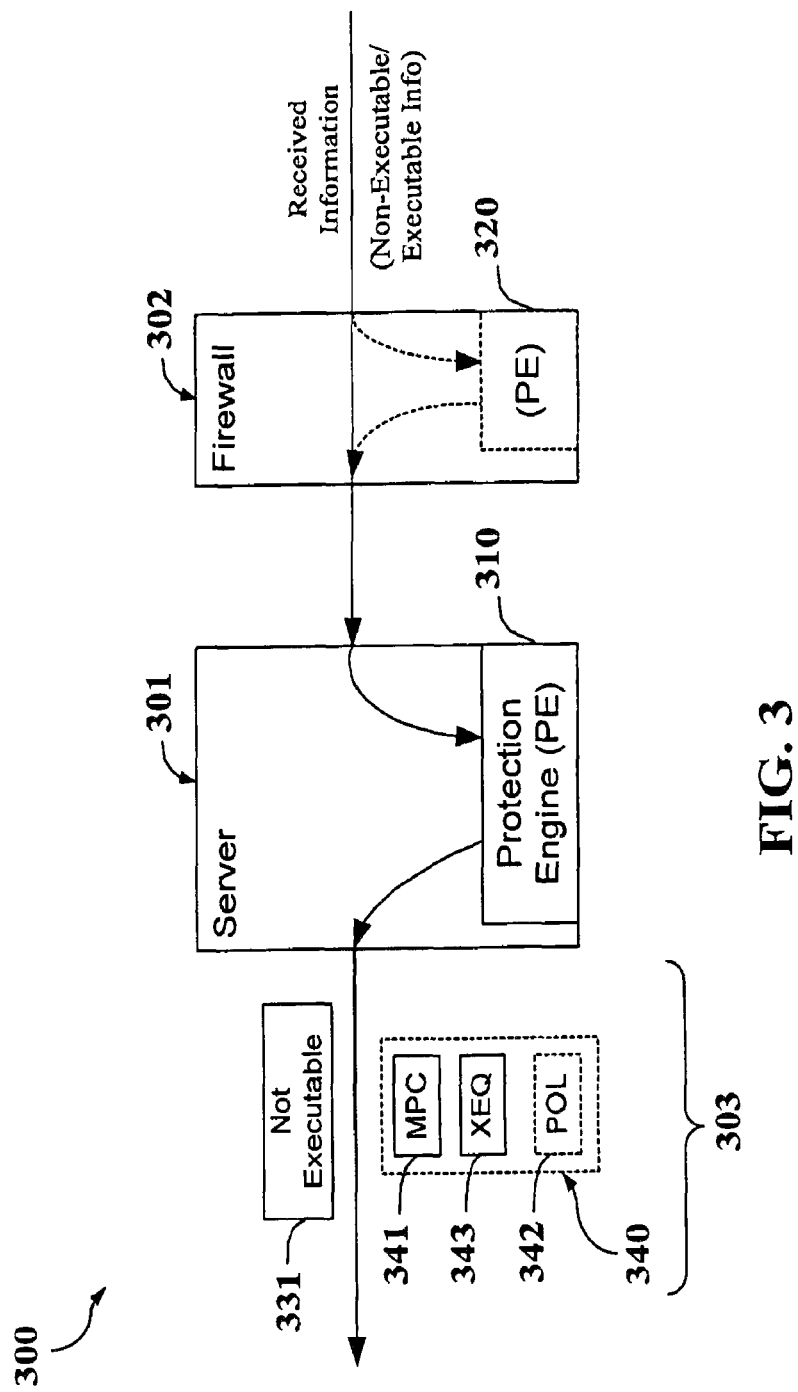
FIG. 3 is a flow diagram broadly illustrating a protection system host according to an embodiment of the invention.

FIG. 3 illustrates an interconnected re-communicator 300 generally consistent with system 140*b* of FIG. 1, according to an embodiment of the invention. As with system 140*b*, system 300 includes a server 301, and can also include a firewall 302. In this implementation, however, either server 301 or firewall 302 (if a firewall is used) can further include a protection engine (310 or 320 respectively). Thus, for example, an included firewall can process received information in a conventional manner, the results of which can be further processed by protection engine 310 of server 301, or information processed by protection engine 320 of an included firewall 302 can be processed in a conventional manner by server 301. (For clarity sake, a server including a singular protection engine will be presumed, with or without a firewall, for the remainder of the discussion unless otherwise indicated. Note, however, that other embodiments consistent with the teachings herein might also be utilized.)

FIG. 3 also shows how information received by server 301 (or firewall 302) can include non-executable information, executable information or a combination of non-executable and one or more executable code portions (e.g. so-called Trojan horses that include a hostile Downloadable within a friendly one, combined, compressed or otherwise encoded files, etc.). Particularly such combinations will likely remain undetected by a firewall or other more conventional protection systems. Thus, for convenience, received information will also be referred to as a "potential-Downloadable", and received information found to include executable code will be referred to as a "Downloadable" or equivalently as a "detected-Downloadable" (regardless of whether the executable code includes one or more application programs, distributable "components" such as Java, ActiveX, add-in, etc.).

Protection engine 310 provides for detecting whether received potential-Downloadables include executable code, and upon such detection, for causing mobile protection code ("MPC") to be transferred to a device that is a destination of the potential-Downloadable (or "Downloadable-destination"). Protection engine 310 can also provide protection policies in conjunction with the MPC (or thereafter as well), which MPC/policies can be automatically (e.g. programmatically) or interactively configurable in accordance user, administrator, downloadable source, destination, operation, type or various other parameters alone or in combination (see below). Protection engine 310 can also provide or operate separately or interoperably in conjunction with one or more of certification, authentication, downloadable tagging, source checking, verification, logging, diverting or other protection services via the MPC, policies, other local/remote server or destination processing, etc. (e.g. which can also include protection mechanisms taught by the above-noted prior applications; see FIG. 4).

Operationally, protection engine 310 of server 301 monitors information received by server 301 and determines whether the received information is deliverable to a protected destination, e.g. using a suitable monitor/data transfer mechanism and comparing a destination-address of the received information to a protected destination set, such as a protected destinations list, array, database, etc. (All deliverable information or one or more subsets thereof might also be monitored.) Protection engine 310 further analyzes the potential-Downloadable and determines whether the potential-Downloadable includes executable code. If not, protection engine 310 enables the not executable potential-Downloadable 331 to be delivered to its destination in an unaffected manner.

In conjunction with determining that the potential-Downloadable is a detected-Downloadable, protection engine 310 also causes mobile protection code or "MPC" 341 to be communicated to the Downloadable-destination of the Downloadable, more suitably in conjunction with the detected-Downloadable 343 (see below). Protection engine 310 further causes downloadable protection policies 342 to be delivered to the Downloadable-destination, again more suitably in conjunction with the detected-Downloadable. Protection policies 342 provide parameters (or can additionally or alternatively provide additional mobile code) according to which the MPC is capable of determining or providing applicable protection to a Downloadable-destination against malicious Downloadable operations.

(One or more "checked", tag, source, destination, type, detection or other security result indicators, which are not shown, can also be provided as corresponding to determined non-Downloadables or Downloadables, e.g. for testing, logging, further processing, further identification tagging or other purposes in accordance with a particular application.)

Further MPCs, protection policies or other information are also deliverable to a the same or another destination, for example, in accordance with communication by an MPC/protection policies already delivered to a downloadable-destination. Initial or subsequent MPCs/policies can further be selected or configured in accordance with a Downloadable-destination indicated by the detected-Downloadable, destination-user or administrative information, or other information providable to protection engine 310 by a user, administrator, user system, user system examination by a communicated MPC, etc. (Thus, for example, an initial MPC/policies can also be initially provided that are operable with or optimized for more efficient operation with different Downloadable-destinations or destination capabilities.)

While integrated protection constraints within the MPC might also be utilized, providing separate protection policies has been found to be more efficient, for example, by enabling more specific protection constraints to be more easily updated in conjunction with detected-Downloadable specifics, post-download improvements, testing, etc. Separate policies can further be more efficiently provided (e.g. selected, modified, instantiated, etc.) with or separately from an MPC, or in accordance with the requirements of a particular user, device, system, administration, later improvement, etc., as might also be provided to protection engine 310 (e.g. via user/MPC uploading, querying, parsing a Downloadable, or other suitable mechanism implemented by one or more servers or Downloadable-destinations).

(It will also become apparent that performing executable code detection and communicating to a downloadable-Destination an MPC and any applicable policies as separate from a detected-Downloadable is more accurate and far less resource intensive than, for example, performing content and operation scanning, modifying a Downloadable, or providing completely Downloadable-destination based security.)

System 300 enables a single or extensible base-MPC to be provided, in anticipation or upon receipt of a first Downloadable, that is utilized thereafter to provide protection of one or more Downloadable-destinations. It is found, however, that providing an MPC upon each detection of a Downloadable (which is also enabled) can provide a desirable combination of configurability of the MPC/policies and lessened need for management (e.g. given potentially changing user/destination needs, enabling testing, etc.).

Providing an MPC upon each detection of a Downloadable also facilitates a lessened demand on destination resources, e.g. since information-destination resources used in executing the MPC/policies can be re-allocated following such use. Such alternatives can also be selectively, modifiably or extensibly provided (or further in accordance with other application-specific factors that might also apply.) Thus, for example, a base-MPC or base-policies might be provided to a user device that is/are extensible via additionally downloadable "modules" upon server 301 detection of a Downloadable deliverable to the same user device, among other alternatives.

In accordance with a further aspect of the invention, it is found that improved efficiency can also be achieved by causing the MPC to be executed within a Downloadable-destination in conjunction with, and further, prior to initiation of the detected Downloadable. One mechanism that provides for greater compatibility and efficiency in conjunction with conventional client-based Downloadable execution is for a protection engine to form a sandboxed package 340 including MPC 341, the detected-Downloadable 343 and any policies 342. For example, where the Downloadable is a binary executable to be executed by an operating system, protection engine 310 forms a protected package by concatenating, within sandboxed package 340, MPC 341 for delivery to a Downloadable-destination first, followed by protection policies 342 and Downloadable 343. (Concatenation or techniques consistent therewith can also be utilized for providing a protecting package corresponding to a Java applet for execution by a NM of a Downloadable-destination, or with regard to ActiveX controls, add-ins or other distributable components, etc.)

The above concatenation or other suitable processing will result in the following. Upon receipt of sandboxed package 340 by a compatible browser, email or other destination-client and activating of the package by a user or the destination-client, the operating system (or a suitable responsively initiated distributed component host) will attempt to initiate sandboxed package 340 as a single Downloadable. Such processing will, however, result in initiating the MPC 341 and—in accordance with further aspects of the invention—the MPC will initiate the Downloadable in a protected manner, further in accordance with any applicable included or further downloaded protection policies 342. (While system 300 is also capable of ascertaining protection policies stored at a Downloadable-destination, e.g. by poll, query, etc. of available destination information, including at least initial policies within a suitable protecting package is found to avoid associated security concerns or inefficiencies.)

Figure 4:
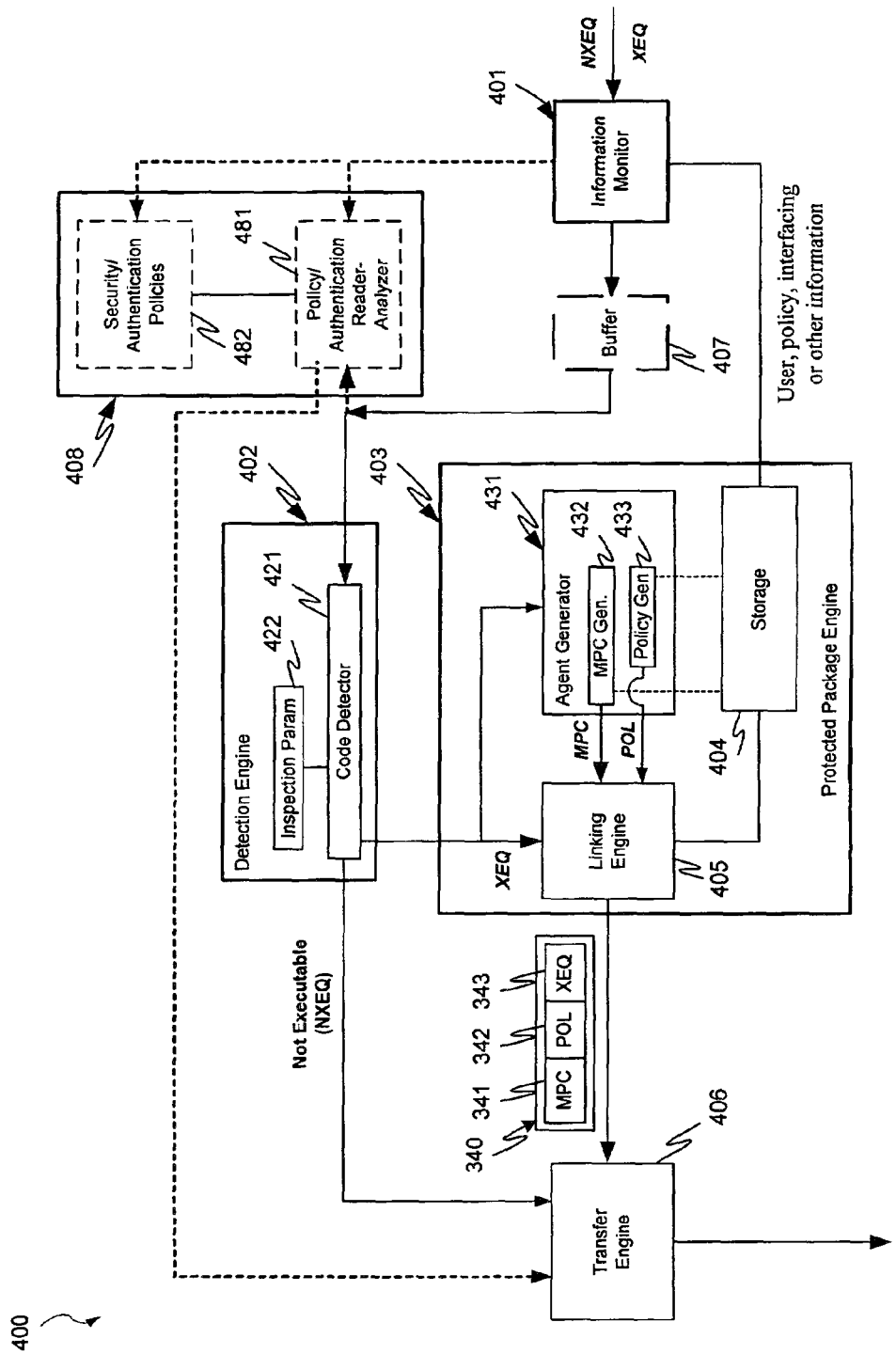
FIG. 4 is a block diagram illustrating a protection engine according to an embodiment of the invention.

Turning to FIG. 4, a protection engine 400 generally consistent with protection engine 310 (or 320) of FIG. 3 is illustrated in accordance with an embodiment of the invention. Protection engine 400 comprises information monitor 401, detection engine 402, and protected packaging engine 403, which further includes agent generator 431, storage 404, linking engine 405, and transfer engine 406. Protection engine 400 can also include a buffer 407, for temporarily storing a received potential-Downloadable, or one or more systems for conducting additional authentication, certification, verification or other security processing (e.g. summarily depicted as security system 408.) Protection engine 400 can further provide for selectively re-directing, further directing, logging, etc. of a potential/detected Downloadable or information corresponding thereto in conjunction with detection, other security, etc., in accordance with a particular application.

(Note that FIG. 4, as with other figures included herein, also depicts exemplary signal flow arrows; such arrows are provided to facilitate discussion, and should not be construed as exclusive or otherwise limiting.)

Information monitor 401 monitors potential-Downloadables received by a host server and provides the information via buffer 407 to detection engine 402 or to other system 400 elements. Information monitor 401 can be configured to monitor host server download operations in conjunction with a user or a user-device that has logged-on to the server, or to receive information via a server operation hook, servlet, communication channel or other suitable mechanism.

Information monitor 401 can also provide for transferring, to storage 404 or other protection engine elements, configuration information including, for example, user, MPC, protection policy, interfacing or other configuration information (e.g. see FIG. 6). Such configuration information monitoring can be conducted in accordance with a user/device logging onto or otherwise accessing a host server, via one or more of configuration operations, using an applet to acquire such information from or for a particular user, device or devices, via MPC/policy polling of a user device, or via other suitable mechanisms.

Detection engine 402 includes code detector 421, which receives a potential-Downloadable and determines, more suitably in conjunction with inspection parameters 422, whether the potential-Downloadable includes executable code and is thus a "detected-Downloadable". (Code detector 421 can also include detection processors for performing me decompression or other "decoding", or such detection-facilitating processing as decryption, utilization/support of security system 408, etc. in accordance with a particular application.)

Detection engine 402 further transfers a detected-downloadable ("XEQ") to protected packaging engine 403 along with indicators of such detection, or a determined non-executable ("NXEQ") to transfer engine 406. (Inspection parameters 422 enable analysis criteria to be readily updated or varied, for example, in accordance with particular source, destination or other potential Downloadable impacting parameters, and are discussed in greater detail with reference to FIG. 5). Detection engine 402 can also provide indicators for delivery of initial and further MPCs/policies, for example, prior to or in conjunction with detecting a Downloadable and further upon receipt of an indicator from an already downloaded MPC/policy. A downloaded MPC/policy can further remain resident at a user device with further modules downloaded upon or even after delivery of a sandboxed package. Such distribution can also be provided in a configurable manner, such that delivery of a complete package or partial packages are automatically or interactively determinable in accordance with user/administrative preferences/policies, among other examples.

Packaging engine 403 provides for generating mobile protection code and protection policies, and for causing delivery thereof (typically with a detected-Downloadable) to a Downloadable-destination for protecting the Downloadable-destination against malicious operation attempts by the detected Downloadable. In this example, packaging engine 403 includes agent generator 431, storage 404 and linking engine 405.

Agent generator 431 includes an MPC generator 432 and a protection policy generator 433 for "generating" an MPC and a protection policy (or set of policies) respectively upon receiving one or more "generate MPC/policy" indicators from detection engine 402, indicating that a potential-Downloadable is a detected-Downloadable. MPC generator 432 and protection policy generator 433 provide for generating MPCs and protection policies respectively in accordance with parameters retrieved from storage 404. Agent generator 431 is further capable of providing multiple MPCs/policies, for example, the same or different MPCs/policies in accordance with protecting ones of multiple executables within a zip file, or for providing initial MPCs/policies and then further MPCs/policies or MPC/policy "modules" as initiated by further indicators such as given above, via an indicator of an already downloaded MPC/policy or via other suitable mechanisms. (It will be appreciated that pre-constructed MPCs/policies or other processing can also be utilized, e.g. via retrieval from storage 404, but with a potential decrease in flexibility.)

MPC generator 432 and protection policy generator 433 are further configurable. Thus, for example, more generic MPCs/policies can be provided to all or a grouping of serviced destination-devices (e.g. in accordance with a similarly configured/administered intranet), or different MPCs/policies that can be configured in accordance with one or more of user, network administration, Downloadable-destination or other parameters (e.g. see FIG. 6). As will become apparent, a resulting MPC provides an operational interface to a destination device/process. Thus, a high degree of flexibility and efficiency is enabled in providing such an operational interface within different or differently configurable user devices/processes or other constraints.

Such configurability further enables particular policies to be utilized in accordance with a particular application (e.g. particular system uses, access limitations, user interaction, treating application programs or Java components from a particular known source one way and unknown source ActiveX components, or other considerations). Agent generator 431 further transfers a resulting MPC and protection policy pair to linking engine 405.

Linking engine 405 provides for forming from received component elements (see above) a sandboxed package that can include one or more initial or complete MPCs and applicable protection policies, and a Downloadable, such that the sandboxed package will protect a receiving Downloadable-destination from malicious operation by the Downloadable. Linking engine 405 is implementable in a static or configurable manner in accordance, for example, with characteristics of a particular user device/process stored intermittently or more persistently in storage 404. Linking engine 405 can also provide for restoring a Downloadable, such as a compressed, encrypted or otherwise encoded file that has been decompressed, decrypted or otherwise decoded via detection processing 20 (e.g. see FIG. 6b). It is discovered, for example, that the manner in which the Windows OS initiates a binary executable or an ActiveX control can be utilized to enable protected initiation of a detected-Downloadable. Linking engine 405 is, for example, configurable to form, for an ordinary single-executable Downloadable (e.g. an application program, applet, etc.) a sandboxed package 340 as a concatenation of ordered elements including an MPC 341, applicable policies 342 and the Downloadable or "XEQ" 343 (e.g. see FIG. 4).

Linking engine 405 is also configurable to form, for a Downloadable received by a server as a compressed single or multiple-executable Downloadable such as a zipped or meta file, a protecting package 340 including one or more MPCs, applicable policies and the one or more included executables of the Downloadable. For example, a sandboxed package can be formed in which a single MPC and policies precede and thus will affect all such executables as a result of inflating and installation. An MPC and applicable policies can also, for example, precede each executable, such that each executable will be separately sandboxed in the same or a different manner according to MPC/policy configuration (see above) upon inflation and installation. (See also FIGS. 5 and 6.) Linking engine is also configurable to form an initial MPC, MPC-policy or sandboxed package (e.g. prior to upon receipt of a downloadable) or an additional MPC, MPC-policy or sandboxed package (e.g. upon or following receipt of a downloadable), such that suitable MPCs/policies can be provided to a Downloadable-destination or other destination in a more distributed manner. In this way, requisite bandwidth or destination resources can be minimized (via two or more smaller packages) in compromise with latency or other considerations raised by the additional required communication.

A configurable linking engine can also be utilized in accordance with other requirements of particular devices/processes, further or different elements or other permutations in accordance with the teachings herein. (It might, for example be desirable to modify the ordering of elements, to provide one or more elements separately, to provide additional information, such as a header, etc., or perform other processing in accordance with a particular device, protocol or other application considerations.)

Policy/authentication reader-analyzer 481 summarily depicts other protection mechanisms that might be utilized in conjunction with Downloadable detection, such as already discussed, and that can further be configurable to operate in accordance with policies or parameters (summarily depicted by security/authentication policies 482). Integration of such further protection in the depicted configuration, for example, enables a potential-Downloadable from a known unfriendly source, a source failing authentication or a provided-source that is confirmed to be fictitious to be summarily discarded, otherwise blocked, flagged, etc. (with or without further processing). Conversely, a potential-Downloadable from a known friendly source (or one confirmed as such) can be transferred with or without further processing in accordance with particular application considerations. (Other configurations including pre or post Downloadable detection mechanisms might also be utilized.)

Finally, transfer engine 406 of protection agent engine 303 provides for receiving and causing linking engine 405 (or other protection) results to be transferred to a destination user device/process. As depicted, transfer engine 406 is configured to receive and transfer a Downloadable, a determined non-executable or a sandboxed package. However, transfer engine 406 can also be provided in a more configurable manner, such as was already discussed for other system 400 elements. (Anyone or more of system 400 elements might be configurably implemented in accordance with a particular application.) Transfer engine 406 can perform such transfer, for example, by adding the information to a server transfer queue (not shown) or utilizing another suitable method.

Figure 5:
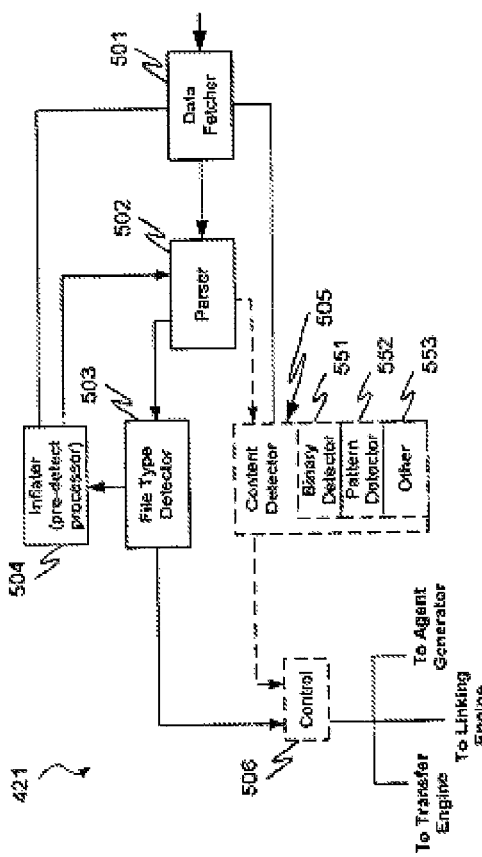
FIG. 5 is a block diagram illustrating a content inspection engine according to an embodiment of the invention.

Turning to FIG. 5 with reference to FIG. 4, a code detector 421 example is illustrated in accordance with an embodiment of the invention. As shown, code detector 421 includes data fetcher 501, parser 502, file-type detector 503, inflator 504 and control 506; other depicted elements. While implementable and potentially useful in certain instances, are found to require substantial overhead, to be less accurate in certain instances (see above) and are not utilized in a present implementation; these will be discussed separately below. Code detector elements are further configurable in accordance with stored parameters retrievable by data fetcher 501. (A coupling between data fetcher 501 and control 506 has been removed for clarity sake.)

Data fetcher 501 provides for retrieving a potential-Downloadable or portions thereof stored in buffer 407 or parameters from storage 404, and communicates such information or parameters to parser 502. Parser 502 receives a potential-Downloadable or portions thereof from data fetcher 501 and isolates potential-Downloadable elements, such as file headers, source, destination, certificates, etc. for use by further processing elements.

File type detector 502 receives and determines whether the potential-Downloadable (likely) is or includes an executable file type. File-reader 502 can, for example, be configured to analyze a received potential-Downloadable for a file header, which is typically included in accordance with conventional data transfer protocols, such as a portable executable or standard ".exe" file format for Windows OS application programs, a Java class header for Java applets, and so on for other applications, distributed components, etc. "Zipped", meta or other compressed files, which might include one or more executables, also typically provide standard single or multi-level headers that can be read and used to identify included executable code (or other included information types). File type detector 502 is also configurable for analyzing potential-Downloadables for all potential file type delimiters or a more limited subset of potential file type delimiters (e.g. ".exe" or ".com" in conjunction with a DOS or Microsoft Windows as Downloadable-destination).

Known file type delimiters can, for example, be stored in a more temporary or more persistent storage (e.g. storage 404 of FIG. 4) which file type detector 502 can compare to a received potential-Downloadable. (Such delimiters can thus also be updated in storage 404 as a new file type delimiter is provided, or a more limited subset of delimiters can also be utilized in accordance with a particular Downloadable-destination or other considerations of a particular application.) File type detector 502 further transfers to controller 506 a detected file type indicator indicating that the potential-Downloadable includes or does not include (i.e. or likely include) an executable file type.

In this example, the aforementioned detection processor is also included as pre-detection processor or, more particularly, a configurable file inflator 504. File inflator 504 provides for opening or "inflating" compressed files in accordance with a compressed file type received from file type detector 503 and corresponding file opening parameters received from data fetcher 501. Where a compressed file (e.g. a meta file) includes nested file type information not otherwise reliably provided in an overall file header or other information, inflator 504 returns such information to parser 502. File inflator 504 also provides any now-accessible included executables to control 506 where one or more included files are to be separately packaged with an MPC or policies.

Control 506, in this example, operates in accordance with stored parameters and provides for routing detected non-Downloadables or Downloadables and control information, and for conducting the aforementioned distributed downloading of packages to Downloadable-destinations. In the case of a non-Downloadable, for example, control 506 sends the non-Downloadable to transfer engine 406 (FIG. 4) along with any indicators that might apply. For an ordinary single-executable Downloadable, control 506 sends control information to agent generator 431 and the Downloadable to linking engine 405 along with any other applicable indicators (see 641 of FIG. 6b). Control 506 similarly handles a compressed single-executable Downloadable or a multiple downloadable to be protected using a single sandboxed package. For a multiple-executable Downloadable, control 506 sends control information for each corresponding executable to agent generator agent generator 431, and sends the executable to linking engine 405 along with controls and any applicable indicators, as in 643b of FIG. 6b. (The above assumes, however, that distributed downloading is not utilized; when used—according to applicable parameters—control 506 also operates in accordance with the following.)

Control 506 conducts distributed protection (e.g. distributed packaging) by providing control signals to agent generator 431, linking engine 405 and transfer engine 406. In the present example, control 506 initially sends controls to agent generator 431 and linking engine 405 (FIG. 4) causing agent generator to generate an initial MPC and initial policies, and sends control and a detected-Downloadable to linking engine 405. Linking engine 405 forms an initial sandboxed package, which transfer engine causes (in conjunction with further controls) to be downloaded to the Downloadable destination (643a of FIG. 6b). An initial MPC within the sandboxed package includes an installer and a communicator and performs installation as indicated below. The initial MPC also communicates via the communicator controls to control 506 (FIG. 5) in response to which control 506 similarly causes generation of MPC-M and policy-M modules 643c, which linking engine 405 links and transfer engine 406 causes to be sent to the Downloadable destination, and so on for any further such modules.

(It will be appreciated, however, that an initial package might be otherwise configured or sent prior to receipt of a Downloadable in accordance with configuration parameters or user interaction. Information can also be sent to other user devices, such as that of an administrator. Further MPCs/policies might also be coordinated by control 506 or other elements, or other suitable mechanisms might be utilized in accordance with the teachings herein.)

Regarding the remaining detection engine elements illustrated in FIG. 5, where content analysis is utilized, parser 502 can also provide a Downloadable or portions thereof to content detector 505. Content detector 505 can then provide one or more content analyses. Binary detector 551, for example, performs detection of binary information; pattern detector 552 further analyzes the Downloadable for patterns indicating executable code, or other detectors can also be utilized. Analysis results therefrom can be used in an absolute manner, where a first testing result indicating executable code confirms Downloadable detection, which result is then sent to control 506. Alternatively, however, composite results from such analyses can also be sent to control 506 for evaluation. Control 506 can further conduct such evaluation in a summary manner (determining whether a Downloadable is detected according to a majority or minimum number of indicators), or based on a weighting of different analysis results. Operation then continues as indicated above. (Such analysis can also be conducted in accordance with aspects of a destination user device or other parameters.)

Figure 6A:
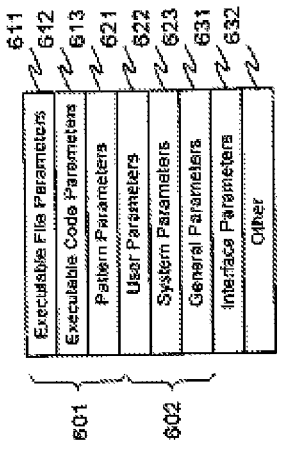
FIG. 6a is a block diagram illustrating protection engine parameters according to an embodiment of the invention.

FIG. 6a illustrates more specific examples of indicators/parameters and known (or "knowledge base") elements that can be utilized to facilitate the above-discussed system 400 configurability and detection. For clarity sake, indicators, parameters and knowledge base elements are combined as indicated "parameters." It will be appreciated, however, that the particular parameters utilized can differ in accordance with a particular application, and indicators, parameters or known elements, where utilized, can vary and need not correspond exactly with one another. Any suitable explicit or referencing list, database or other storage structure(s) or storage structure configuration(s) can also be utilized to implement a suitable user/device based protection scheme, such as in the above examples, or other desired protection schema.

Executable parameters 601 comprise, in accordance with the above examples, executable file type parameters 611, executable code parameters 612 and code pattern parameters 613 (including known executable file type indicators, header/code indicators and patterns respectively, where code patterns are utilized). Use parameters 602 further comprise user parameters 621, system parameters 622 and general parameters 623 corresponding to one or more users, user classifications, user-system correspondences or destination system, device or processes, etc. (e.g. for generating corresponding MPCs/policies, providing other protection, etc.). The remaining parameters include interface parameters 631 for providing MPC/policy (or further) configurability in accordance with a particular device or for enabling communication with a device user (see below), and other parameters 632.

Figure 6B:
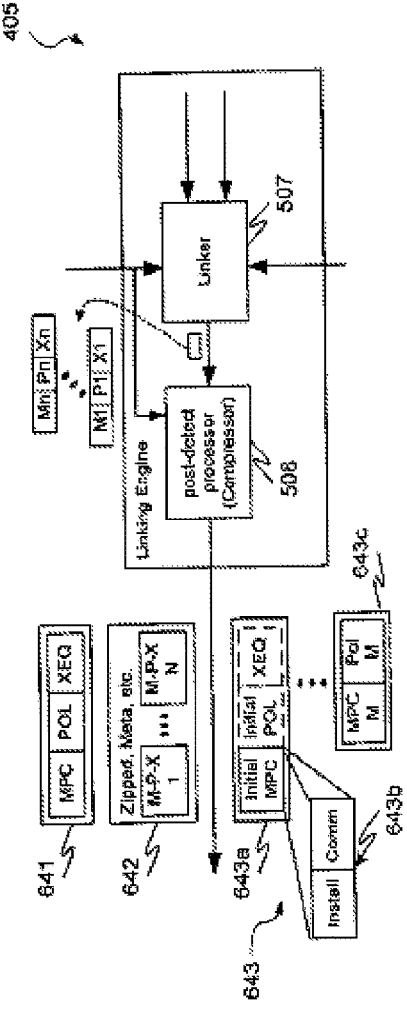
FIG. 6b is a flow diagram illustrating a linking engine use in conjunction with ordinary, compressed and distributable sandbox package utilization, according to an embodiment of the invention.

FIG. 6b illustrates a linking engine 405 according to an embodiment of the invention. As already discussed, linking engine 405 includes a linker for combining MPCs, policies or agents via concatination or other suitable processing in accordance with an OS, JVM or other host executor or other applicable factors that might apply. Linking engine 405 also includes the aforementioned post-detection processor which, in this example, comprises a compressor 508. As noted, compressor 508 receives linked elements from linker 507 and, where a potential-Downloadable corresponds to a compressed file that was inflated during detection, re-forms the compressed file. (Known file information can be provided via configuration parameters, substantially reversal of inflating or another suitable method.) Encryption or other post-detection processing can also be conducted by linking engine 508.

FIGS. 7a, 7b and 8 illustrate a "sandbox protection" system, as operable within a receiving destination-device, according to an embodiment of the invention.

Beginning with FIG. 7a, a client 146 receiving sandbox package 340 will "recognize" sandbox package 340 as a (mobile) executable and cause a mobile code installer 711 (e.g. an OS loader, JVM, etc.) to be initiated. Mobile code installer 711 will also recognize sandbox package 340 as an executable and will attempt to initiate sandbox package 340 at its "beginning." Protection engine 400 processing corresponding to destination 700 use of a such a loader, however, will have resulted in the "beginning" of sandbox package 340 as corresponding to the beginning of MPC 341, as noted with regard to the above FIG. 4 example.

Such protection engine processing will therefore cause a mobile code installer (e.g. OS loader 711, for clarity sake) to initiate MPC 341. In other cases, other processing might also be utilized for causing such initiation or further protection system operation. Protection engine processing also enables MPC 341 to effectively form a protection "sandbox" around Downloadable (e.g. detected-Downloadable or "XEQ") 343, to monitor Downloadable 343, intercept determinable Downloadable 343 operation (such as attempted accesses of Downloadable 343 to destination resources) and, if "malicious", to cause one or more other operations to occur (e.g. providing an alert, offloading the Downloadable, offloading the MPC, providing only limited resource access, possibly in a particular address space or with regard to a particularly "safe" resource or resource operation, etc.).

MPC 341, in the present OS example, executes MPC element installation and installs any policies, causing MPC 341 and protection policies 342 to be loaded into a first memory space, PI. MPC 341 then initiates loading of Downloadable 343. Such Downloadable initiation causes OS loader 711 to load Downloadable 343 into a further working memory space-P2 703 along with an API import table ("IAT") 731 for providing Downloadable 631 with destination resource access capabilities. It is discovered, however that the IA T can be modified so that any call to an API can be redirected to a function within the MPC. The technique for modifying the IA T is documented within the MSDN (Microsoft Developers Network) Library CD in several articles. The technique is also different for each operating system (e.g. between Windows 9x and Windows NT), which can be accommodated by agent generator configurability, such as that given above. MPC 341 therefore has at least initial access to API IAT 731 of Downloadable 632, and provides for diverting, evaluating and responding to attempts by Downloadable 632 to utilize system APIs 731, or further in accordance with protection policies 342. In addition to API diverting, MPC 341 can also install filter drivers, which can be used for controlling access to resources such as a Downloadable-destination file system or registry. Filter driver installation can be conducted as documented in the MSDN or using other suitable methods.

Turning to FIG. 8 with reference to FIG. 7b, an MPC 341 according to an embodiment of the invention includes a package extractor 801, executable installer 802, sandbox engine installer 803, resource access diverter 804, resource access (attempt) analyzer 805, policy enforcer 806 and MPC de-installer 807. Package extractor 801 is initiated upon initiation of MPC 341, and extracts MPC 341 elements and protection policies 342. Executable installer 802 further initiates installation of a Downloadable by extracting the downloadable from the protected package, and loading the process into memory in suspended mode (so it only loads into memory, but does not start to run). Such installation further causes the operating system to initialize the Downloadable's IAT 731 in the memory space of the downloadable process, P2, as already noted.

Sandbox engine installer 803 (running in process space PI) then installs the sandbox engine (803-805) and policies 342 into the downloadable process space P2. This is done in different way in each operating system (e.g. see above). Resource access diverter 804 further modifies those Downloadable-API IAT entries that correspond with protection policies 342, thereby causing corresponding Downloadable accesses via Downloadable-API IAT 731 to be diverted resource access analyzer 805.

During Downloadable operation, resource access analyzer or "RAA" 805 receives and determines a response to diverted Downloadable (i.e. "malicious") operations in accordance with corresponding protection policies of policies 342. (RAA 805 or further elements, which are not shown, can further similarly provide for other security mechanisms that might also be implemented.) Malicious operations can for example include, in a Windows environment: file operations (e.g. reading, writing, deleting or renaming a file), network operations (e.g. listen on or connect to a socket, send/receive data or view intranet), OS registry or similar operations (read/write a registry item), OS operations (exit as/client, kill or change the priority of a process/thread, dynamically load a class library), resource usage thresholds (e.g. memory, CPU, graphics), etc.

Policy enforcer 806 receives RAA 805 results and causes a corresponding response to be implemented, again according to the corresponding policies. Policy enforcer 806 can, for example, interact with a user (e.g. provide an alert, receive instructions, etc.), create a log file, respond, cause a response to be transferred to the Downloadable using "dummy" or limited data, communicate with a server or other networked device (e.g. corresponding to a local or remote administrator), respond more specifically with a better known Downloadable, verify accessibility or user/system information (e.g. via local or remote information), even enable the attempted Downloadable access, among a wide variety of responses that will become apparent in 20 view of the teachings herein.

Figure 9:
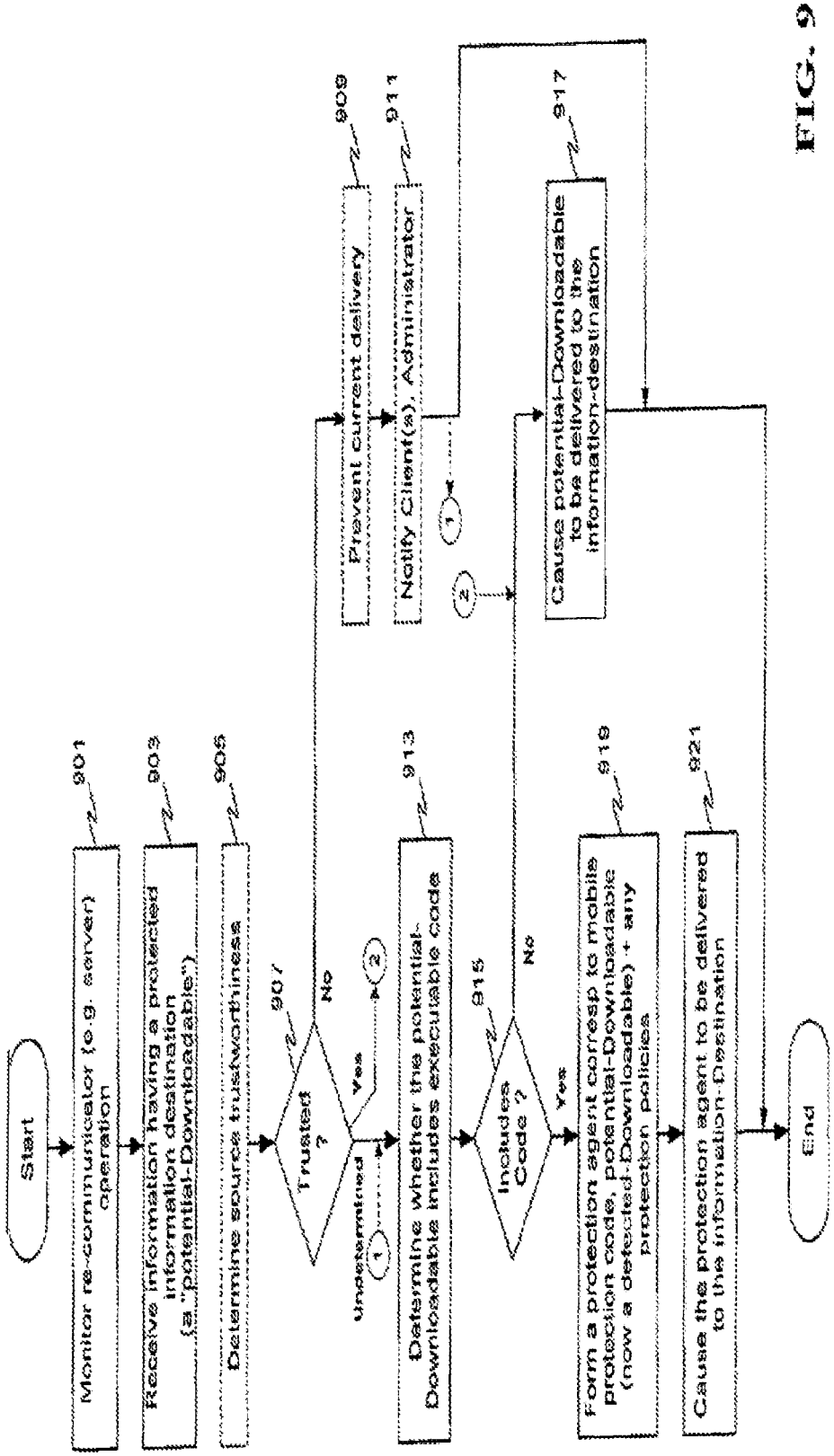
FIG. 9 is a flowchart illustrating a protection method according to an embodiment of the invention.

The FIG. 9 flowchart illustrates a protection method according to an embodiment of the invention. In step 901, a protection engine monitors the receipt, by a server or other re-communicator of information, and receives such information intended for a protected information-destination (i.e. a potential-Downloadable) in step 903. Steps 905-911 depict an adjunct trustworthiness protection that can also be provided, wherein the protection engine determines whether the source of the received information is known to be "unfriendly" and, if so, prevents current (at least unaltered) delivery of the potential-Downloadable and provides any suitable alerts. (The protection engine might also continue to perform Downloadable detection and nevertheless enable delivery or protected delivery of a non-Downloadable, or avoid detection if the source is found to be "trusted", among other alternatives enabled by the teachings herein.)

If, in step 913, the potential-Downloadable source is found to be of an unknown or otherwise suitably authenticated/certified source, then the protection engine determines whether the potential-Downloadable includes executable code in step 915. If the potential-Downloadable does not include executable code, then the protection engine causes the potential-Downloadable to be delivered to the information-destination in its original form in step 917, and the method ends. If instead the potential-Downloadable is found to include executable code in step 915 (and is thus a "detected-Downloadable"), then the protection engine forms a sandboxed package in step 919 and causes the protection agent to be delivered to the information-Destination in step 921, and the method ends. As was discussed earlier, a suitable protection agent can include mobile protection code, policies and the detected-Downloadable (or information corresponding thereto).

Figures 10A, 10B:
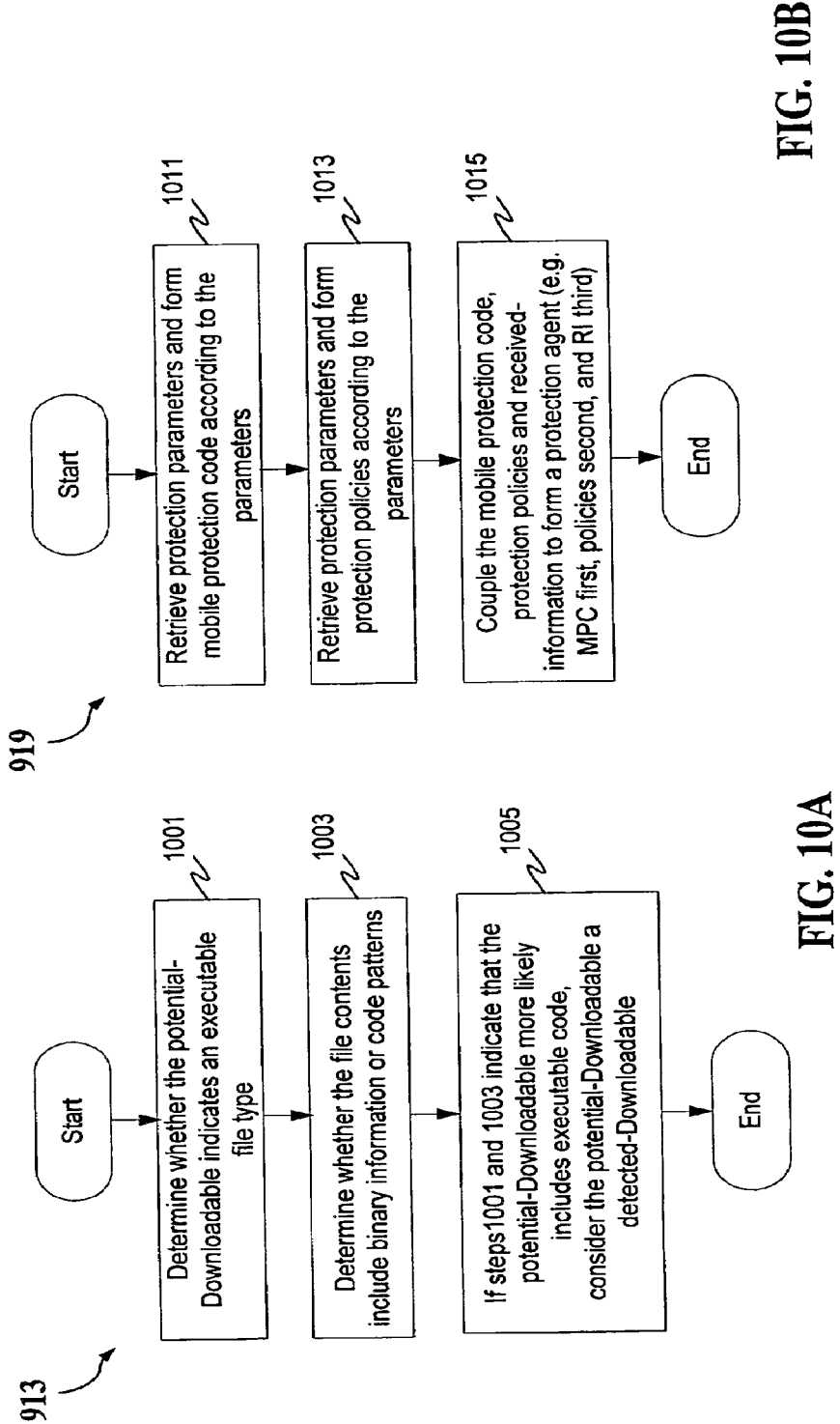
FIG. 10a is a flowchart illustrating method for determining if a potential-Downloadable includes or is likely to include executable code, according to an embodiment of the invention.
FIG. 10b is a flowchart illustrating a method for forming a protection agent, according to an embodiment of the invention.

The FIG. 10*a* flowchart illustrates a method for analyzing a potential-Downloadable, according to an embodiment of the invention. As shown, one or more aspects can provide useful indicators of the inclusion of executable code within the potential-Downloadable. In step 1001, the protection engine determines whether the potential-Downloadable indicates an executable file type, for example, by comparing one or more included file headers for file type indicators (e.g. extensions or other descriptors). The indicators can be compared against all known file types executable by all protected Downloadable destinations, a subset, in accordance with file types executable or desirably executable by the Downloadable-destination, in conjunction with a particular user, in conjunction with available information or operability at the destination, various combinations, etc.

Where content analysis is conducted, in step 1003 of FIG. 10*a*, the protection engine analyzes the potential-Downloadable and determines in accordance therewith whether the potential-Downloadable does or is likely to include binary information, which typically indicates executable code. The protection engine further analyzes the potential-Downloadable for patterns indicative of included executable code in step 1003. Finally, in step 1005, the protection engine determines whether the results of steps 1001 and 1003 indicate that the potential-Downloadable more likely includes executable code (e.g. via weighted comparison of the results with a suitable level indicating the inclusion or exclusion of executable code). The protection engine, given a suitably high confidence indicator of the inclusion of executable code, treats the potential-Downloadable as a detected-Downloadable.

The FIG. 10*b* flowchart illustrates a method for forming a sandboxed package according to an embodiment of the invention. As shown, in step 1011, a protection engine retrieves protection parameters and forms mobile protection code according to the parameters. The protection engine further, in step 1013, retrieves protection parameters and forms protection policies according to the parameters. Finally, in step 1015, the protection engine couples the mobile protection code, protection policies and received-information to form a sandboxed package. For example, where a Downloadable-destination utilizes a standard windows executable, coupling can further be accomplished via concatenating the MPC for delivery of MPC first, policies second, and received-information third. (The protection parameters can, for example, include parameters relating to one or more of the Downloadable destination device/process, user, supervisory constraints or other parameters.)

Figure 11:
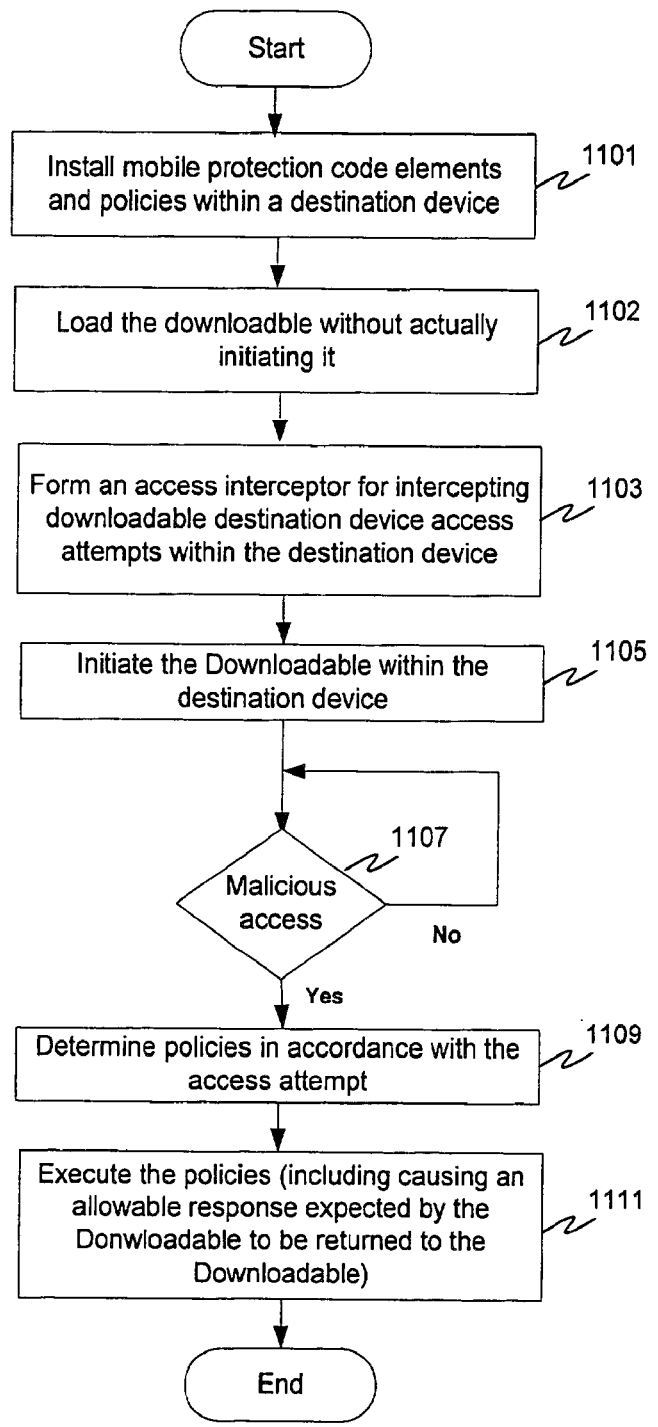
FIG. 11 is a flowchart illustrating a method for protecting a Downloadable destination according to an embodiment of the invention.

The FIG. 11 flowchart illustrates how a protection method performed by mobile protection code ("MPC") according to an embodiment of the invention includes the MPC installing MPC elements and policies within a destination device in step 1101. In step 1102, the MPC loads the Downloadable without actually initiating it (i.e. for executables, it will start a process in suspended mode). The MPC further forms an access monitor or "interceptor" for monitoring or "intercepting" downloadable destination device access attempts within the destination device (according to the protection policies in step 1103, and initiates a corresponding Downloadable within the destination device in step 1105.

If, in step 1107, the MPC determines, from monitored/intercepted information, that the Downloadable is attempting or has attempted a destination device access considered undesirable or otherwise malicious, then the MPC performs steps 1109 and 1111; otherwise the MPC returns to step 1107. In step 1109, the MPC determines protection policies in accordance with the access attempt by the Downloadable, and in step 1111, the MPC executes the protection policies. (protection policies can, for example, be retrieved from a temporary, e.g. memory/cache, or more persistent storage.)

As shown in the FIG. 12*a* example, the MPC can provide for intercepting Downloadable access attempts by a Downloadable by installing the Downloadable (but not executing it) in step 1201. Such installation will cause a Downloadable executor, such as a the Windows operating system, to provide all required interfaces and parameters (such as the IAT, process ill, etc.) for use by the Downloadable to access device resources of the host device. The MPC can thus cause Downloadable access attempts to be diverted to the MPC by modifying the Downloadable IAT, replacing device resource location indicators with those of the MPC (step 1203).

The FIG. 12*b* example further illustrates an example of how the MPC can apply suitable policies in accordance with an access attempt by a Downloadable. As shown, the MPC receives the Downloadable access request via the modified IAT in step 1211. The MPC further queries stored policies to determine a policy corresponding to the Downloadable access request in step 1213.

The foregoing description of preferred embodiments of the invention is provided by way of example to enable a person skilled in the art to make and use the invention, and in the context of particular applications and requirements thereof. Various modifications to the embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein. The embodiments described herein are not intended to be exhaustive or limiting. The present invention is limited only by the following claims.

What is claimed is:

1. A system for reviewing an operating system call issued by a downloadable, comprising:
    at least one processor for accessing elements stored in at least one memory associated with the at least one processor and for executing instructions associated with the elements, the elements including:
    an operating system probe associated with an operating system function for intercepting an operating system call being issued by a downloadable to an operating system and associated with the operating system function;
    a runtime environment monitor for comparing the operating system call against a predetermined security policy including multiple security rules to determine if execution of the operating system call violates one or more of the multiple security rules before allowing the operating system to process the operating system call and for forwarding a message to a response engine when the comparison by the runtime environment monitor indicates a violation of one or more of the multiple security rules;
    a response engine for compiling each rule violation indicated in the messages forwarded by the runtime environment monitor, for blocking execution of operating system calls that are forbidden according to the security policy when execution of the operating system calls would result in a violation of a predetermined combination of multiple security rules of the predetermined security policy and for allowing execution of operating system calls that are permitted according to the security policy;
    a downloadable engine for intercepting a request message being issued by a downloadable to an operating system, wherein the request message includes an extension call;
    a request broker for receiving a notification message from the downloadable engine regarding the extension call;
    a file system probe and a network system probe each being associated with an operating system function for receiving the request message from the downloadable engine and intercepting an operating system call being issued by the downloadable to an operating system and associated with the operating system function;
    an event router for receiving the notification message from the request broker regarding the extension call and an event message from one of the file system probe and the network system probe regarding the operating system call;
    the runtime environment monitor for receiving the notification message and the event message from the event router and comparing the extension call and the operating system call against a predetermined security policy before allowing the operating system to process the extension call and the operating system call; and
    the response engine for receiving a violation message from the runtime environment monitor when one of the extension call and the operating system call violate one or more rules of the predetermined security policy and blocking extension calls and operating system calls that are forbidden according to the predetermined security policy, and for allowing extension calls and operating system calls that are permitted according to the predetermined security policy.

2. The system of claim 1, wherein the downloadable is one of a Java component, an ActiveX control, executable code, or interpretable code.

3. A system for reviewing an operating system call issued by a downloadable, comprising:
    at least one processor for accessing elements stored in at least one memory associated with the at least one processor and for executing instructions associated with the elements, the elements including:
    a downloadable engine for intercepting a request message being issued by a downloadable to an operating system, wherein the request message includes an extension call;
    a request broker for receiving a notification message from the downloadable engine regarding the extension call;
    a file system probe and a network system probe each being associated with an operating system function for receiving the request message from the downloadable engine, intercepting an operating system call being issued by the downloadable to an operating system and associated with the operating system function and providing an event message regarding the operating system call;
    a runtime environment monitor for receiving the notification message and the event message and comparing the extension call and the operating system call against a predetermined security policy before allowing the operating system to process the extension call and the operating system call; and
    a response engine for receiving a violation message from the runtime environment monitor when one of the extension call and the operating system call violate one or more rules of the predetermined security policy and blocking extension calls and operating system calls that are forbidden according to the predetermined security policy, and for allowing extension calls and operating system calls that are permitted according to the predetermined security policy.

4. The system of claim 3, wherein the Downloadable is one of a Java component, an ActiveX control, executable code, or interpretable code.

5. The system of claim 3, wherein the response engine stores results of the comparison in an event log.

6. The system of claim 3, wherein the response engine informs the user when the security policy has been violated.

7. The system of claim 3, wherein the response engine stores information on the Downloadable in a suspicious Downloadable database when it includes extension calls or operating system calls that are forbidden according to the predetermined security policy.

8. The system of claim 3, wherein the response engine discards the Downloadable when it includes extension calls or operating system calls that are forbidden according to the predetermined security policy.

* * * * *